July 1, 1969 L. HOLMES, JR 3,453,379

COMMUNICATION SYSTEM

Filed July 29, 1965 Sheet 1 of 26

INVENTOR.

Lawrence Holmes Jr.

BY

Fryer, Tjensvold, Feix & Phillips

Attorneys

July 1, 1969 L. HOLMES, JR 3,453,379

COMMUNICATION SYSTEM

Filed July 29, 1965 Sheet 2 of 26

INVENTOR.
Lawrence Holmes Jr
BY
Fryer Tjensvold Feix & Phillips
Attorneys

INVENTOR
Lawrence Holmes Jr.
BY
Fryer Tjensvold Feix Phillips
Attorneys

INVENTOR.
Lawrence Holmes Jr.
BY
Fryer Tjensvold Feix & Phillips
Attorneys

INVENTOR.
Lawrence Holmes Jr.
BY Fryer Tjensvold Feix & Phillips
Attorneys

INVENTOR.
Lawrence Holmes Jr.
BY
Fryer Tjensvold Feix & Phillips
Attorneys

INVENTOR.
Lawrence Holmes Jr.
BY
Fryer Tjensvold Feix & Phillips
Attorneys

INVENTOR.
Lawrence Holmes Jr.
BY
Fryer Tjensvold Feix + Phillips
Attorneys

INVENTOR.
Lawrence Holmes Jr
BY
Fryer Tjensvold Feix & Phillips
Attorneys

INVENTOR.
Lawrence Holmes Jr.
BY
Fryer Tjensvold Feix Phillips
Attorneys

INVENTOR.
Lawrence Holmes Jr.
BY
Fryer Tjensvold Feix & Phillips
Attorneys

| Bi Wt | 1 | 2 | 4 | 8 | 16 | 32 | L/C | U/C |
|---|---|---|---|---|---|---|---|---|
| 0 | | | | | | | _ | _ |
| 1 | 1 | | | | | | b | B |
| 2 | | 2 | | | | | w | W |
| 3 | 1 | 2 | | | | | 9 | ( |
| 4 | | | 4 | | | | q | Q |
| 5 | 1 | | 4 | | | | k | K |
| 6 | | 2 | 4 | | | | i | I |
| 7 | 1 | 2 | 4 | | | | 6 | ¢ |
| 8 | | | | 8 | | | y | Y |
| 9 | 1 | | | 8 | | | h | H |
| 10 | | 2 | | 8 | | | s | S |
| 11 | 1 | 2 | | 8 | | | 0 | ) |
| 12 | | | 4 | 8 | | | p | P |
| 13 | 1 | | 4 | 8 | | | e | E |
| 14 | | 2 | 4 | 8 | | | ' | " |
| 15 | 1 | 2 | 4 | 8 | | | 5 | % |
| 16 | | | | | | | | |
| 17 | | | | | | | | |
| 18 | | | | | | | | |
| 19 | | | | | | | | |
| 20 | | | 4 | | 16 | | = | + |
| 21 | 1 | | 4 | | 16 | | n | N |
| 22 | | 2 | 4 | | 16 | | . | . |
| 23 | 1 | 2 | 4 | | 16 | | 2 | @ |
| 24 | | | | | | | | |
| 25 | | | | | | | | |
| 26 | | | | | | | | |
| 27 | | | | | | | | |
| 28 | | | 4 | 8 | 16 | | j | J |
| 29 | 1 | | 4 | 8 | 16 | | t | T |
| 30 | | 2 | 4 | 8 | 16 | | 1 | ° |
| 31 | 1 | 2 | 4 | 8 | 16 | | z | Z |
| 32 | | | | | | | | |
| 33 | | | | | | | | |
| 34 | | | | | | | | |
| 35 | | | | | | | | |
| 36 | | | 4 | | | 32 | , | , |
| 37 | 1 | | 4 | | | 32 | c | C |
| 38 | | 2 | 4 | | | 32 | a | A |
| 39 | 1 | 2 | 4 | | | 32 | 8 | * |
| 40 | | | | 8 | | 32 | / | ? |
| 41 | 1 | | | 8 | | 32 | l | L |
| 42 | | 2 | | 8 | | 32 | o | O |
| 43 | 1 | 2 | | 8 | | 32 | 4 | $ |
| 44 | | | 4 | 8 | | 32 | ; | : |
| 45 | 1 | | 4 | 8 | | 32 | d | D |
| 46 | | 2 | 4 | 8 | | 32 | r | R |
| 47 | 1 | 2 | 4 | 8 | | 32 | 7 | & |
| 48 | | | | | | | | |
| 49 | | | | | | | | |
| 50 | | | | | | | | |
| 51 | | | | | | | | |
| 52 | | | 4 | | 16 | 32 | f | F |
| 53 | 1 | | 4 | | 16 | 32 | u | U |
| 54 | | 2 | 4 | | 16 | 32 | v | V |
| 55 | 1 | 2 | 4 | | 16 | 32 | 3 | # |
| 56 | | | | | | | | |
| 57 | | | | | | | | |
| 58 | | | | | | | | |
| 59 | | | | | | | | |
| 60 | | | 4 | 8 | 16 | 32 | g | G |
| 61 | 1 | | 4 | 8 | 16 | 32 | x | X |
| 62 | | 2 | 4 | 8 | 16 | 32 | m | M |
| 63 | 1 | 2 | 4 | 8 | 16 | 32 | ] | [ |

Fig. 20

INVENTOR.
Lawrence Holmes Jr.
BY
Fryer Tjensvold Feix & Phillips
Attorneys

July 1, 1969 L. HOLMES, JR 3,453,379

COMMUNICATION SYSTEM

Filed July 29, 1965 Sheet 13 of 26

INVENTOR.
Lawrence Holmes Jr.
BY
Fryer, Tjensvold, Feix & Phillips
Attorneys

INVENTOR.
Lawrence Holmes Jr.
BY
[signature]
Attorneys

INVENTOR.
Lawrence Holmes Jr
BY
Fryer Tjensvold Feix Phillips
Attorneys

INVENTOR.
Lawrence Holmes Jr
BY
Fryer Tjensvold Feix & Phillips
Attorneys

July 1, 1969 L. HOLMES, JR 3,453,379

COMMUNICATION SYSTEM

Filed July 29, 1965 Sheet 20 of 26

INVENTOR.
Lawrence Holmes Jr.
BY
Fryer Tjensvold Feix & Phillips
Attorneys

July 1, 1969 L. HOLMES, JR 3,453,379

COMMUNICATION SYSTEM

Filed July 29, 1965 Sheet 21 of 26

| Bi Wt | 1 | 2 | 4 | 8 | 16 | 32 | L/C | U/C |
|---|---|---|---|---|---|---|---|---|
| 0 | | | | | | | | |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |
| 16 | | | | | 16 | | D/S | |
| 17 | 1 | | | | 16 | | Sp | |
| 18 | | 2 | | | 16 | | B/S | |
| 19 | 1 | 2 | | | 16 | | TAB | |
| 20 | | | | | | | | |
| 21 | | | | | | | | |
| 22 | | | | | | | | |
| 23 | | | | | | | | |
| 24 | | | | 8 | 16 | | C/R | |
| 25 | 1 | | | 8 | 16 | | Bl.Rib. | |
| 26 | | 2 | | 8 | 16 | | OFF | |
| 27 | 1 | 2 | | 8 | 16 | | OPEN | |
| 28 | | | | | | | | |
| 29 | | | | | | | | |
| 30 | | | | | | | | |
| 31 | | | | | | | | |
| 32 | | | | | | | | |
| 33 | | | | | | | | |
| 34 | | | | | | | | |
| 35 | | | | | | | | |
| 36 | | | | | | | | |
| 37 | | | | | | | | |
| 38 | | | | | | | | |
| 39 | | | | | | | | |
| 40 | | | | | | | | |
| 41 | | | | | | | | |
| 42 | | | | | | | | |
| 43 | | | | | | | | |
| 44 | | | | | | | | |
| 45 | | | | | | | | |
| 46 | | | | | | | | |
| 47 | | | | | | | | |
| 48 | | | | | 16 | 32 | | U/S |
| 49 | 1 | | | | 16 | 32 | | Sp |
| 50 | | 2 | | | 16 | 32 | | B/S |
| 51 | 1 | 2 | | | 16 | 32 | | TAB |
| 52 | | | | | | | | |
| 53 | | | | | | | | |
| 54 | | | | | | | | |
| 55 | | | | | | | | |
| 56 | | | | 8 | 16 | 32 | | C/R |
| 57 | 1 | | | 8 | 16 | 32 | | Red.Rib. |
| 58 | | 2 | | 8 | 16 | 32 | | BELL |
| 59 | 1 | 2 | | 8 | 16 | 32 | | OPEN |
| 60 | | | | | | | | |
| 61 | | | | | | | | |
| 62 | | | | | | | | |
| 63 | | | | | | | | |

Fig. 35

INVENTOR
Lawrence Holmes Jr.
BY
Fryer Tjensvold Feix & Phillips
Attorneys

INVENTOR.
Lawrence Holmes Jr
BY Fryer Tjensvold Feix & Phillips
Attorneys

INVENTOR.
Lawrence Holmes Jr 3,453,379

COMMUNICATION SYSTEM

Lawrence Holmes, Jr., 108 Jones Blvd., Las Vegas, Nev. 89107

Filed July 29, 1965, Ser. No. 475,728
Int. Cl. H04l 15/34; B41j 3/44; H03k 5/08
U.S. Cl. 178—4.1 14 Claims

ABSTRACT OF THE DISCLOSURE

Binary code signals indicative of print and function operations are generated at a transmitting typewriter in parallel form and converted to serial form for transmission over telephone lines or the like to a receiving typewriter which responds by performing the same operations. At the receiving typewriter the incoming signal is converted to parallel form in a first memory stage and is then transferred to a second memory stage to initiate the typewriter operation represented thereby. Cycling of the receiving typewriter clears the second memory stage to store a subsequent signal while the typewriter is still operating in response to the first signal and while the first stage may be receiving still a third signal. This prevents the transmitting typewriter from over-running the receiving typewriter, in the presence of slight differences in cycling rates, without requiring cumbersome synchronizing equipment. Simplified parallel to serial and serial to parallel conversion circuitry, signal storage circuitry, code discriminator circuitry and other components enable the use of conventional typewriters with little modification and complication and adapt the system for operation by a typist with no special training. The system is compact and inexpensive to adapt to existing typewriters which are primarily used for local typing of correspondence.

The present invention relates to communication systems and more particularly to communication systems which transmit and receive written information by the use of typewriters.

It has long been recognized that there exists a need in the communications field for an inter-office or inter-station written communication system for the smaller businessman who cannot afford the cost of teletype systems presently available.

Several attempts have been made in the past to develop office typewriters capable of communicating with one another over two-conductor transmission systems such as telephone wires. None of the prior art systems which resulted from these attempts, however, have ever found wide-spread acceptance or been put into commercial use. One of the major reasons for the failure of these prior art devices to find acceptance is that they are basically designed to operate in the same way as commercial teletype systems. The portions of these systems which communicate to two or more typing machines employ rotary scanners, clutches, motors and other running mechanisms which require constant maintenance and make a considerable amount of noise. These systems also have the disadvantage of being large and costly.

Because these prior art systems do not depart in basic operation from Teletype systems, they suffer many of the disadvantages of Teletype systems, such as requiring a start signal and a stop signal for each character. This reduces the speed at which information can be transmitted and adds to the possibility of introducing errors into the information.

The present invention teaches a system for transmitting and receiving written messages wherein the system is a basic departure from the various teletype systems presently known in the art. By departing from known teletype designs the present invention is able to offer a system which eliminates many of the disadvantages inherent in prior art systems and for the first time makes available a written communication system which is suitable for the small businessman as well as the giant corporation. The present invention teaches a system of typewriter communication which does not include running mechanism, such as rotary scanners, and does not require start and stop pulses for each character.

The typewriters employed with the present invention are of a certain standard design and their use as an office machine is in no way impaired by the present invention. This enables a secretary to operate the typewriter as a communication transmission device without any special training or skills other than those required to operate the typewriter itself. Also, the initial and operating cost of the present invention is effectively reduced by the ability to use a typewriter as an office machine as well as a communication component.

Accordingly, it is an object of the present invention to provide a system for communicating two typewriters over a binary (two condition) or tertiary (three condition) transmission system.

This object is achieved in the present invention by placing several attachments onto a commercially available typewriter of a certain design (the attachments are all small enough to fit within the standard typewriter housing) whereby the typewriter generates an electrical signal each time it is operated, wherein the electrical signal uniquely identifies the operation which the typewriter is performing. The electrical signal which the typewriter generates is in the form of a six-bit binary character wherein all six bits are generated simultaneously. This signal is then directed to a compact, transmit-receive translator which transforms each character into serial form for transmission over a pair of wires. The transmission lines lead the signals to a second translator which is associated with a receive typewriter. This translator recreates a parallel-form signal from each serial-form signal and directs these signals to the receive typewriter. The typewriter attachments mentioned above enable the typewriter to respond to electrical signals in parallel form by performing the operation which the signal uniquely identifies. By equipping every typewriter to be used with the present invention with both transmit and receive components, and by providing translators capable of transforming parallel signals to corresponding serial signals, and serial signals to corresponding parallel signals, it is possible to transmit from any typewriter and receive with any other typewriter. This enables the typewriters to virtually converse with one another.

Accordingly, it is a further object of the present invention to provide means for generating electrical signals each time a typewriter is operated wherein there is a unique signal for each letter or symbol which the typewriter can print and for each function which the typewriter can perform.

Another object of the present invention is to provide a translator for converting coded information in parallel form into corresponding information in serial form and vice versa.

Yet another object of the present invention is to provide a system for converting information in parallel form to information in serial form, and information in serial form to information in parallel form without using running mechanisms such as rotary scanners and stepping switches and thereby eliminate components which operate noisily, cause errors and require frequent maintenance.

A further object of the present invention is to allow two typewriters to transmit and receive information while cycling at maximum speeds even though the machines have different cycling speeds.

In providing a communication system which is sufficiently reliable to provide accurate operation over prolonged periods of time without requiring constant maintenance and repair, the present invention teaches several new and novel electrical circuits for processing data. Many of these circuits will be recognized as having utility outside of the communications field and with devices other than typewriters.

Further and more specific objects and advantages of the present invention will be made apparent in the following specification wherein a preferred form of the invention is described by reference to the accompanying drawings.

Figures 7, 19:
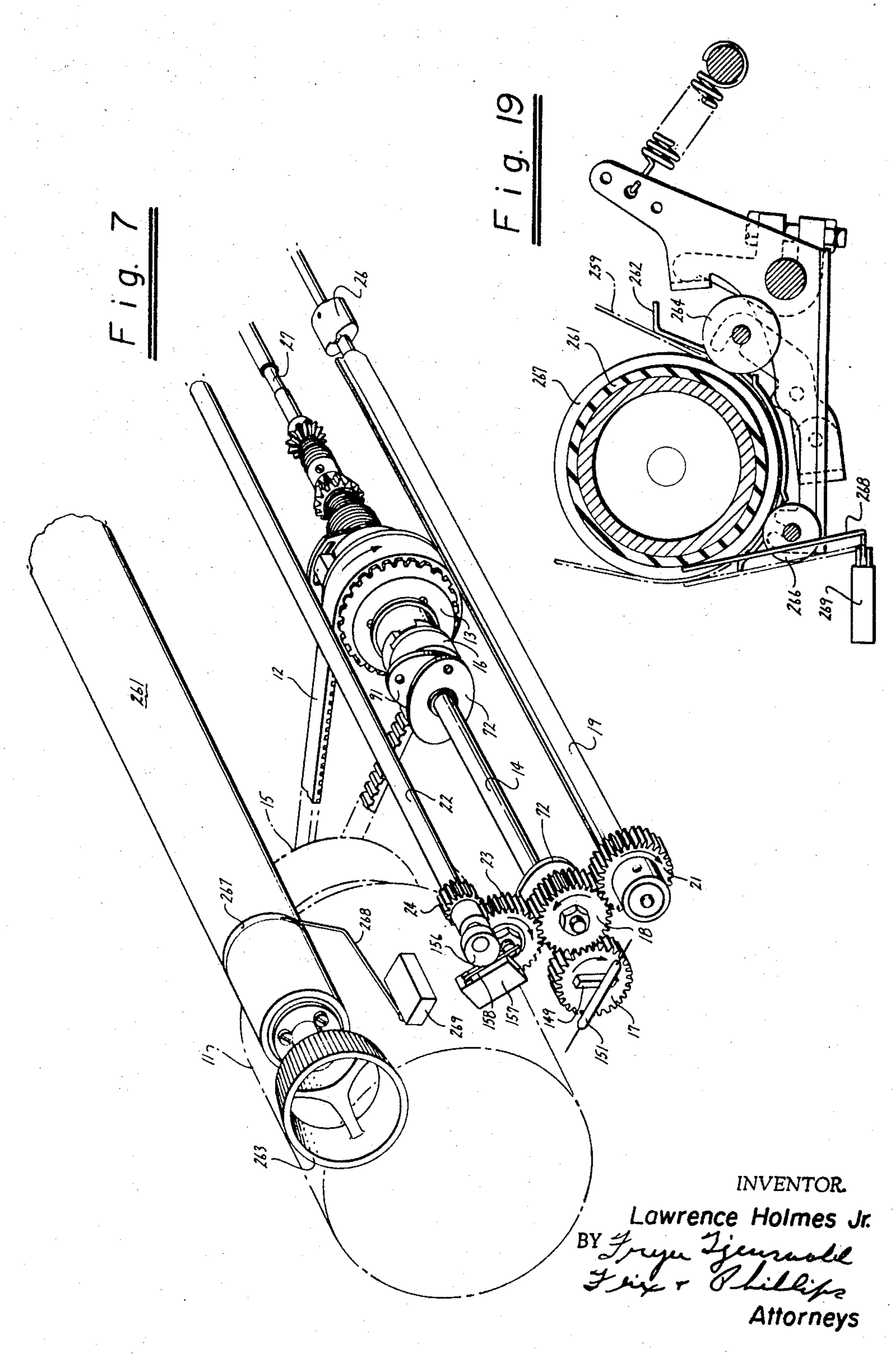
FIG. 7 is a perspective illustration of a typewriter platen in relation to the typewriter drive system.
Figures 10, 10A, 10B:
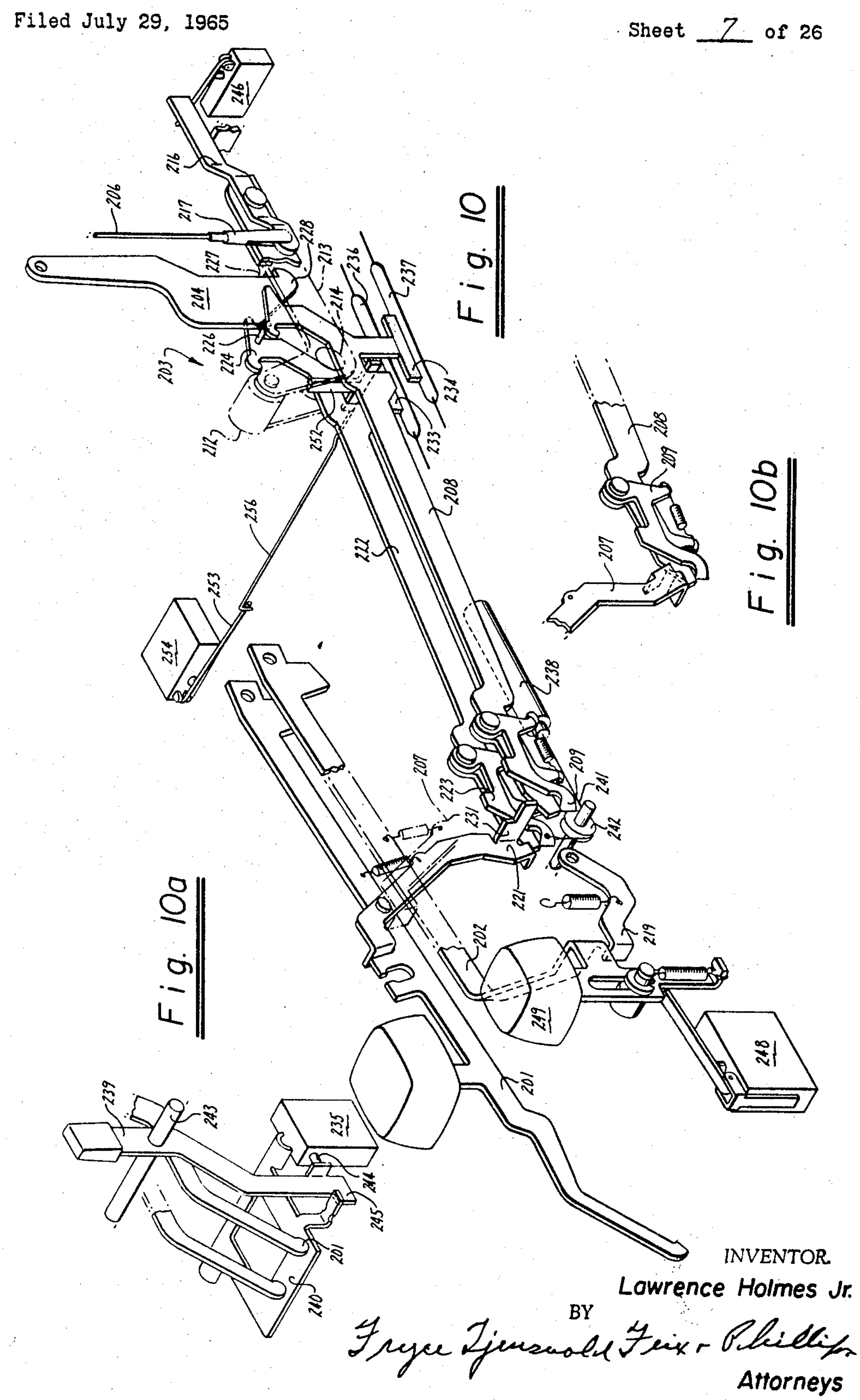
FIG. 10 is a perspective illustration of a typewriter carrier return and index control mechanism as modified by the present invention.
Figures 11, 11A:
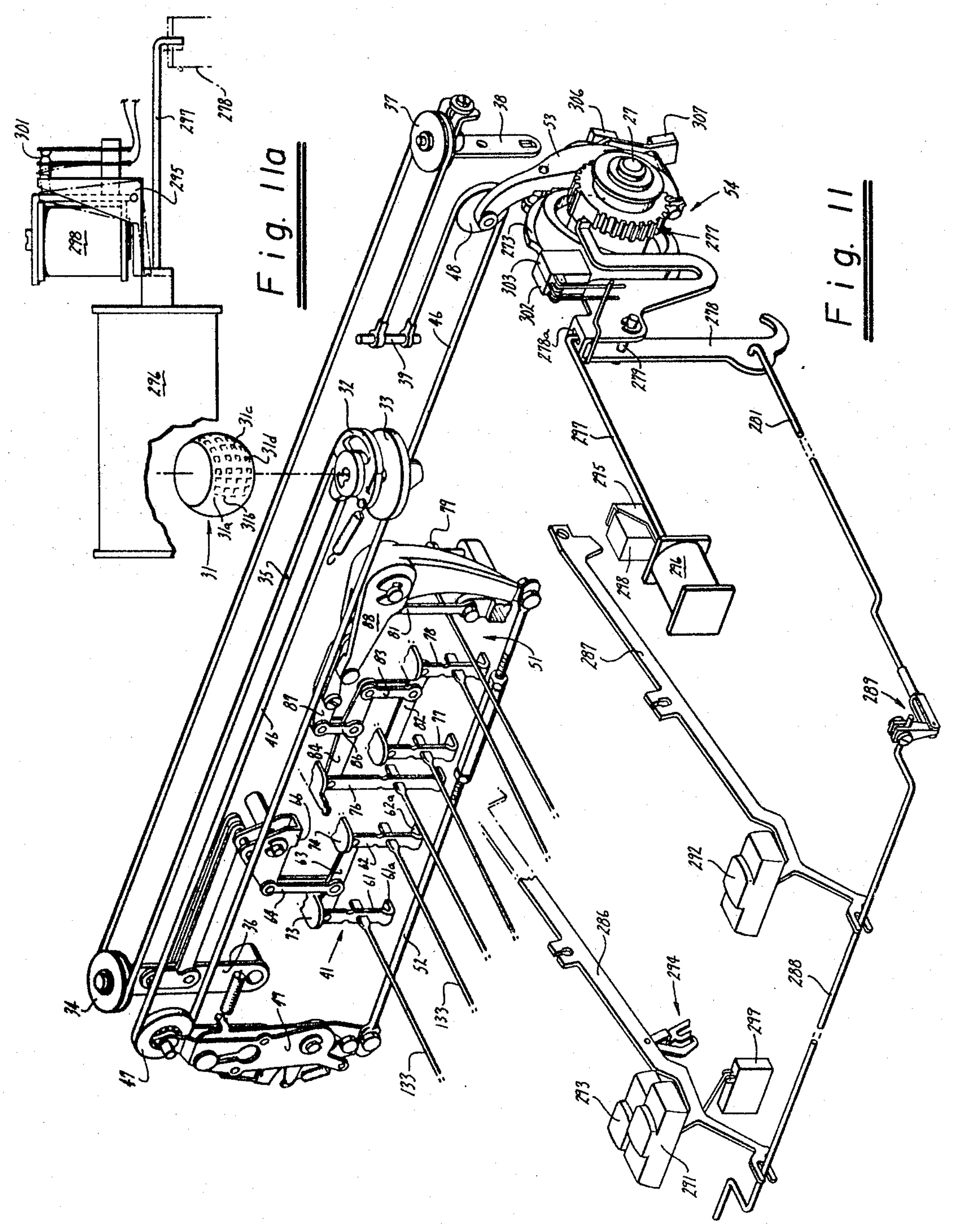
Figure 12:
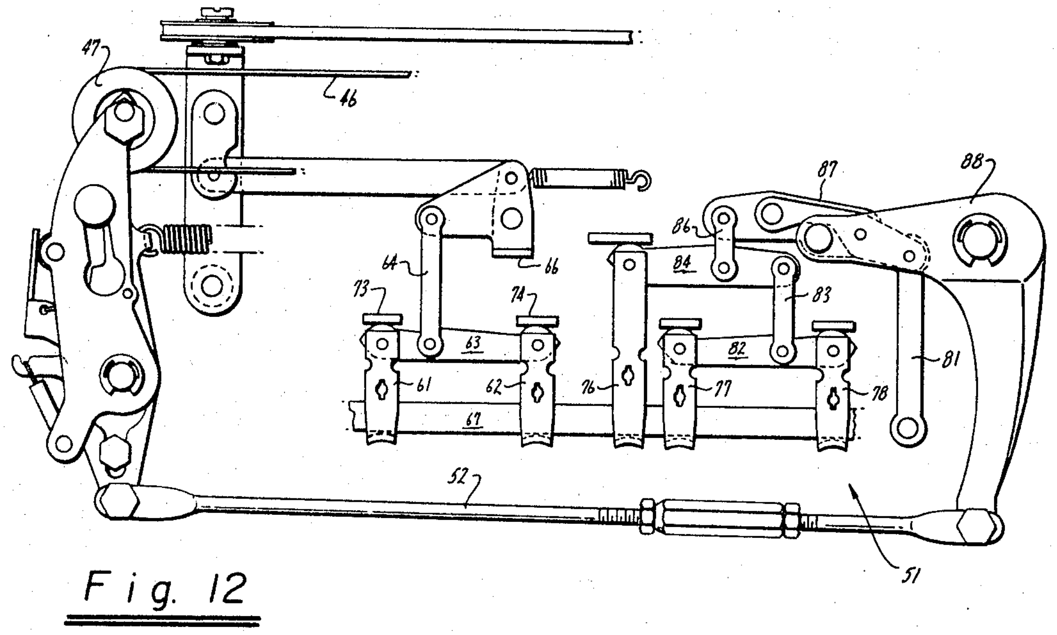
Figure 13:
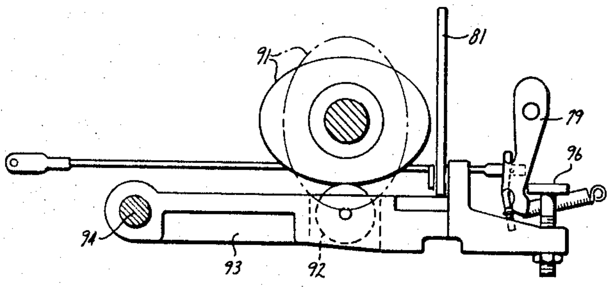
Figure 14:
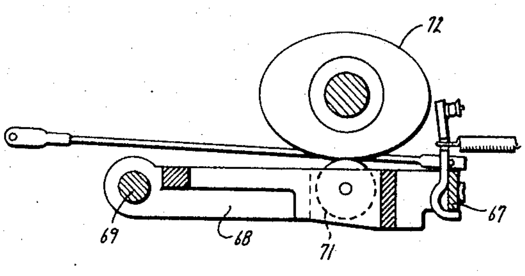
Figure 15:
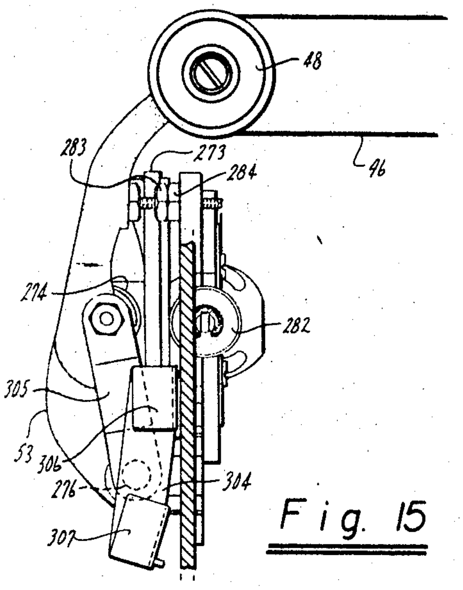
Figure 16:
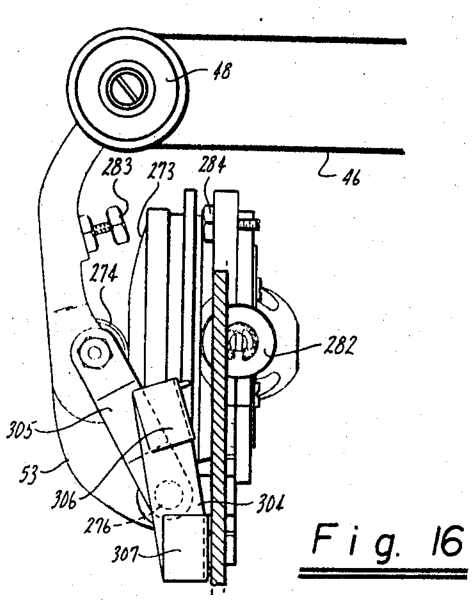
Figure 39:
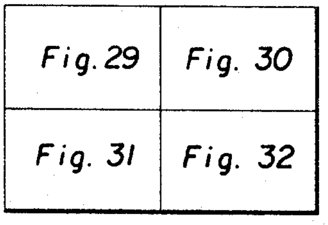
Figure 17:
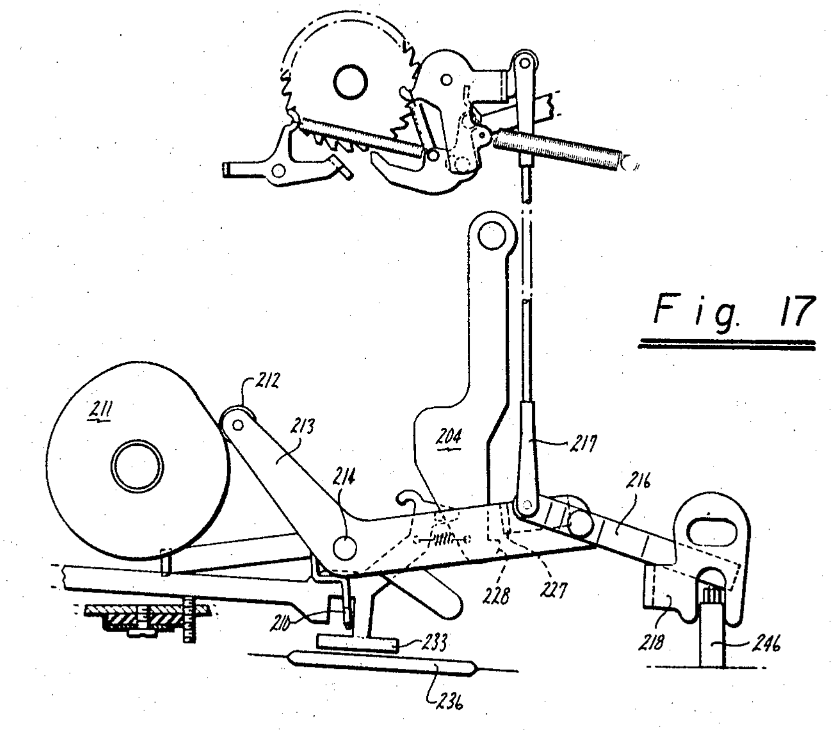
Figure 18:
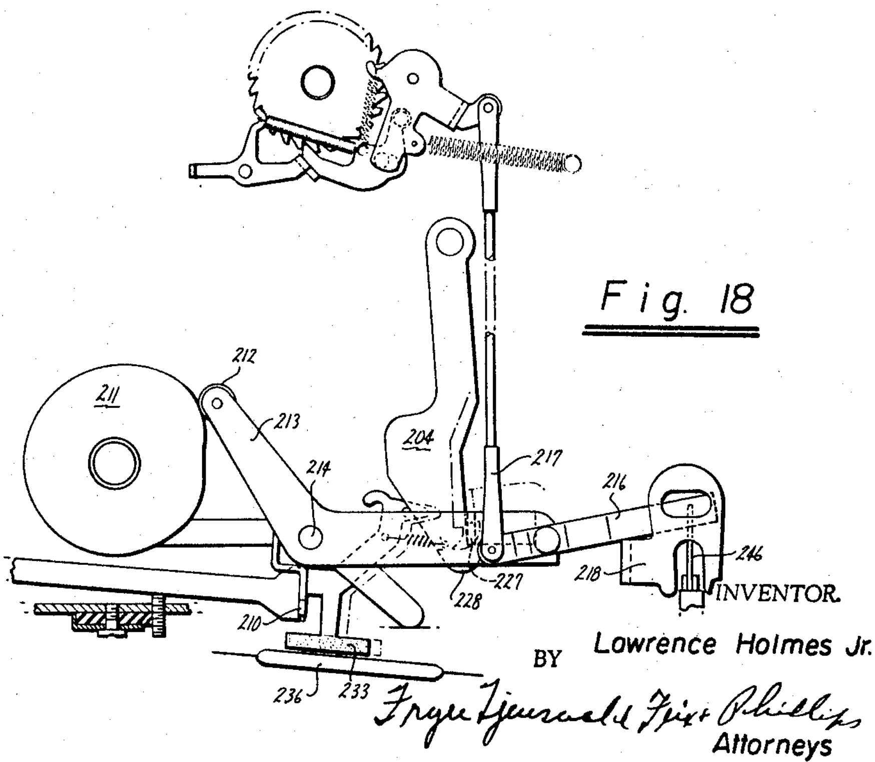
Figure 21:
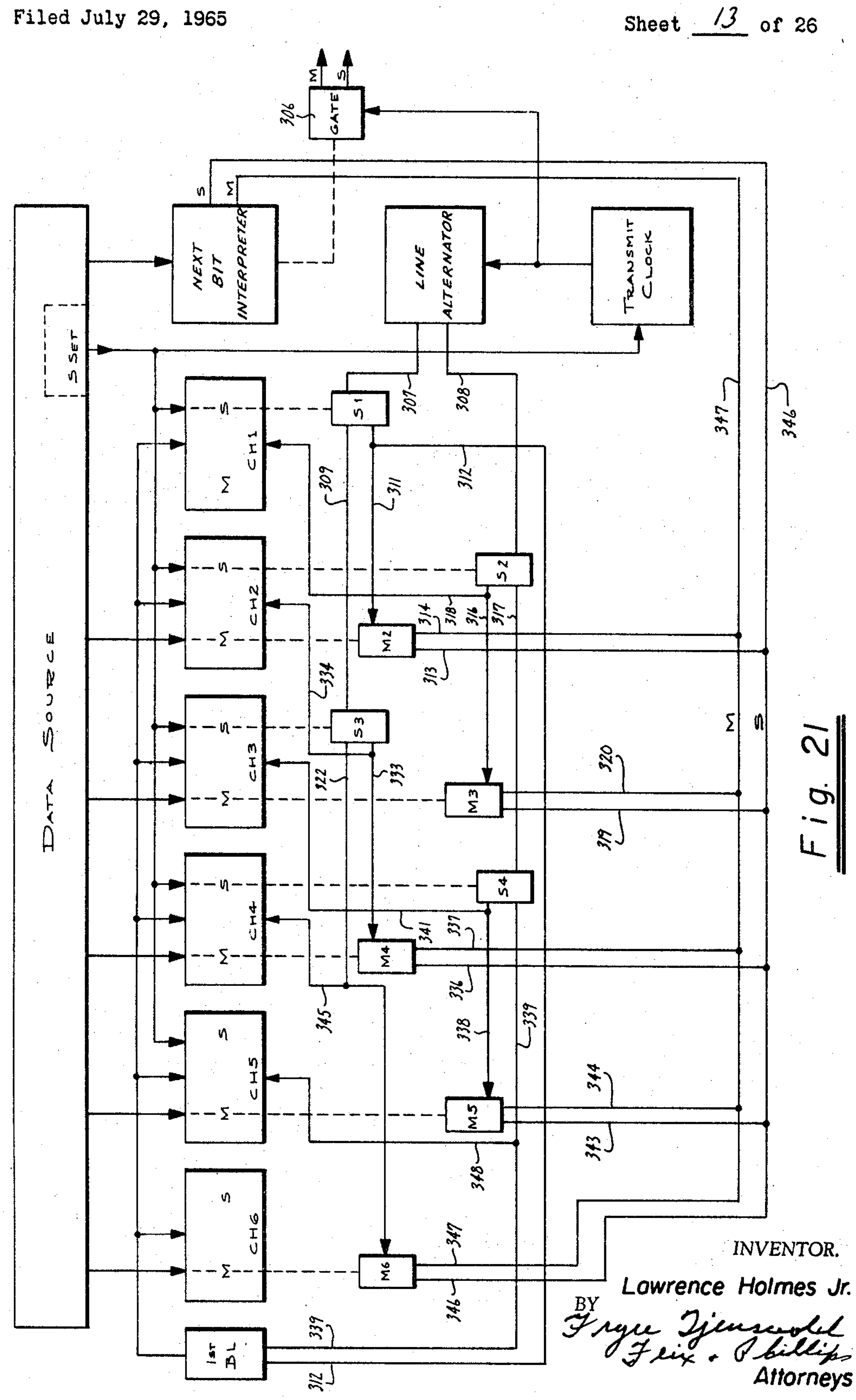
Figure 38:
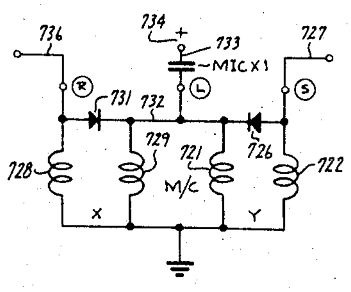
Figure 29:
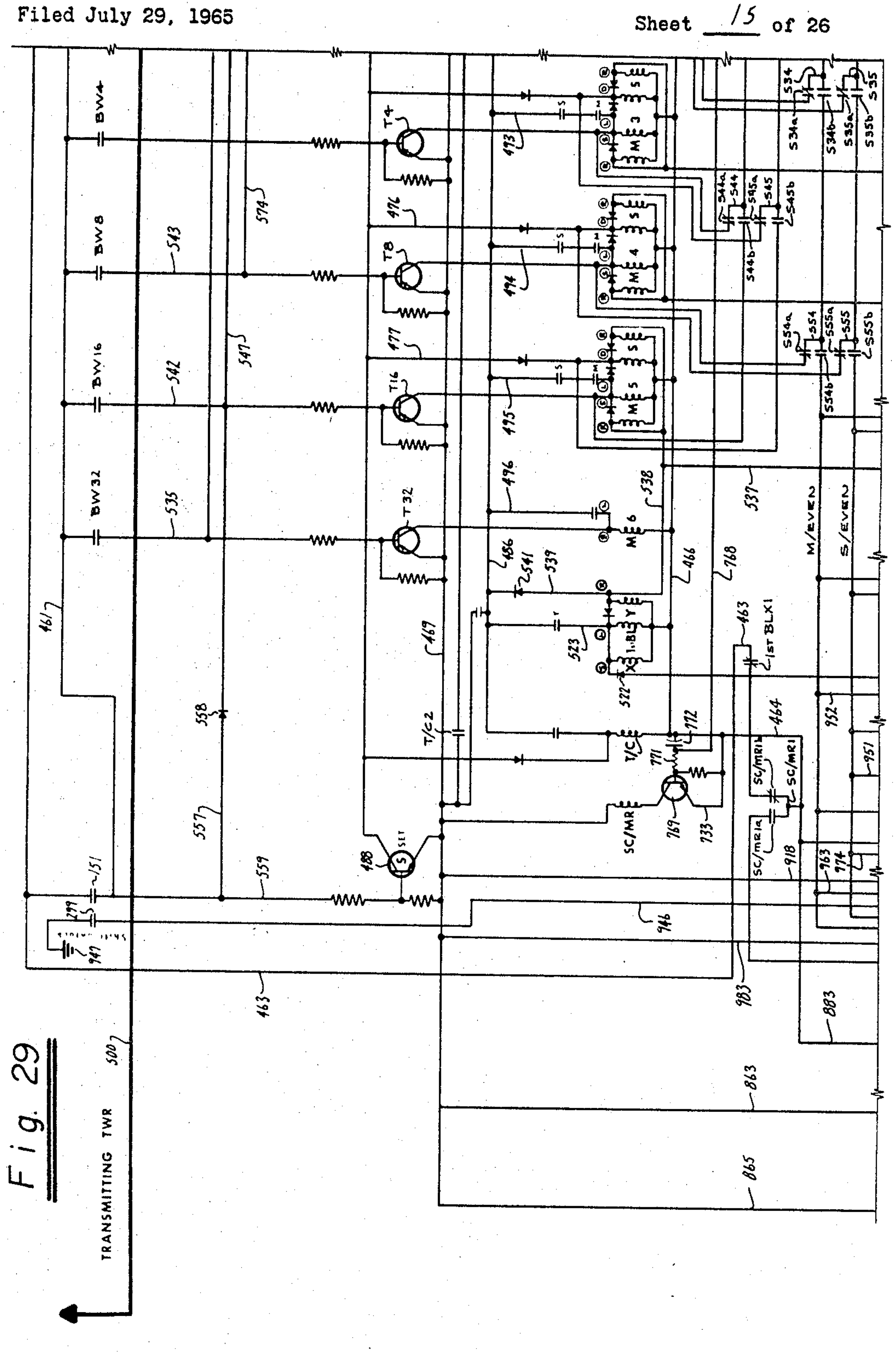
Figure 30:
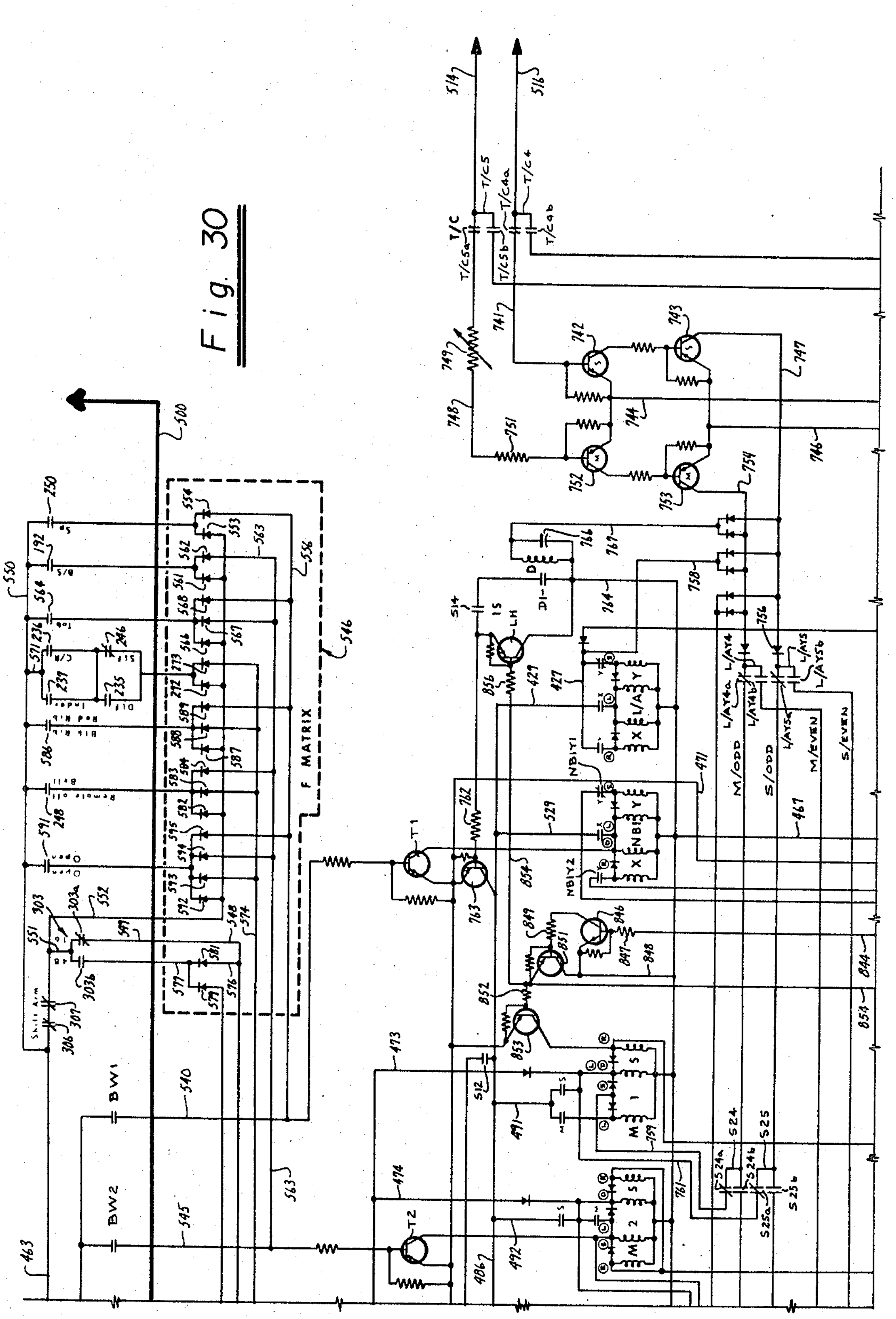
Figure 31:
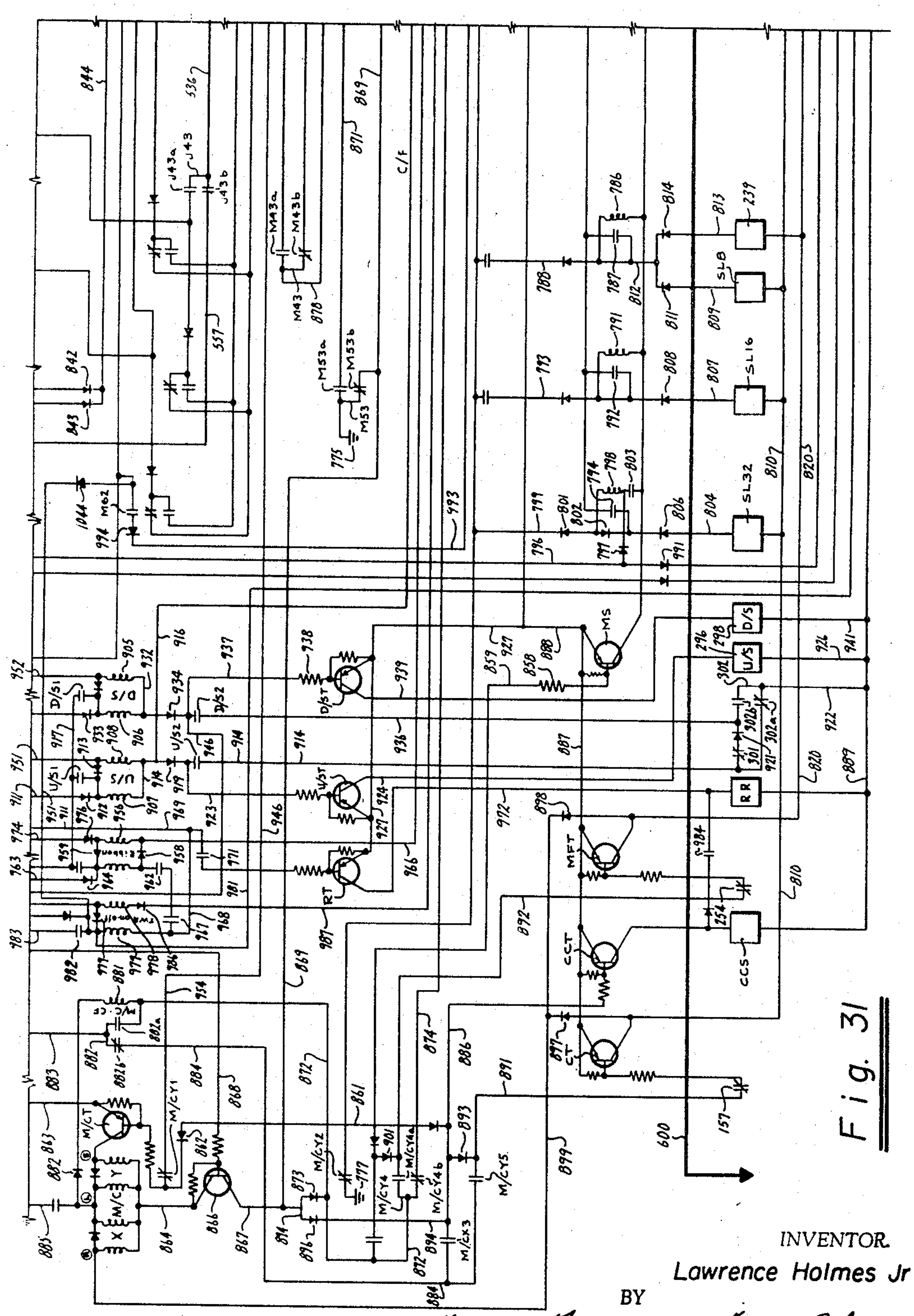
Figure 32:
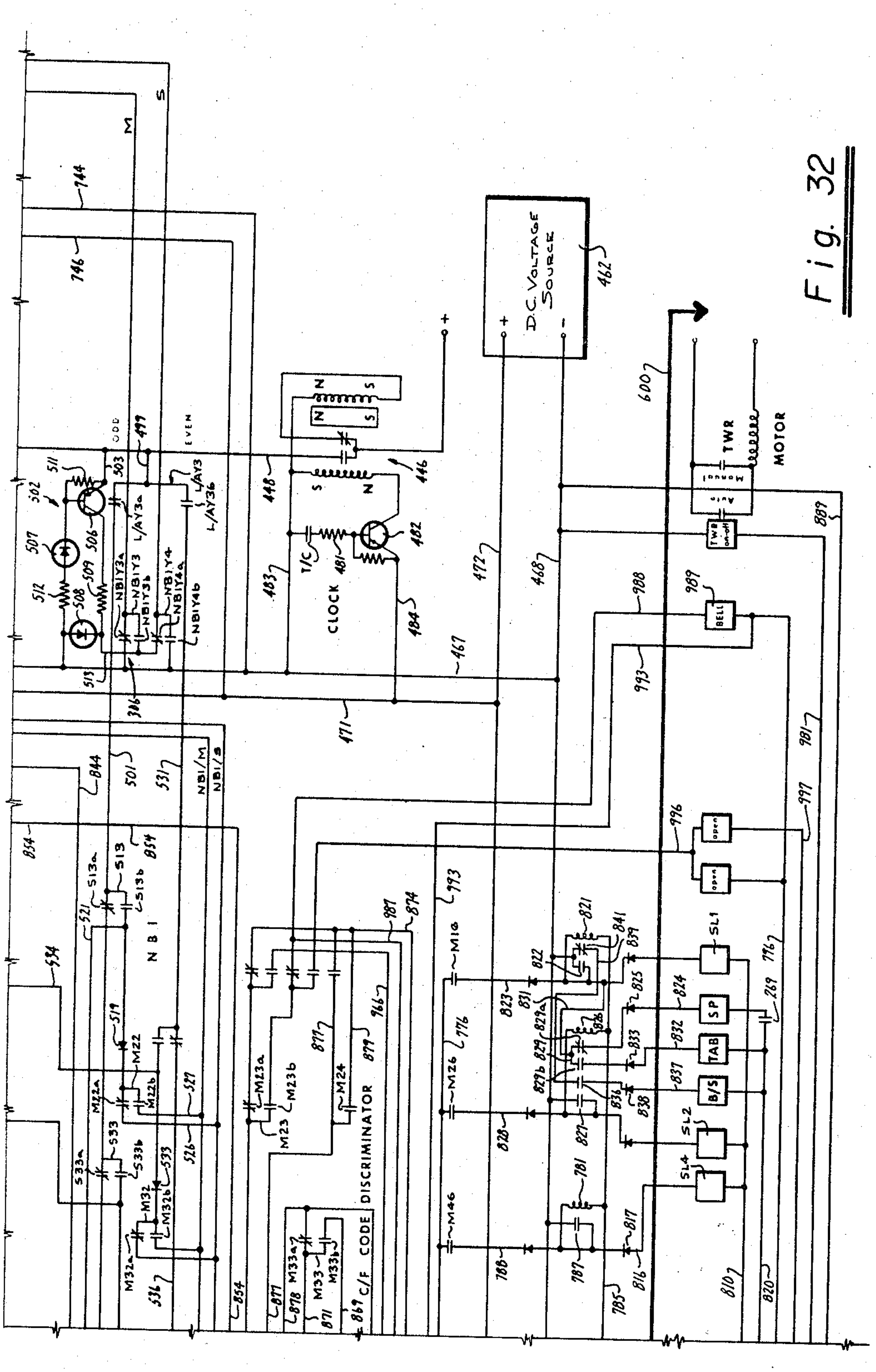
Figure 33:
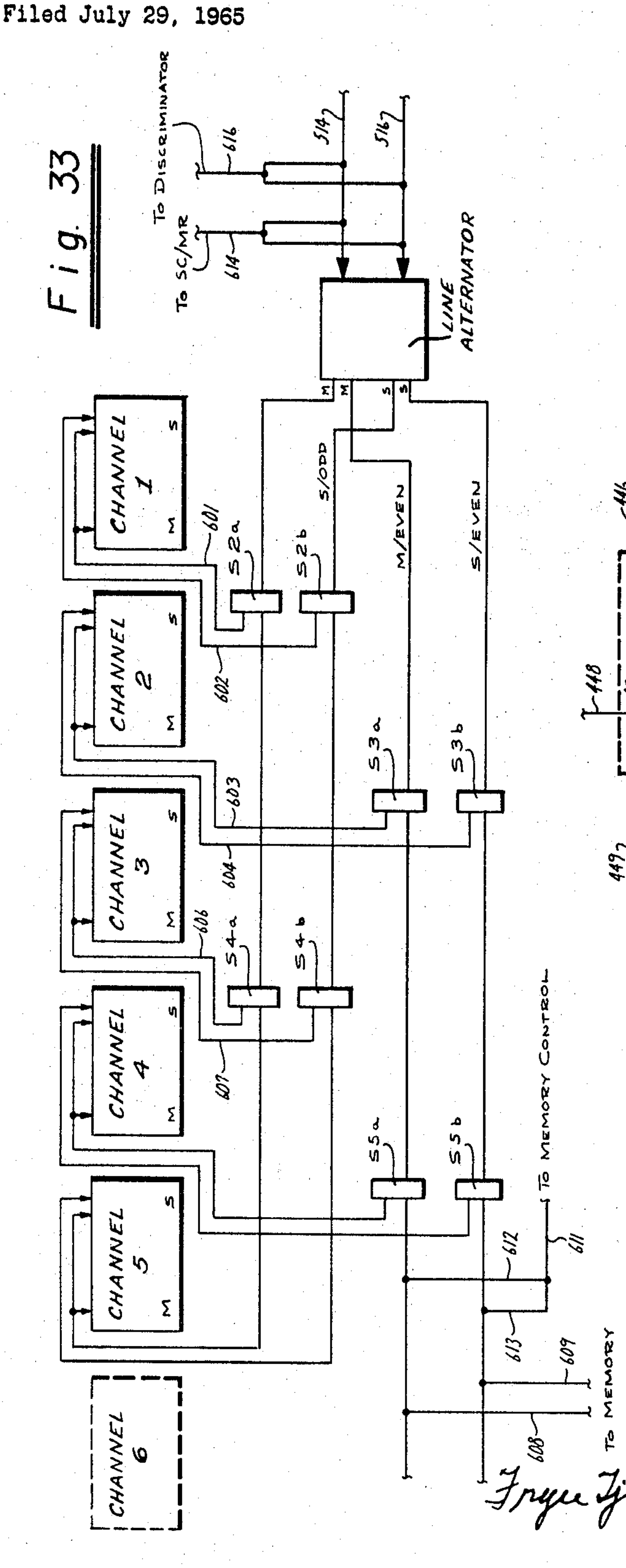
Figure 34:
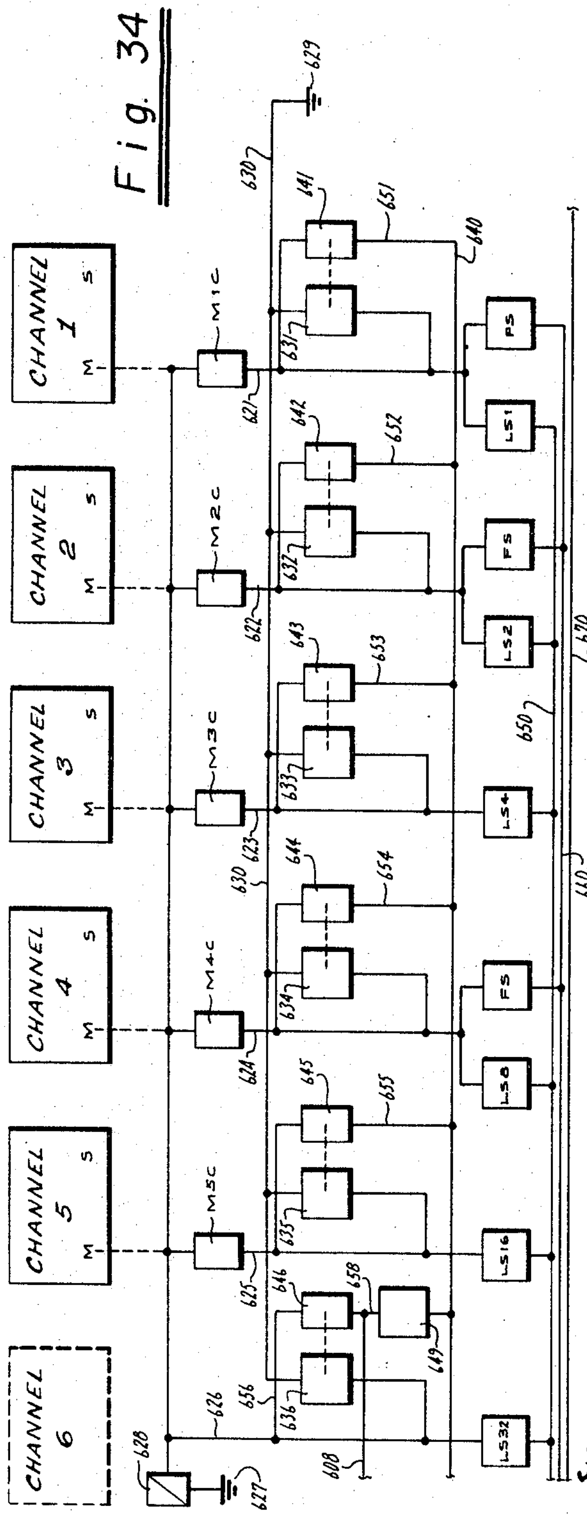
Figure 36:
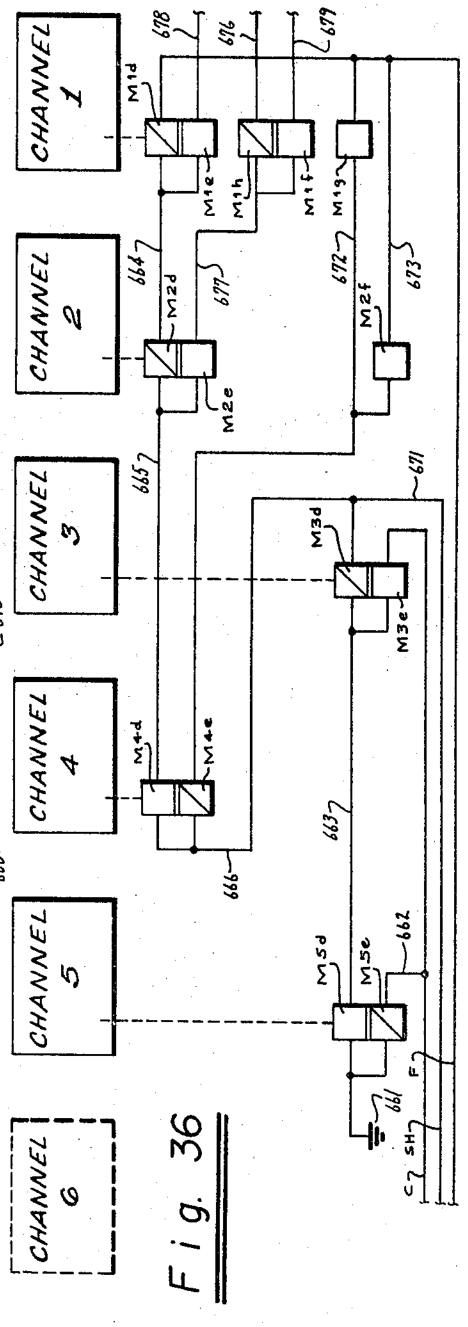
Figure 37:
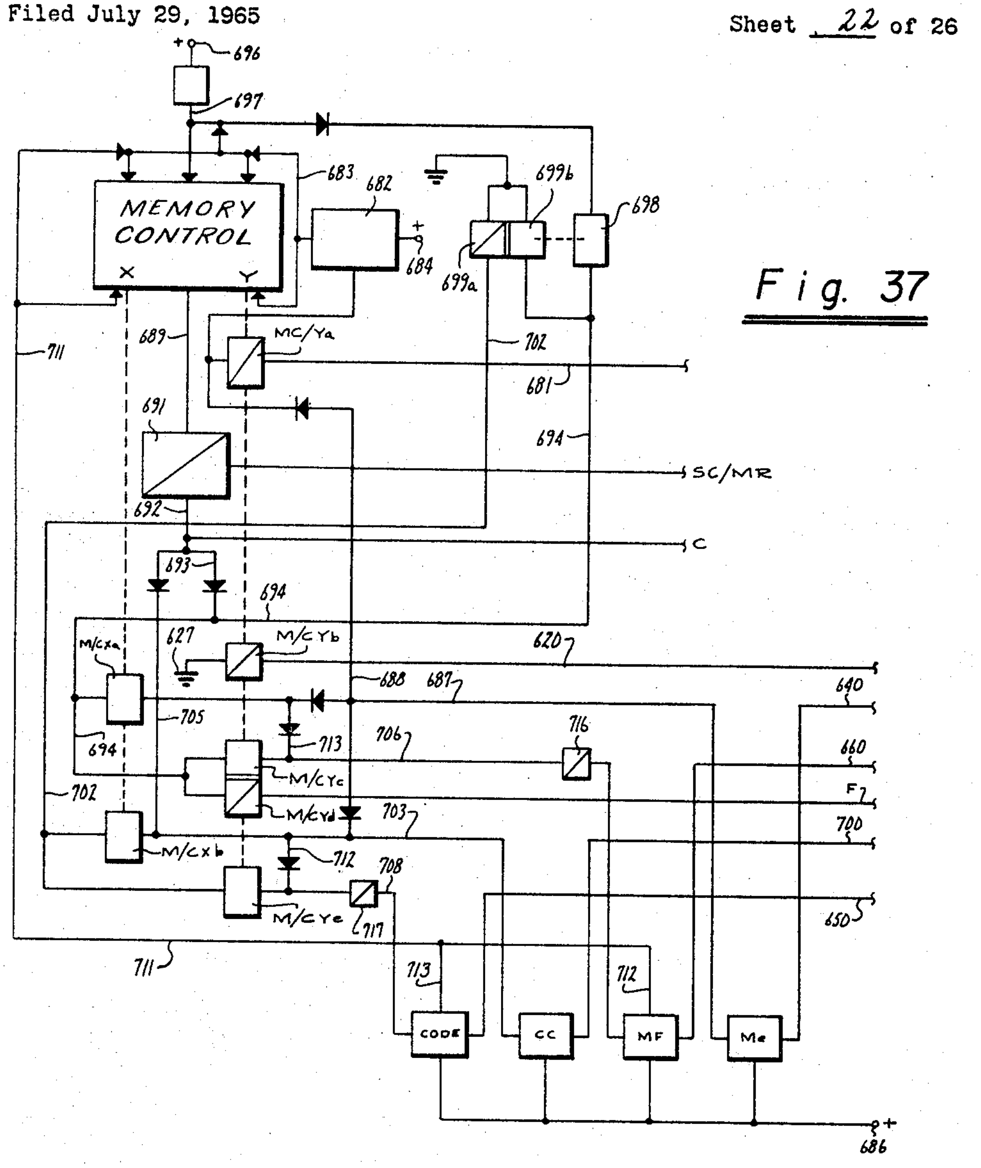
Figure 41:
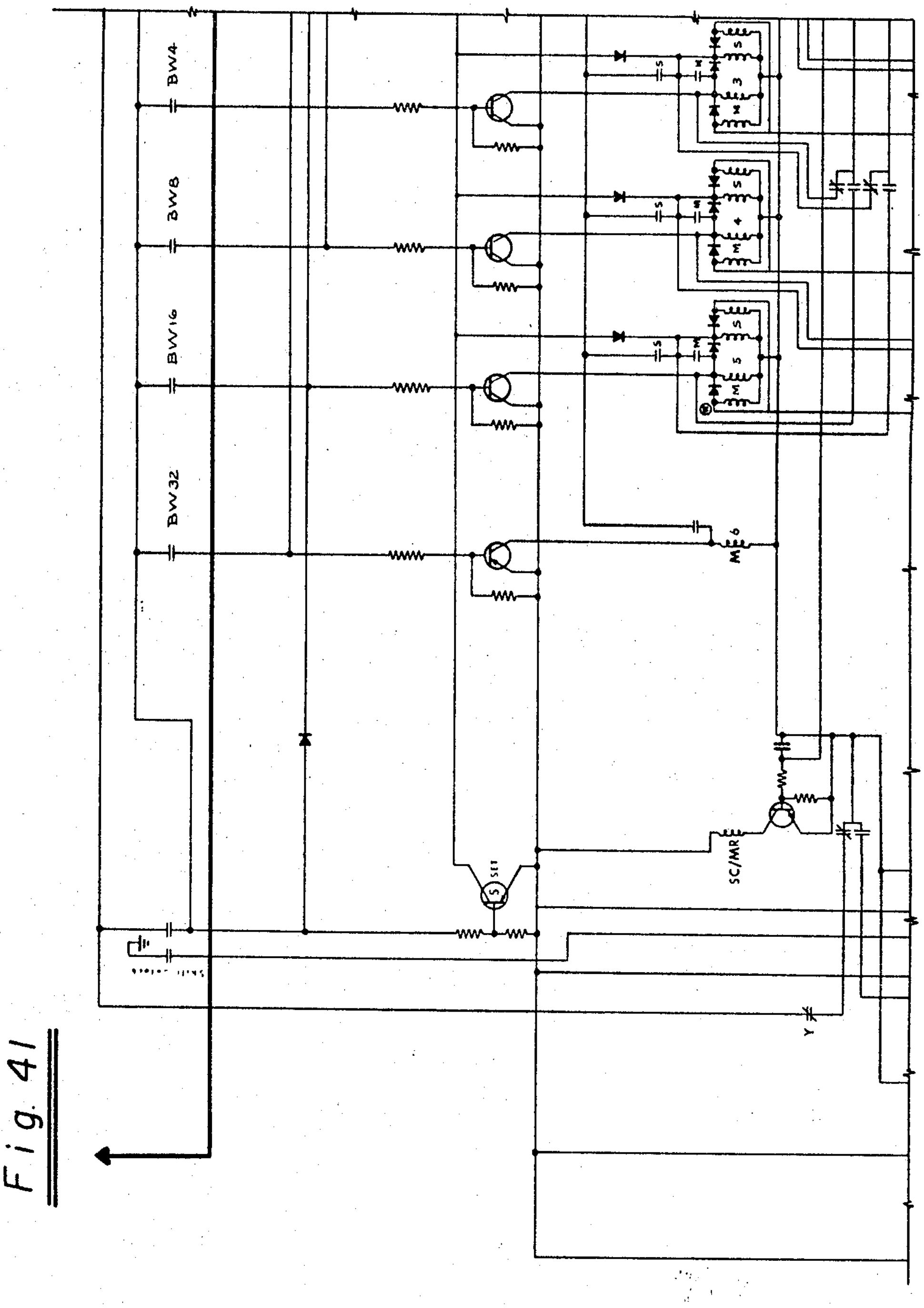
Figure 42:
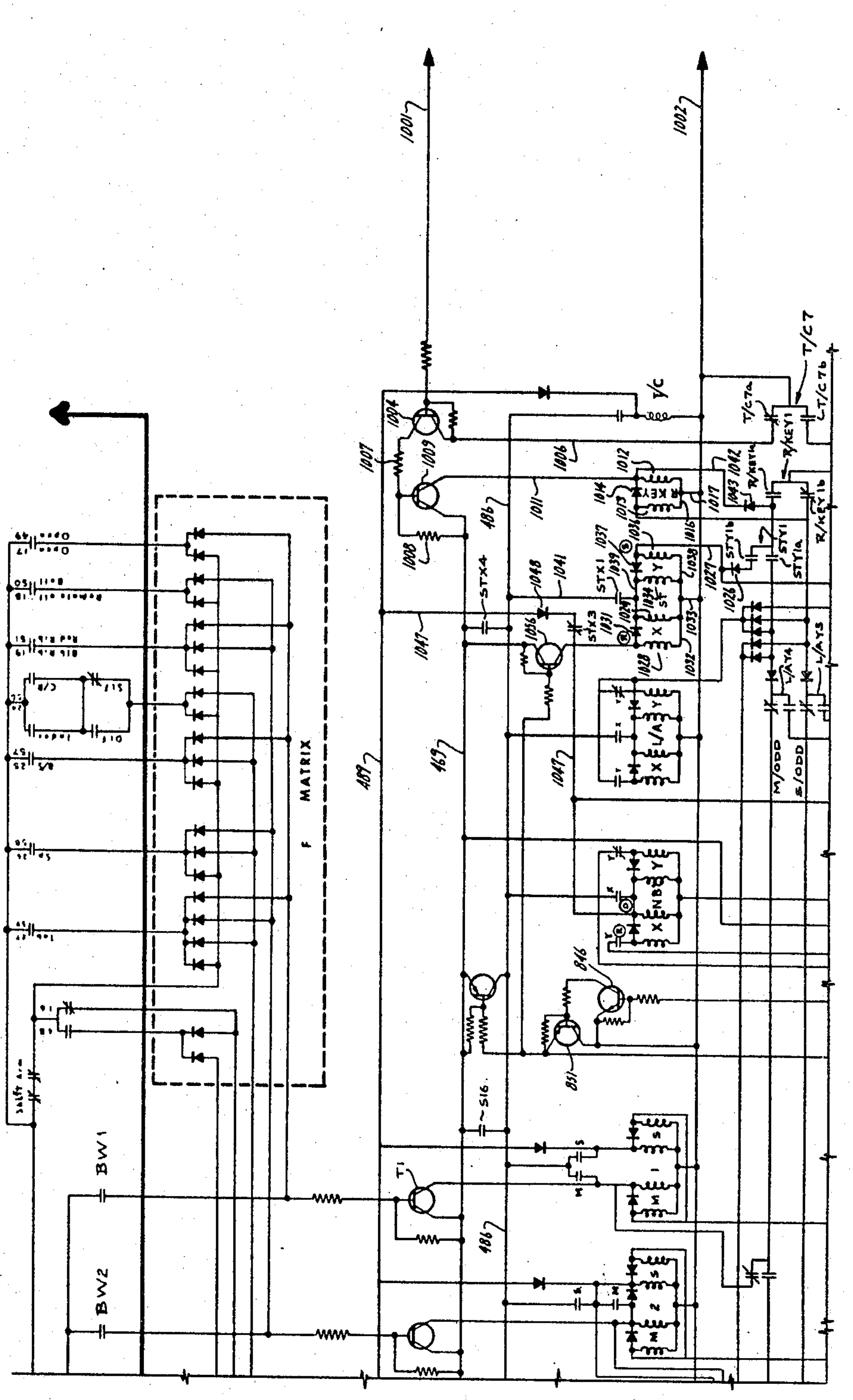
Figure 43:
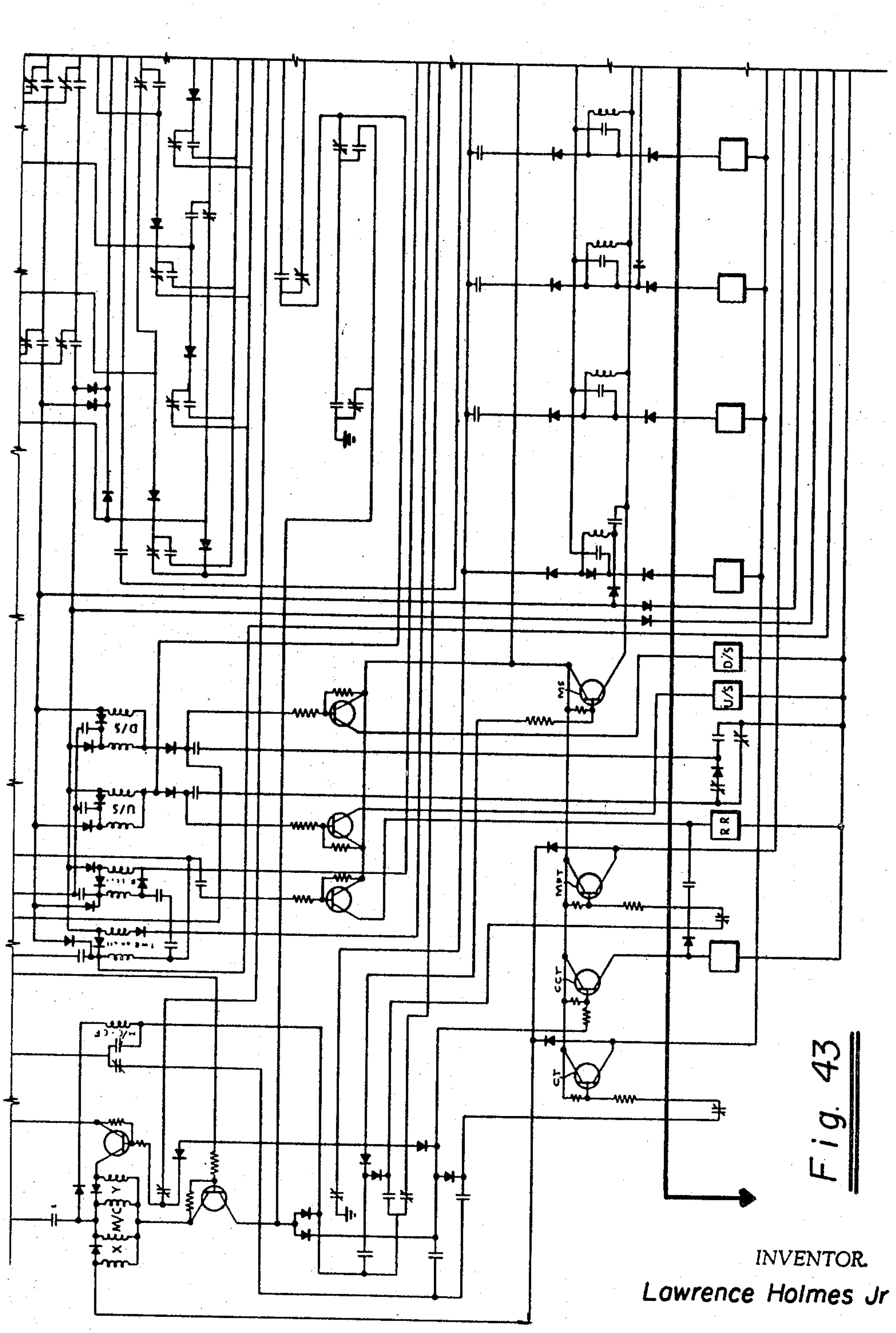
Figure 44:
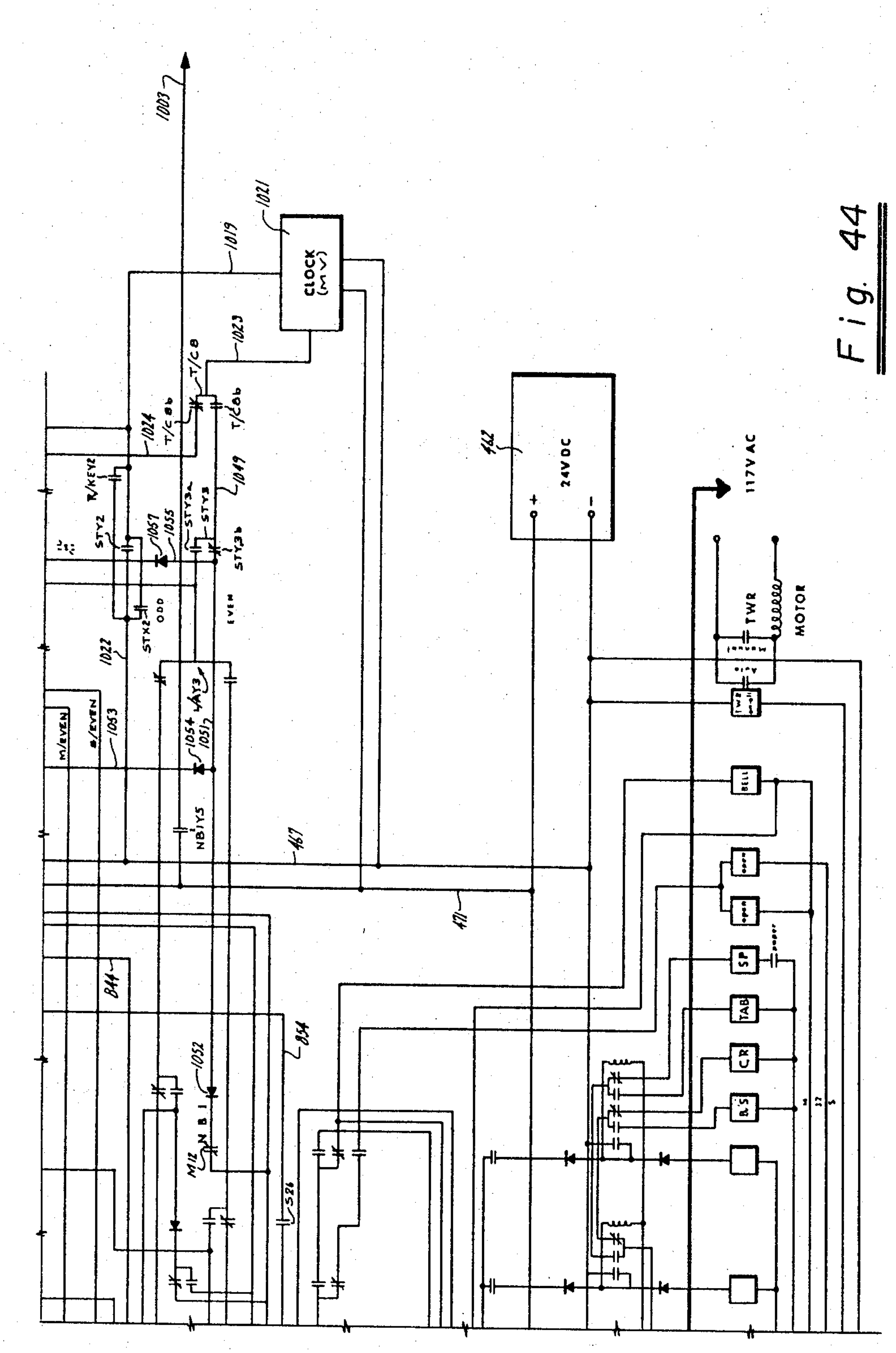

FIG. 10*a* is a perspective illustration of a line-feed control mechanism;

FIG. 10*b* is a portion of FIG. 10 set out alone for purposes of clarity;

FIG. 11 is a perspective illustration of portions of a typewriter character selection mechanism and case shift mechanism as modified by the present invention;

FIG. 11*a* is an enlarged side view of a portion of the case shift mechanism illustrated in FIG. 11;

FIG. 12 is a front view of a portion of a typewriter character selection mechanism;

FIGS. 13 and 14 are side views of portions of a typewriter character selection drive mechanism;

FIGS. 15 and 16 are side views of a typewriter case shift mechanism as modified by the present invention;

FIGS. 17 and 18 are side views of a typewriter index mechanism as modified by the present invention;

FIG. 19 is a vertical section through the platen of a typewriter paper feed mechanism as modified by the present invention;

FIG. 20 is a code chart for typewriter characters and symbols;

FIG. 21 is a block diagram illustrating the logic of the transmit portion of the present invention;

FIGS. 22–28 are electrical schematic illustrations of various sub-circuits;

FIGS. 29–32 are portions of an overall electrical schematic illustration of the present invention and are related to each other as shown in FIG. 39;

FIG. 33 is a block diagram illustrating the logic of the input portion of the receiver of the present invention;

FIG. 34 is a block diagram illustrating the logic of the memory portion of the receiver of the present invention;

FIG. 35 is a code chart of the function operations of a typewriter of the present invention;

FIG. 36 is a block diagram illustrating the logic of the C/F code discriminator portion of the receiver of the invention;

FIG. 37 is a block diagram illustrating the logic of the memory control portion of the receiver of the invention;

FIG. 38 is an electrical schematic illustration of a subcircuit; and

FIG. 39 is a block diagram showing the relationship of FIGS. 29–32 to one another.

Figure 40:
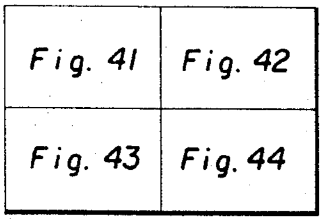

FIG. 40 is a block diagram showing the relationship of FIGS. 41–44 to one another; and FIGS. 41–44 are portions of an overall electrical schematic illustration of an alternate embodiment of the present invention.

INTRODUCTION

Figure 1:
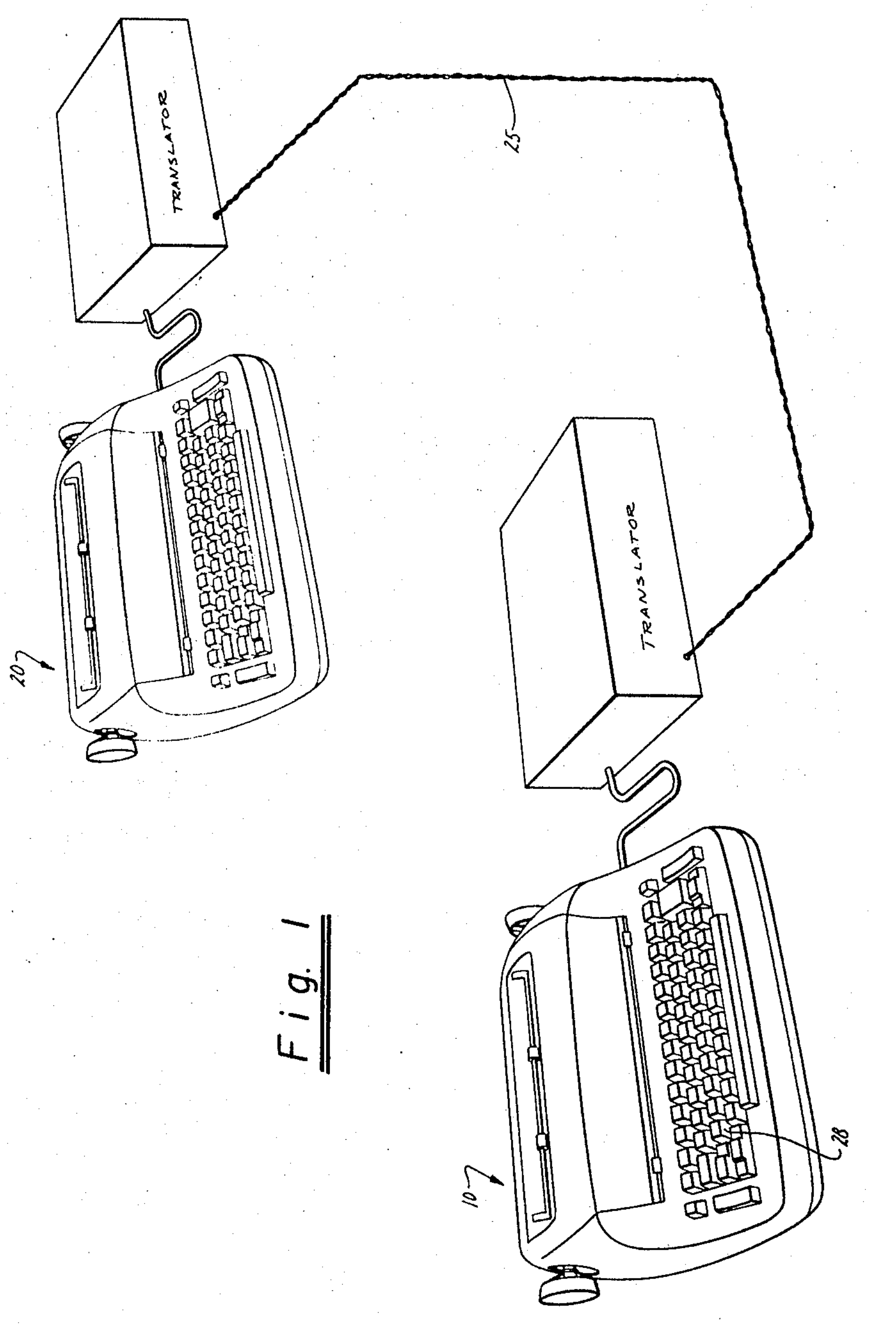
FIG. 1 is a perspective illustration showing the main components of a typewriter communication system as taught by the present invention.

Referring to FIG. 1, the present invention is designed to enable a typewriter 10 to operate one or more remotely located typewriters 20 wherein the typewriters are interconnected by a two-wire transmission system 25. Accordingly it is necessary that the transmit typewriter generate an electrical signal each time it operates to print a character or perform a function operation (i.e. space, backspace, carrier return, index, case shift, etc.). The information which is contained in the electrical signal generated by the typewriter is transmitted over the two-line transmission system to a remote typewriter which is designed to respond to that particular electrical signal by performing an operation which corresponds to the operation which generated the signal. Accordingly, it is necessary to provide a typewriter with electrical signal generating capabilities.

Typewriters which generate a separate and distinct electrical signal for each distinct operation which they perform are known in the art and are capable of operation with the present invention. The electrical signal generating typewriters which are presently known in the art, however, are standard electric typewriters which are extensively modified. As a result, these typewriters are bulky and expensive. The present invention teaches an improved signal generating typewriter which takes advantage of a characteristic found only in the IBM electric typewriter known as the Series 72 Electric Typewriter and commonly referred to as the IBM Selectric. This typewriter is characterized by a type head which carries all of the characters which the typewriter prints. This generally spherically-shaped type head is mounted on a mechanism which enables the head to be tilted and rotated to any one of the 88 unique positions which the head can assume. The mechanism which relates a particular keybutton 28 with one of the 44 lower-case or 44 upper-case head positions includes six latches which are used to generate a six-bit binary code in the form of an electrical pulse signal. While all of the typewriter operations which result in the printing of a letter or symbol include the operation of the latches mentioned above, the functions operations which are also necessary in operating a typewriter do not include the operation of the six latches, and thus special means must be provided to generate identifying codes for function operations.

Since it is most advantageous for a single typewriter to be capable of operating as a receiver as well as a transmitter it is necessary to equip the typewriter with means by which the typewriter can be made to operate in response to electrical signals.

Thus, the first portion of the description is directed to those attachments which the present invention adds to an IBM Selectric typewriter to make the typewriter identify each operation it performs by generating an identifying electrical pulse signal, and to enable the typewriter to be operated by electrical signals. Since typewriters of the present invention are designed to respond to electrical signals as well as generate them, a particular typewriter can only be identified as a transmit device or receive device on the basis of the particular function it is performing at any given time, and not by any inherent limitation. As previously mentioned, the IBM Selectric typewriter is advantageously adapted for use with the present invention without extensive modifications. The IBM typewriter, itself, however, is of a well-known design and no portion of the description relating purely to typewriters as writing machines forms a part of the present invention. The primary reason for the somewhat detailed description of the components of the IBM Selectric typewriter and their operation is to enable a better understanding and appreciation for the novel attachments taught by the present invention, which do form an important part of the present invention.

TYPEWRITER OPERATIONS AND MODIFICATIONS

Referring now to FIG. 7, an electric typewriter motor 11 operates through a motor clutch 15 and a drive belt 12 to provide the typewriter with the power necessary to carry out a selected print operation or function operation. The drive belt 12 operates over a drive pulley 13 which is connected to a cycle shaft 14 through a cycle clutch 16. When the motor 11 is energized and operating, it continuously drives the pulley 13, but only rotates the shaft 14 when clutch 16 is conditioned to transmit torque. Mounted between the ends of shaft 14 are a plurality of cams 72, 91 the operation and function of which will be described in detail below. Secured to the end of shaft 14 is a gear 17 which meshes with a gear 18 that drives a filter shaft 19 through gear 21. The gear 17 also drives a print shaft 22 through an idler gear 23 and print shaft gear 24. Thus, each time a print cycle is initiated by a keybutton 28 being depressed the motor 11 drives the cycle shaft 14 which results in the filter shaft 19 and the print shaft 22 being driven for as long as the cycle clutch 16 connects the pulley 13 to the shaft 14. An escapement cam 26 on the filter shaft 19 initiates a function operation (space) to accompany each print operation and provides the only function operation which is initiated through the cycle clutch 16.

An operational cam shaft 27 also communicates with the drive pulley 13 and serves as the connection between the source of power 11 and those mechanisms which perform the various function operations.

As previously mentioned, the IBM Selectric typewriter has a print mechanism the operation of which is basically different than the more commonly known typewriters which employ a large number of individual key bars. In the more conventional typewriter paper is held to a platen which is secured on a carriage which is movable past a given fixed location at which a selected type bar strikes the paper. The IBM Selectric typewriter employs a stationary platen for the paper and has a carrier which supports a type head that moves relative to the paper. The type is all located on the type head and by properly positioning the type head relative to the paper prior to having the type head strike the paper, a selected character or symbol is printed. The type head has four rows of characters with all lower case characters on one hemisphere and all upper case characters on the other hemisphere. In order for a selected character to be printed it may be necessary to both rotate and tilt the type head. The mechanisms which perform these functions are best shown on FIG. 11.

(a) Character and symbol selection and print mechanism

Figures 8, 9:
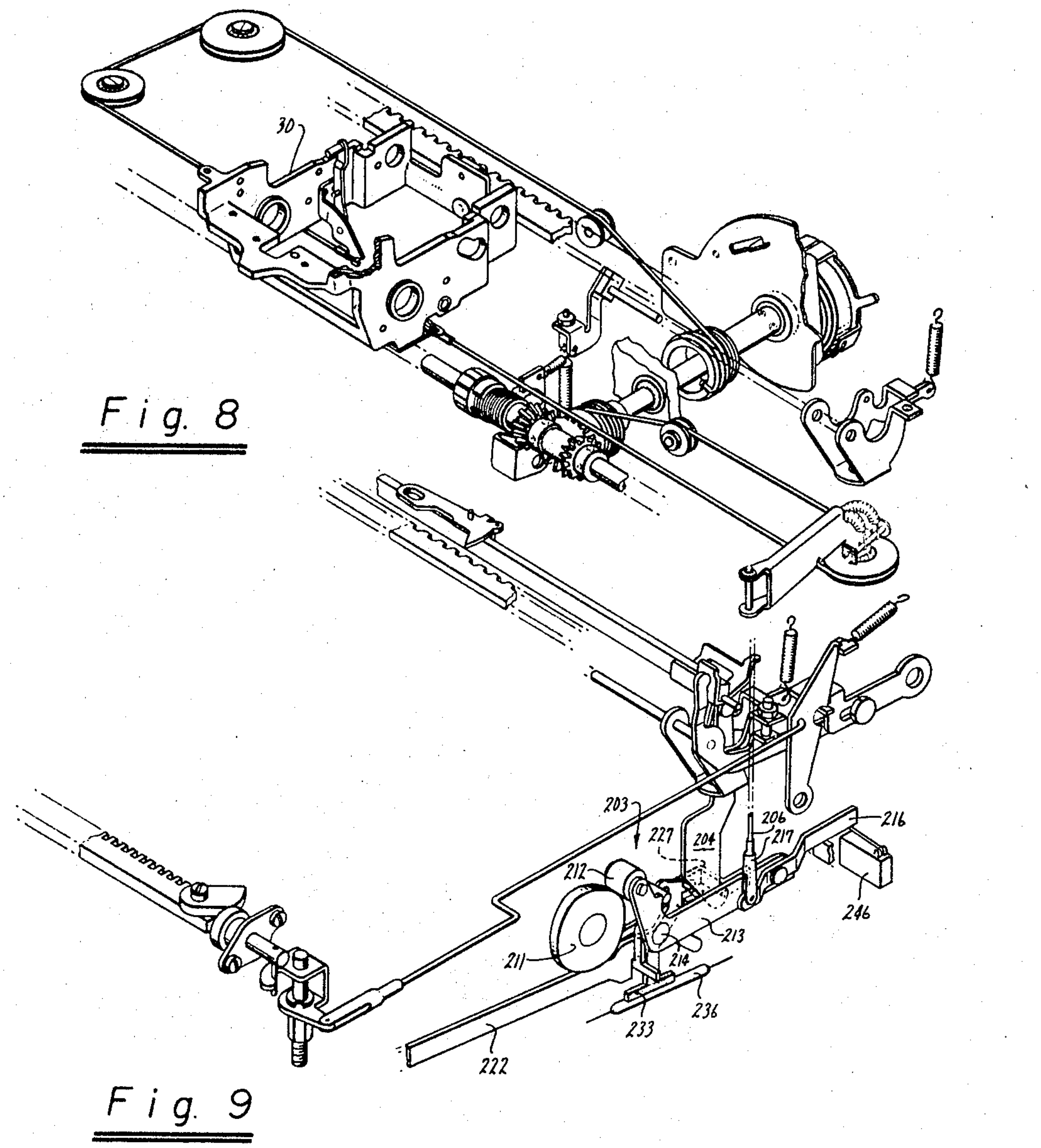
FIG. 8 is a perspective illustration of a typewriter carrier mechanism.
FIG. 9 is a perspective illustration of a portion of the carrier mechanism shown in FIG. 8 together with control mechanism therefor as modified by the present invention.

A type head 31 is connected (through mechanism not shown) to a tilt pulley 32 and a rotate pulley 33. Secured to the tilt pulley 32 is a steel band tilt tape 35. The tape 35 extends around a pulley 34, which is mounted on a movable tilt arm 36, over a second pulley 37 which is mounted on a stationary arm 38. The end of the tape is anchored to a shaft 39 which is secured to a movable carrier 30 (see FIG. 8) on which the head 31 and pulleys 32 and 33 are mounted. Since both ends of tilt tape 35 are secured to the movable type head carrier 30, movement of the carrier does not by itself change the angular position of the tilt pulley 32. The angular position of the tilt pulley 32 is a function of the position of the tilt arm 36, which in turn is a function of the tilt mechanism 41. When the tilt mechanism 41 operates to change the tilt position of the type head 31 the tilt arm 36 is positioned to change the distance between pulleys 34 and 37. The change in distance between these two pulleys is compensated for by rotation of the tilt pulley 32 which produces a tilt movement of the head 31.

Secured to the rotate pulley 33 is a rotate tape 46 which extends over a rotate arm pulley 47 and a shift arm pulley 48 before being secured to the shaft 39. The shift arm pulley 48 is stationary except when a shift operation occurs and thus for the purpose of this discussion can be considered as stationary. The pulley 47 mounted on the rotate arm 49 is movable (along with the rotate arm) and provides the means for rotating the head 31 in much the same manner as movement of arm 36 resulted in tilt rotation of the head 31. Rotate mechanism 51 operates through a rotate link 52 to position the rotate arm 49 and thus the rotate arm pulley 47. Moving the pulley 47 relative to the pulley 48 is compensated for by rotation of the spring-loaded rotate pulley 33.

The pulley 48 is secured to the shift arm 53 which is controlled by the shift mechanism 54 to be in one of two positions. In its normal position the type head 31 is operating on the hemisphere which produces lower case characters and symbols, and in its shifted condition the position of the pulley 48 causes 180 degrees rotation of the type head 31 whereby typing produces upper case characters and symbols.

Each time a character keylever button 28 is depressed both the rotate mechanism 51 and the tilt mechanism 41 operate to position the head 31 to that location which results in the printing of the selected character or symbol. The mechanism which translates the depression of a single keylever button 28 into the exact positioning of the head 31 necessary to produce the desired results will now be described.

Referring now to FIGS. 11–14, the tilt mechanism 41 comprises a pair of selector latches 61 and 62 each rotatably connected to one end of a cross lever 63. A link 64 is rotatably connected at one end to cross lever 63 and at its other end to the tilt bell crank 66. Link 64 is pinned to cross lever 63 at a location which is twice as far from selector latch 62 as from selector latch 61. Each of the latches 61 and 62 includes a forwardly extending end bottom portion **61*a* and 62*a*, respectively, and the latches are spring-loaded to a position which positions portions 61*a* and 62*a* below a latch bail plate 67**.

The latch bail plate 67 forms a portion of the latch bail 68 which is disposed for rotation about a shaft 69. The latch bail 68 carries a roller 71 which contacts a positive selector cam 72 which is mounted on the cycle shaft 14 (see FIG. 7). The positive selector cam 72 has a generally elliptical shape and thus provides a complete cycle of operation for each 180 degrees of revolution. When the cam rotates 90 degrees from the position shown in FIG. 14, the latch bail 68 is urged downwardly with the latch bail plate 67 urging the selector latches along with it. A further 90 degree rotation of the cam enables the latch bail to return to its initial position. After the initial 40 degrees of rotation of cam 72, those selector latches not withdrawn are positively engaged and those selector latches withdrawn are cleared. At this time the selector latches can be released without disrupting the desired operation. This feature will be shown to be of considerable importance further in the description of the invention.

The type head 31 (FIG. 11) carries four circular rows of characters 31*a*, 31*b*, 31*c* and 31*d*. The head has a normal tilt position in which the characters of row 31*a* are in the print location. The operation of tilt mechanism 41 results in the characters of one of the other rows being moved to the print location. When both of the selector latches 61 and 62 are pulled downward by the latch bail plate 67, the link 64 moves down a distance equal to the distance moved by the latch bail plate and produces the maximum movement of tilt link 36 through the tilt bell crank 66. This produces a change of three rows on the type head such that the characters in row 31*d* are located for printing. If prior to the latch bail plate 67 moving downwardly the selector latch 61 is urged in a direction which withdraws the lower extending portion 61*a* from below the latch bail 67, then only the selector latch 62 will move downwardly with the latch bail plate. When only the selector latch 62 moved downwardly, the cross link 63 rotates about the upper portion of selector latch 61 (the upward movement of selector latch 61 being halted by a stop 73) and the downward movement of link 64 is only one-third as great as when both selector latches were pulled down. This one-third greater movement of link 64 produces only a third as much movement in bellcrank 66 and consequently only a third as much movement in tilt link 36. Under these conditions the head tilts one row of characters to row 31*b*. If the selector latch 62 is withdrawn from below the latch bail plate 67 and selector latch 61 is the only latch urged downwardly, then the rotation of cross link 63 takes place about the top of latch 62 (stop 74 preventing upward movement of latch 62) and the movement of link 64 is twice as great as when latch 62 is urged downwardly, and two-thirds as great as when both latches are urged downwardly. This gives rise to a two-row tilt of the type head whereby the characters of row 31*c* are located for printing.

To summarize, when both latches 61 and 62 are withdrawn from below latch bail plate 67 prior to the latch bail being cammed downwardly no tilting occurs in the type head and the characters of row 31*a* are located for printing. When latch 62 is withdrawn from under the bail plate the head tilts to locate row 31*b* for printing; when latch 61 is withdrawn from below the bail plate the head tilts two rows to row 31*c*; and when neither of the latches is withdrawn from below the bail plate (thus both latches being urged downwardly with the latching bail) the head tilts to locate the characters of row 31*d* for printing.

The rotate mechanism 51 is somewhat more complex than the tilt mechanism due to the need to move to more than four different locations. The principle of operation however is basically the same. The rotate mechanism includes three selector latches 76, 77 and 78 plus a five-unit latch 79 which works through five-unit latch link 81. Each of the selector latches 76, 77 and 78 includes a forwardly extending bottom portion which is disposed below the latch bail 67 unless urged in a direction which withdraws it. The selector latches 77 and 78 are connected by a cross link 82 which in turn is secured by a first lever 83 to a second cross link 84. Also connected to the cross link 84 is the selector latch 76. The second cross link 84 is connected by a second lever 86 to a balance lever 87. The balance lever 87 is connected to the rotate bell crank 88 which is connected through rotate link 52 to the rotate arm 49. It is the position of the rotate arm which determines the position of pulley 47 which in turn acts through tape 46 to angularly position the rotate pulley 33. And the angular position of pulley 33 determines the rotate position of head 31.

When both latches 76 and 78 are withdrawn from below the bail plate 67, such that latch 77 is the only latch urged downwardly, there results a rotation of bellcrank 88 which is one-fifth as great as the maximum rotation possible through the rotate mechanism 51. When latch 78 is the only latch urged downwardly the resulting rotation of bellcrank 88 is twice that achieved through latch 77 and thus two-fifths the maximum possible rotation. The same rotation of bell crank 88 which is achieved when only latch 78 is urged downwardly is achieved when latch 76 is the only latch engaging the bail plate during its downward movement. Latch 76, however, is not used for the purpose of achieving a two-unit rotation. To achieve a three-unit rotation, latches 77 and 78 are both allowed to engage the bail plate on its downward movement and latch 76 alone is withdrawn. A four-unit rotation is accomplished by urging latches 76 and 78 down while withdrawing latch 77, and a five-unit, or maximum rotation occurs, when all three latches are allowed to engage the bail plate during its downward movement. Unlike the tilt mechanism, it is necessary in the rotate mechanism to produce rotation in both directions. The mechanism as described so far has only produced rotation of the bellcrank 88 in a single direction. For rotation in the opposite direction it is necessary to employ the five-unit latch system which will now be described with reference to FIG. 13.

The five-unit latch system has its own cam 91 which engages a roller 92 carried by a bail 93 which is mounted on a shaft 94 for rotation. The latch 79 is spring urged to a position which normally prevents the bail 93 from rising. A lug 96 is secured to the bail 93 and engages the bottom of the latch 79 unless the latch is urged out of its normal position. Thus for positive rotation of the bellcrank 88 the end of balance lever 87 connected to link 81 is held downwardly. When the link 81 is allowed to rise by virtue of latch 79 being withdrawn, there is an associated rotation of bellcrank 88 in a direction opposite to that produced by the selector latches being urged downwardly. If all of the latches 76, 77 and 78 are withdrawn from below the latch bail plate 67 and the five-unit latch is released to allow the link 81 to rise, a negative rotation of five units (the maximum negative rotation) occurs. If the selector latch 77, which as previously explained produces one unit of positive rotation, is allowed to remain below the bail plate 67 and thus move downwardly therewith at the same time the link 81 is allowed to move upwardly, the total negative rotation is reduced by one unit and thus a four-unit negative rotation is achieved. Thus, through the combination of the five-unit latch 79 and the positive selector latches, a negative rotation of one, two, three, four, or five units can be achieved. The mechanisms employed for withdrawing selector latches and for driving the bail plate downwardly will now be described with reference to FIGS. 2 and 6.

The selection of a character or symbol to be printed is made through a keylever 101, one end of which is rotatably mounted on a fulcrum rod 102 and the other end of which is supported by a leaf spring 103. Depression of the keybutton 104 associated with the keylever 101 causes the keylever to move downwardly until it engages a lower stop 106. Mounted directly below each keylever 101 is an interposer 107, one end of which includes an elongated hole 108 through which an interposer securing rod 109 passes. The elongated hole 108 allows the interposer to be moved a limited distance in the direction of its axis. The upper surface of the interposer includes a keylever pawl contact surface 111 at the top of an upwardly projecting finger 112. The surface 111 engages the keylever pawl 113 whenever the keylever is depressed and acts to transfer the downward motion of the keylever to the interposer 107. As the interposer moves downwardly, a downwardly extending clutch release lug 114 contacts a cycle bail 116 causing it to move downwardly.

As the cycle bail moves downwardly it engages the cycle clutch latch pawl 117 urging it downwardly so that it is able to slide under the cycle clutch keeper 118 which normally prevents the cycle clutch latch link 119 from moving toward the front of the typewriter (spring 103 being near the front while rod 102 is toward the rear)

in which direction it is spring-urged by spring 105. With the pawl 117 disengaged from the keeper 118 the link can move under the force of spring 105, and in so doing disengages the cycle clutch latch 121 from the cycle clutch sleeve 122 allowing the cycle clutch to engage and thereby effectively connect the motor to the cycle shaft 14 for rotation thereof. Rotation of the cycle shaft 14 produces accompanying rotation of the filter shaft 19 which engages the end 123 of the interposer 107 when the interposer is in a downward position. As the filter shaft rotates it drives the interposer toward the front of the typewriter within the limits set out by the elongated hole 108 and the rod 109. It is this movement which operates ot select a character or symbol for printing.

The filter shaft 19 also engages the cycle clutch latch restorer follower 124 which is connected to the cycle clutch latch restoring arm 120. The filter shaft causes clockwise rotation of arm 120 which engages the cycle clutch latch bracket 121*a* and urges it in a direction which results in the cycle clutch 121 being put back to the condition in which it prevents the motor from being effectively connected to the cycle shaft.

Disposed directly below the interposer 107 are six selector bails 125–130. The selector bails are separated from one another by a distance which is slightly greater than the distance which the interposer is able to move within the limits set by the elongated hole 108 (see also FIG. 3). Extending downwardly from the underside of interposers 107 are zero to six selector lugs 131 which are affixed at any one of six possible locations along the underside of the interposer. Since there may be anywhere from zero to six selector lugs associated with an interposer, the number of selector bails associated with a given interposer may range from zero to six. There are sixty-four different unique combinations possible with the six bails and each interposer is associated with a different combination. In this way each keylever is associated with a different combination of selector bails through the selector lugs on an interposer 107.

When an interposer is driven toward the front of the typewriter by the filter shaft 19, it carries with it the selector bail or bails, if any, with which it is associated through its selector lug or lugs, if any.

Each selector bail has exclusively associated therewith a latch interposer 132 (only two of which are shown). Each latch interposer, in turn, is connected through a latch link 133 to one of the selector latches previously described with reference to FIG. 12. When a selector bail is moved towards the front of the typewriter it carries with it one of the latch interposers 132 which in turn operates through a link 133 to withdraw one of the selector latches from under the latch bail plate 67 of the latch bail 68 (see FIGS. 12 and 14). In this way each keylever is capable of selecting a different set of selector latches to be withdrawn from the latch bail and thus select a character or symbol for printing.

It is necessary for the operation of the present invention that the typewriter not only operate to print a character or symbol but also operate to generate an electrical signal which uniquely identifies the particular character or symbol selected for printing. It is further necessary for the typewriter to be capable of operating in response to electrical signals. This last-mentioned feature can be provided (and has in fact been provided in prior art devices) by simply associating a solenoid with each of the keylevers and through the use of a matrix or other logic device induce the desired operation by operation of the solenoid urging the keylever downwardly. Such a system is not satisfactory, however, because it is costly and cumbersome.

The present invention provides for both the signal generating, and operation in response to electrical signals, in a unique manner which has the advantages of simplicity, accuracy and economy.

By detecting those of the six latches 61, 62, 76, 77, 78 and 79 which are withdrawn in order to print a selected character or symbol it is possible to state which of the forty-four characters and symbols has been selected to be printed. This is true since each character occupies a unique position on the type head and each position on the type head is identifiable with a single combination of selector latches. If each of the six latches is arbitrarily assigned a binary weight (for example, latch 61 a binary weight of 1, latch 62 a binary weight of 2, latch 76 a binary weight of 4, latch 77 a binary weight of 8, latch 78 a binary weight of 16 and latch 79 a binary weight of 32) it is possible to assign a different number to each character and symbol, wherein the number is equal to the sum of the binary weights of the latches which are withdrawn in order to print that character or symbol. (A reciprocal code can be achieved by looking at the latches not withdrawn, rather than those withdrawn.) FIG. 20 illustrates a chart showing the binary weight of the various characters and symbols of a Selectric typewriter using the weighting system suggested above. By associating each of the six selector latches with an electrical signaling means which identifies those latches which have been withdrawn (or conversely those latches which have not been withdrawn) there will be generated each time a character is printed a six-channel electrical code signal representing a six-bit binary character which is uniquely identifiable with a single character or symbol which the typewriter is capable of printing.

Figure 2:
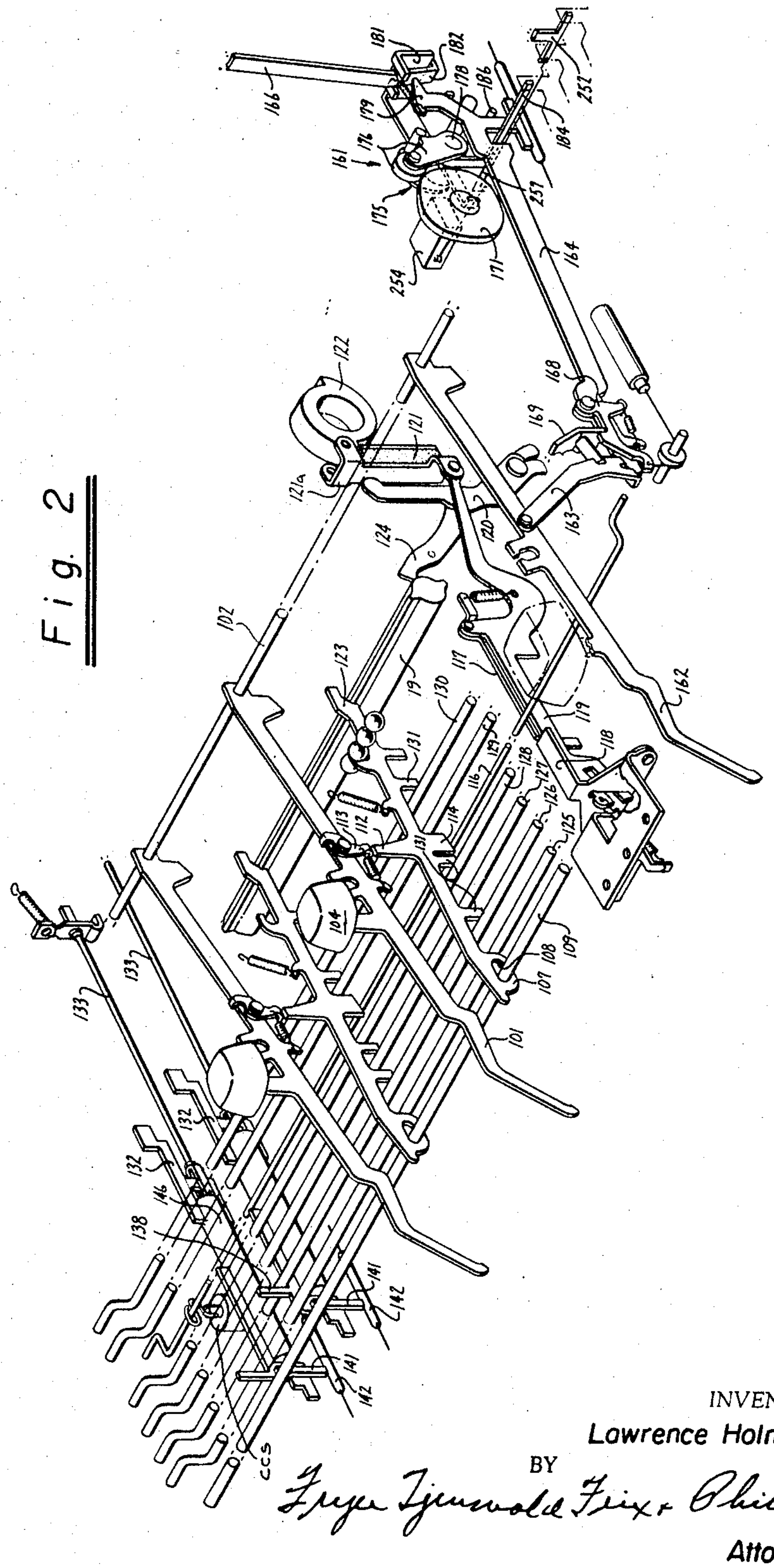
FIG. 2 is a perspective illustration showing the character selection and backspace selection portion of a typewriter as modified by the present invention.
Figures 3, 4:
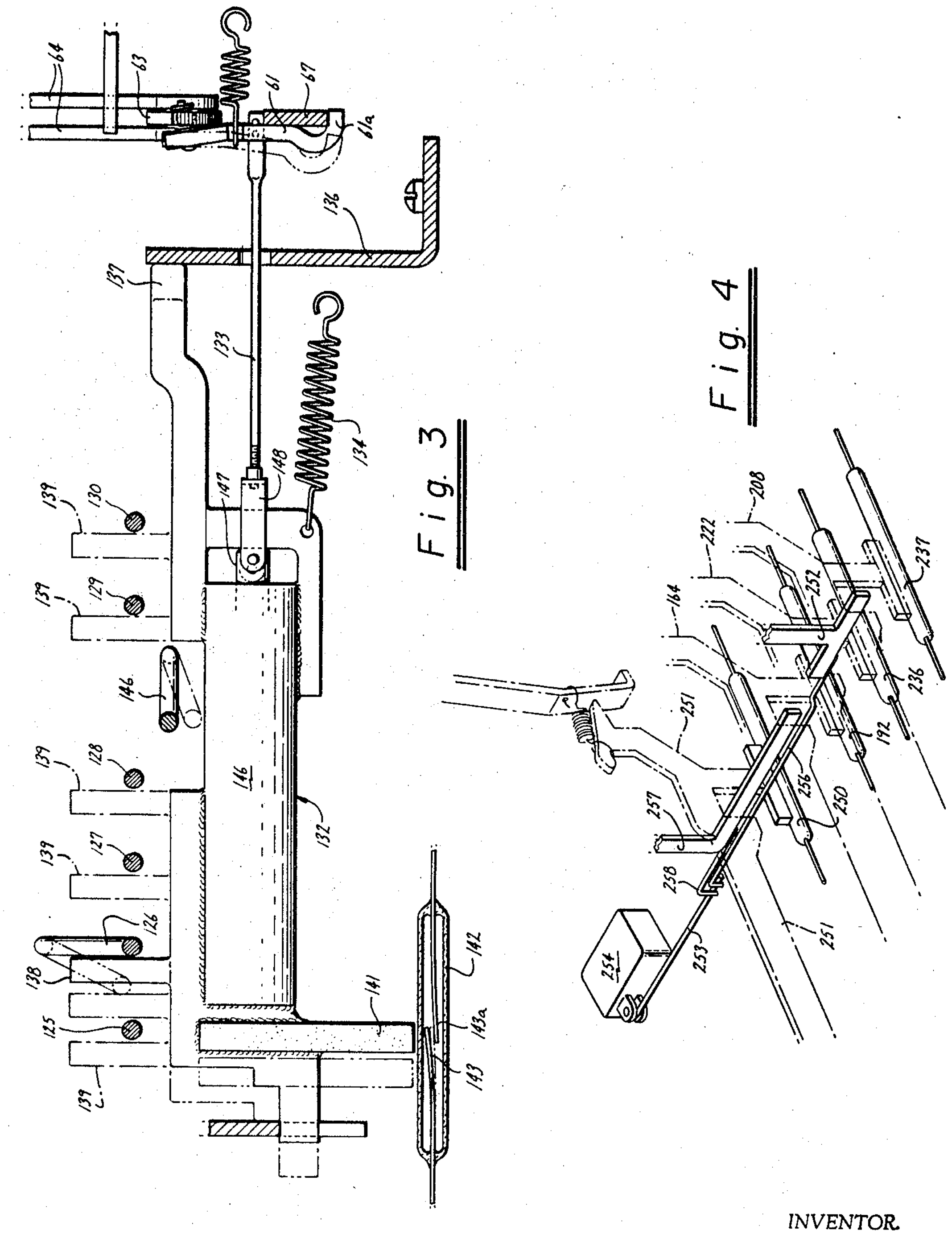
FIG. 3 is an enlarged side view of a typewriter latch interposer taken along lines III—III of FIG. 2.
FIG. 4 is an enlarged portion of FIG. 2 illustrating a typewriter operational control as modified by the present invention and wherein certain parts are shown in phantom.

Referring to FIGS. 2 and 3, each of the six latch interposers 132 (not all of which are shown) is urged toward its associated selector latch by spring 134. An upstanding stop 136 limits the movement of the interposer in the direction of its selector latch such that when the end 137 of the latch interposer contacts the stop 136 the selector latch 61 (for example) is disposed such that its forwardly extending lower portion 61*a* is situated below the latch bail plate 67. When these conditions prevail, the selector latch is urged downwardly when the latch bail is driven downwardly. The particular latch interposer illustrated in FIG. 3 is associated with selector bail 126 through its upstanding latch interposer lug 138. The phantom lines 139 represent the upstanding latch interposer lugs associated with the other five latch interposers. When interposer 107 is driven toward the front of the typewriter by filter shaft 19, selector bail 126 is carried with the interposer by selector lug 131. The connection between bail 126 and upstanding latch interposer lug 138 will result in the latch interposer 132 also moving toward the front of the typewriter. This operates to withdraw latch 61 from beneath the latch bail plate 67 and thus prevents the latch from being operated by the bail.

In order to indicate electrically that latch 61 or one or more of the other selector latches have been withdrawn from below the latch bail plate 67 each latch interposer 132 has a permanent magnet 141 integrally secured thereto and a glass encapsulated reed switch 142 associated with the permanent magnet 141. Each switch 142 includes a pair of reed contacts 143 and 143*a* which are formed from a magnetic material and prestressed such that the overlapping ends of the contacts do not touch one another in the absence of any magnetic influence. When the magnet 141 is disposed adjacent the overlapping ends of the contacts, they become temporarily magnetized and their overlapping ends assume like polarities and thus repel one another. Under these conditions the contacts do not touch.

When the interposer 132 is in its normal position (the end 137 of the interposer abutting the stop 136) the magnet 141 is positioned adjacent the overlapping ends of the contacts 143 and 143*a*. When the interposer is moved toward the front of the typewriter, in response to a selector bail contacting the interposer's upstanding lug, the magnet 141 moves away from the overlapping ends of the contacts toward the front of the typewriter (phantom lines). As the magnet 141 is carried toward the front of the typewriter, it passes away from contact 143*a* and the significant magnetization lies in contact leaf 143. The magnetic field of contact leaf 143*a* becomes more closely associated with contact leaf 143 than with magnet 141, and contact leaf 143*a* assumes the same polarity as contact leaf 143. This results in the overlapping ends of the contacts having unlike magnetic polarities causing the two contacts to attract each other and make contact. When the latch interposer 132 returns to its normal position, as shown in FIG. 3, permanent magnet 141 returns to its position adjacent the overlapping ends of contacts 143 and 143*a*. The contacts 143 and 143*a* assume like signs and thus are forced open by this reversal of polarity association, which quickly overcomes any unlike-signs residual magnetism.

Thus each of the six latch interposers has associated therewith a switch which is normally open (contacts not touching) when the interposer is in its normal position and which closes (contacts touch) when the interposer is urged away from its normal position. By electrically detecting which of the interposer switches have closed and which remain open during a print cycle it is possible to know which of the characters or symbols is being printed. The particular manner in which the condition of the interposer switches is detected and used in the present invention will be described in detail below.

The particular arrangement of permanent magnets 141 and glass encapsulated switches 142 as set out above, provides a novel means for transducing the condition of selector latches into electrical signals and thus generating information signals. The specific means set forth has the distinct advantage over the prior art of requiring a minimum number of additions to the existing typewriter equipment.

As mentioned above, in addition to providing components which generate electrical signals that identify a particular character or symbol print operation it is also necessary to provide means by which the typewriter can be operated by electrical signals. As the foregoing description of the typewriter operation indicates, the depression of a keylever button 104 ultimately results in a specific combination of selector latches being withdrawn from their normal position together with the release to the cycle clutch latch. For the purpose of enabling this same combination of events to occur in response to electrical signals, each latch interposer 132 is provided with an electrically operated solenoid 146 which includes a longitudinally movable piston 147. The latch link 133 which connects the selector latch 61 (for example) to the latch interposer 132, is connected to the piston 147 by a clevis pin 148. When unenergized, the solenoid 146 and its piston 147 act as a rigid member so that the link 133 moves leftwardly with the latch interposer, thus enabling the typewriter to operate in its normal manner. Movement of the entire latch interposer, however, is only necessary to the extent that it results in the selector latch 61 being withdrawn from the latch bail plate 67. Thus the operation of the latch interposers is accurately simulated by any means which operates to withdraw selector latches. When the solenoid 146 is electrically energized its piston 147 retracts and draws the link 133 toward the front of the typewriter causing the associated selector latch to be withdrawn. Thus, while the latch interposer does not move, the selector latch is nonetheless withdrawn. By knowing which selector latches must be withdrawn in order to print a given character or symbol it is possible to direct an electrical signal to the typewriter which will be operative to select a desired character. The printing of this selected character or symbol is induced by removing the cycle clutch latch at approximately the same time that the specified selector latches are withdrawn.

A cycle clutch solenoid CCS is attached to the cycle bail 116 and operates when energized to pull the cycle bail downwardly. The downward movement of the cycle bail results in the same operation as previously described with reference to the clutch release lug 114.

The solenoid CCS operates in response to an electrical signal as part of the remotely operated machine. Separate means must be provided to generate such an electrical signal from a transmitting machine. To perform this signal-generating function there is provided on the cycle shaft gear 17 (see FIG. 7) a cycle shaft magnet 149 and an associated shaft switch 151 of the glass encapsulated reed variety previously described with reference to the latch interposers. When the cycle clutch is in its latched (disengaged) condition the magnet 149 is at right angles to the reed contacts of the switch 151 and thus provides no magnetic influence on the reeds. Under these conditions the switch is open. When the cycle clutch is unlatched the cycle shaft 14 rotates and the magnet 149 is positioned with relation to the switch so as to close the switch during the same interval the latch interposer switches (if involved) are closed. When magnet 149 approaches a position which is parallel to the position of switch 151 it causes the ends of the contacts thereof to have opposite magnetic polarities and attract one another. Under these conditions the contacts will touch and the switch will be closed. Thus each 180-degree cycle of shaft 14 results in a brief closing of switch 151. In the present embodiment all involved switches close at approximately 15 degrees and open at 40 degrees of rotation of shaft 14. At approximately 40 degrees the latch interposers release and the remaining 140 degrees of rotation of cycle shaft 14 is devoted to continuing to position the type head, printing and returning it to home position.

Thus through the use of only seven switches (six latch switches and one cycle shaft switch) and seven solenoids (six latch interposer solenoids and one cycle clutch solenoid) it is possible to electrically detect the fact that a typewriter is preparing to print a character or symbol and to determine precisely which character or symbol it will print and, further, the typewriter is capable of responding to electrical signals generated from a typewriter similarly equipped by operating the cycle clutch mechanism and withdrawing those selector latches necessary to position the type head in the precise manner necessary to print the desired character.

The present invention addresses itself primarily to the task of detecting the condition of the switches, transmitting that information over a two-wire transmission system and energizing those solenoids of a receive typewriter which will induce it to accurately and precisely imitate the operation of the typewriter at which the signal was generated. The particular manner in which the signal is generated and received, however, is also a portion of the present invention in view of the many advantages which accrue to performing the generating and receiving functions in the precise manner described above.

Referring to FIG. 7, a cam 156 is secured to the end of the print shaft 22 for rotation therewith. Associated with the cam 156 is a switch 157 (preferably a microswitch) which includes an actuating arm 158 that engages the cam 156. The cam 156 rotates one complete revolution for each 180 degrees of revolution of cycle shaft 14 (180 degrees of cycle shaft 14 corresponding to a complete print cycle). Early in the revolution of cam 156 (30 degrees to 40 degrees) switch 157 is actuated to an open condition from its normally closed condition. Later in the revolution of cam 156 (at approximately 120 degrees), switch 157 is returned to its normal condition (closed). Switch 157 performs a function which is related to the memory section of the electrical signal translator which will be described in detail below.

(b) Function operation mechanisms

In addition to the above-described print cycle, a typewriter necessarily performs several function operations. Like the print operation, function operations must be electrically identified and capable of being induced by electrical signals. The following description will explain how the IBM Selectric typewriter operates in performing a backspace, carrier return, index (line space), case shift, space, and paper feed in order that it may be fully understood how the present invention advantageously equips the typewriter with means for electrically signifying that one or more of such operations is occurring, and with means by which the typewriter responds to electrical signals by performing one or more of these function operations.

Figures 5, 6:
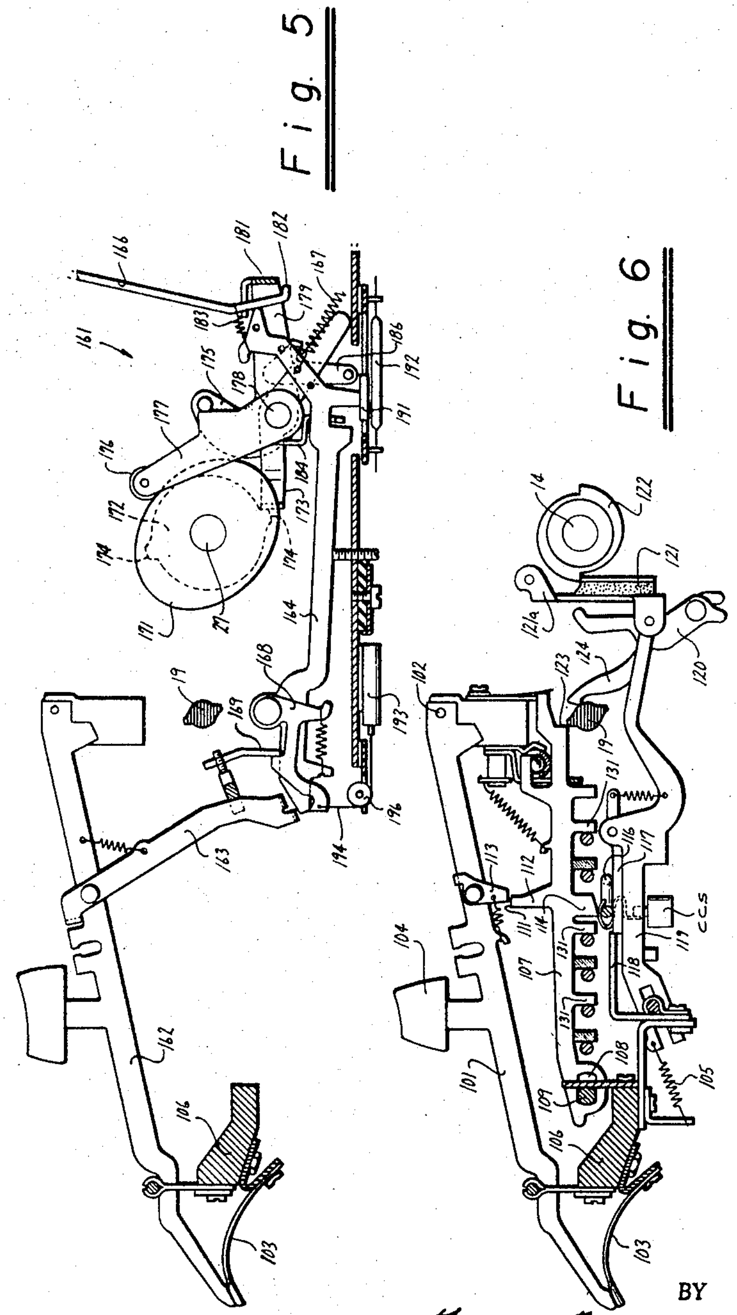
FIG. 5 is a side elevation taken generally along lines V—V of FIG. 2.
FIG. 6 is a side elevation taken generally along lines VI—VI of FIG. 2.

Referring now to FIGS. 2 and 5, the space/backspace operational control mechanism 161 is mechanically associated with a manually operable keylever 162 through keylever pawl 163 and interposer 164. The space operation has associated therewith a separate keylever, keylever pawl, interposer, and operational latch 166. Likewise, the backspace operation has associated therewith a separate keylever, keylever pawl, interposer, and operational latch. Both functions, however, share the operational control mechanism 161 which provides the power for carrying out one of the functions. A description of the operation of the control mechanism 161 to actuate the operational latch 166 is accurate for either space or backspace and thus the description which follows pertains with equal accuracy to both the functions.

A spring 167 is attached to the interposer 164 and urges the interposer toward the rear of the typewriter. An interposer latch 168 rotatably secured to the interposer 164 is spring loaded to rotate in a clockwise direction and engages the keylever pawl guide bracket 169 preventing the spring 167 from moving the interposer. When the keylever 162 is depressed, keylever pawl 163 engages the end of interposer 164 urging it downwardly and disengaging the latch 168 from the keylever pawl guide bracket 169 enabling the spring 167 to move the interposer toward the rear of the typewriter. This movement of the interposer 164 initiates the function of the operational control mechanism. The function of the operational control mechanism includes returning the interposer to its initial condition by urging it toward the front of the typewriter. As the interposer so moves, the front surface of the latch 168 acts as a cam which causes the latch to rotate until the keylever pawl guide bracket is re-engaged.

The operational control mechanism includes an operational cam 171 which is mounted on a clutch wheel 172 that in turn is secured to the operational shaft 27 (see FIG. 7). The clutch 172 operates to prevent rotation of the cam 171 as long as clutch release arm 173 engages one of the diametrically opposed clutch wheel latch members 174. A roller 176, carried by a cam follower 177, engages the peripheral surface of the cam 171 and causes the cam follower to rotate about its pivot joint 178 when the cam rotates. The cam follower 177 engages a cam follower lever 175 which includes the horizontally extending arm 179. At one end of the arm 179 and extending at right angles therefrom is an operational latch engaging plate 181. Plate 181 is disposed slightly above and slightly in front of the lower forwardly extending portion 182 of the operational latch 166. Thus when the cam 171 causes the cam follower 177 to rotate in a clockwise direction, the cam follower lever arm 179 is urged downwardly. If the end 182 of operational latch 166 is urged under the plate 181 prior to the arm 179 rotating downwardly, the operational latch will be urged downwardly with the cam follower arm and induce the mechanism to which it is attached to perform the function which it is designed to perform (space or backspace).

The rearward end of the interposer 164 engages the lower portion of the operational latch 166 and is maintained in contact therewith by a spring 183. When the interposer 164 moves rearwardly in response to actuation of keylever 162, the operational latch 166 is urged rearwardly under the plate 181 and in position to be actuated. At the same time that the rightward motion of the interposer 164 urges the operational latch 166 rearwardly it also engages the clutch release arm lever 184 which disengages the clutch release arm 173 from the clutch wheel latch member 174 permitting the cam 171 to rotate. As the cam rotates, the cam follower 177 rotates clockwise engaging the cam follower lever 175 causing it to rotate clockwise whereby plate 181 is driven downwardly engaging the end 182 of the rearwardly-urged operational latch 166.

As the cam follower arm 179 rotates clockwise, an interposer restoring lever 186 affixed to the arm 179 and extending in a generally downward vertical direction, engages the interposer 164 and drives it back towards its initial position. This movement of interposer 164 back to its initial position occurs prior to the clutch wheel latch member 174 rotating a full 180 degrees whereby the other clutch wheel latch member engages the clutch release arm 173 causing the cam to stop after 180 degrees of rotation. As previously explained, the interposer latch 168 re-engages the keylever pawl guide bracket 169 whereby the mechanism is reset for operation the next time the keylever 162 is depressed. Both the space and backspace mechanisms operate through the operational control mechanism 161. Only that mechanism associated with the operational latch which has been urged rearwardly, however, will operate in response to the cam 171 rotating 180 degrees. The other mechanisms will not be actuated as plate 181 will pass in front of the lower portion of their operational latch without driving it downwardly.

While only a single operational latch 166 and single interposer 164 have been illustrated, it has been pointed out above that there is a separate interposer and operational latch for the space function and a separate interposer and latch for the backspace function. In fact, the characteristics that distinguish between a space and backspace function taking place is that when the space function takes place the interposer associated exclusively with the space function moves rearwardly, then returns during the functional cycle. When a backspace function cycle takes place only the interposer exclusively associated with the backspace mechanism moves rearwardly, then returns during the functional cycle. For the purpose of providing means for electrically detecting the occurrence of a space or backspace function operation, and for determining which of the two is occurring both the space and backspace interposers have a permanent magnet, such as magnet 191, secured thereto. Disposed directly below each magnet is a glass encapsulated reed switch, such as switch 192, of the kind previously described with respect to the latch interposer 132. When the interposer is in its latched position, the magnet position enables the magnet to magnetize the contacts of the switch so that they repel one another and the switch is open. When the interposer latch is released and the magnet moves rearwardly, the magnet magnetizes the contacts of the switch to unlike signs and the contacts attract each other and are able to touch one another whereby the switch is closed. Since the switches can only close when a space or backspace operation occurs, it is possible by detecting the condition of the switches to determine whether or not one of the two functional operations is taking place.

In order to initiate a space or backspace operation in response to an electrical signal an electrically operated solenoid 193 is connected to the interposer latch 168 by a wire 194 that passes over a pulley 196. When the solenoid is energized it pulls the wire 194 causing the latch 168 to rotate in a counterclockwise direction releasing it from the keylever pawl guide bracket 169 in precisely the same manner as the latch is released when the keylever 162 is depressed. Thus by directing an electrical signal to the solenoid associated with the backspace interposer latch it is possible to initiate a backspace operation and by electrically energizing the solenoid associated with the space interposer latch it is possible to initiate a space operation.

As soon as any function interposer has been unlatched the solenoid may be de-energized since the mechanical operation has been triggered and further solenoid energization serves no purpose. In fact, the solenoid may be de-energized on the initial movement of the interposer and prior to the commencement of the cycling of the function mechanism.

Referring now to FIGS. 9, 10, 17 and 18, the carrier return keylever 201 and index keylever 202 operate through the same operational control mechanism 203 to actuate the carrier return operation latch 204 and the index pawl carrier link 206, respectively. The carrier return and index functions are not totally independent of one another inasmuch as a carrier return function includes an index function (line feed) and thus operation of the keylever 201 results in both carrier return operation latch 204 and index pawl carrier link 206 being actuated simultaneously. The index keylever 202 operates to actuate index pawl carrier link 206 alone to make it possible to line feed without accompanying carrier return.

The operational control mechanism 203 is similar to the operational control mechanism 161 previously described in detail with reference to FIG. 5. Thus the index keylever 202 has connected thereto a keylever pawl 207 (see FIG. 10*b*) which engages the end of the index interposer 208 when the keylever is depressed. The interposer 208 carries an interposer latch 209 that is released when the interposer is urged downwardly by the pawl 207 and which when released enables the interposer to move rearwardly (in the direction of the index pawl carrier link 206). The rearward movement of the interposer 208 results in rotation of the cam 211 which is mounted on a clutch wheel that rides on the operational cam shaft 27 (neither of which are shown) in much the same manner as the cam 171 and clutch wheel 172. A roller 212 carried by a cam follower 213 rides on the peripheral surface of the cam 211 causing rotation of the cam follower 213 about its pivot point 214. Pivotally connected to the end of cam follower 213 is a multiplying lever 216 one end of which is secured through a clevis pin 217 to the index pawl carrier link 206 and the other end of which is associated with a multiplying lever stop 218 which limits the movement of that end of the multiplying lever.

Rotation of the cam 211 produces reciprocating movement of the cam follower 213 which in turn imparts a reciprocating motion to the index pawl carrier link 206 through the multiplying lever 216 whereby the mechanism attached at the other end of the index pawl carrier link 206 is operated to produce a line space. The operational control mechanism 203 includes an interposer resorting lever 210 which operates during the rotation of the cam to relatch the interposer 208.

An index repeat lever 219 is positioned for actuation by the index keylever 202 when the keylever is depressed beyond the point necessary to merely unlatch the interposer 208. Since it forms no part of the present invention, the mechanism which is connected to the index repeat lever 219 will not be shown or described but it should be understood that depression of the lever 219 produces repeated indexing as long as the keylever is maintained in that depressed condition.

When the carrier return keylever 201 is depressed, a carrier return keylever pawl 221 secured to the keylever 201 engages the carrier return interposer 222 and urges it downwardly releasing the carrier return interposer latch 223 thus enabling the interposer to move rearwardly (toward the carrier return operational latch 204). The end 224 of interposer 222 carries a carrier return operational latch actuator 226 which engages the carrier return operational latch 204 and carries it along with the interposer 222 when the interposer latch 223 releases the interposer.

The cam follower 213 has secured thereto a carrier latch engaging plate 227 which has a normal position slightly above and slightly in front of the projecting end portion 228 of the carrier return operational latch 204. The plate 227 is urged downwardly when the cam operates the cam follower, and if the interposer 222 has not been released from its latch 223 the plate 227 will not engage the end portion 228 of latch 204. If the interposer 222 has moved in response to its latch being disengaged, however, the carrier latch 204 will be positioned by operational latch actuator 226 to a position below the plate 227 just prior to the plate moving downwardly and will thus be urged downwardly along with the plate 227 as the cam follower responds to the rotation of the cam 211. The downward motion of the latch 204 results in the carrier return mechanism secured to the other end thereof (see FIG. 9) being operated resulting in the carrier returning to its home position. The operation of the cam 211 in response to release of interposer latch 223 results in a reciprocating motion of link 206 which is identical to that produced when the interposer 208 is unlatched in response to depression of the index keylever 202. Thus each carrier return operation necessarily includes a line space operation since the link 206 is operated each time the cam follower 213 is driven by the cam 211 which as fully explained, occurs in response to depression of carrier return keylever 201.

The carrier return keylever pawl 221 includes an index interposer latch release lever 231 which unlatches the index interposer latch 209 when the keylever 201 is urged downwardly below the position necessary to merely initiate a carrier return operation. While the release of interposer 208 is not necessary to induce both a carrier return and index function, it is necessary if repeated indexing is desired in response to depression of keylever 201.

Thus, an index operation in response to depression of the index keylever 202 is uniquely characterized by the movement of the single interposer 208 while the carrier return and index operation (not repeat) is characterized by the movement of single interposer 222. Thus by detecting the movement of interposers 208 and 222 it is possible to positively determine whether an index operation or a carrier return operation is taking place. Accordingly, the carrier return interposer 222 has affixed thereto a permanent magnet 233 and the index interposer 208 has affixed thereto a permanent magnet 234. Disposed directly below the magnet 233 is a glass encapsulated reed switch 236 and disposed directly below the magnet 234 is a similar glass encapsulated reed switch 237. Both of the switches are magnetized by their respective magnets to repel the contacts when the interposers are in their latched position whereby the reed contacts are separated from one another and the switches are open. When an interposer becomes unlatched and moves rearwardly, the magnet changes its position relative to its associated switch and magnetizes the reed contacts thereof to attract one another and the switch thus closes. In this way the present invention provides switching means which accurately reflect whether or not a particular typewriter function operation has been initiated. As in the previously discussed typewriter functional operations and character print operation the means for detecting particular operations as taught by the present invention does not require any modification of the existing typewriter equipment and the necessary attachments are of a relatively simple nature. Most importantly the attachments which enable the typewriter to electrically identify the operation which it is performing in no way interfere or alter the normal operation of the typewriter as a stenographic machine.

In order for the typewriter to perform a carrier return and index operation in response to electrical signals, the interposer 222 has associated therewith a solenoid 238. The solenoid 238 is associated with the interposer 222 through a wire 241 which is connected to the actuating portion of the solenoid and passes over a pulley 242 before connecting to the end of the interposer latch 223. When the solenoid 238 is electrically energized the wire 241 pulls the latch 223 downwardly releasing the latch and enabling the interposer 222 to move rearwardly. To the interposer the result is identical with that produced by depressing the keylever 201. Again, once the interposer is unlatched further solenoid energization is not required.

In addition to switches 236 and 237 there is also a normally closed switch 246 (preferably of the microswitch variety) disposed below the multiplying lever 216 such that the switch actuating arm 247 contacts the arm 216 and is urged downwardly each time the arm operates as part of the line feed operation. The switch 246 is part of the electrical circuitry which enables the receive typewriter to single line feed or double line feed depending on the condition of the line feed control 239 (FIG. 10*a*) of the transmit typewriter.

A switch 248 is located below the index keylever button 249 and is actuated each time the keylever is depressed. Switch 248 is a part of the electrical circuit to be described below and serves as a remote OFF switch while the transmit typewriter is in lower case for turning off a remote typewriter and ringing the singal bells at the transmit and remote typewriters while the transmit typewriter is in upper case.

Because of the fact that it is possible to line feed by actuation of the carrier keylever 201 many typewriters do not include a separate index keylever. The only disadvantage of not having a separate index control is that all indexing operations must start with a carrier return. Thus in the present invention the keylever 202 is disconnected from the interposer 208 and employed instead as a remote OFF and bell button. Since this disables the typewriter from indexing without first carrier returning, it is unnecessary to provide electrically responsive means for initiating indexing without carrier return and thus no separate solenoid is provided for latch 209.

The single line feed and double line feed control (see FIG. 10*a*) includes a manually positionable control lever 239 (of the transmit typewriter) mounted on a shaft 243 and having two positions—one for single line feed at the receive typewriter and one for double line feed at the receive typewriter. By selecting one position or the other the transmit operator is able to single line feed or double line feed at the remote typewriter regardless of the feed conditions selected for the transmit typewriter. In the single line feed position the lever 239 contacts the actuator button 244 of double line feed switch 235, and removes a stop lug 245 from below the repeat bail 240. In the double line feed position the actuator 244 is released and the repeat bail is prevented from operating by lug 245. The significance of the two sets of conditions will be made clear in the description below.

Referring now to FIG. 4, the switch 192 associated with backspace interposer 164, switch 236 associated with carrier return interposer 222 and switch 237 associated with index interposer 208 together with a switch 250 which is associated with the space interposer 251 previously described are all physically disposed in close proximity to one another by virtue of the close grouping of the interposers associated with the four functional operations described above. A T-shaped switch-actuating plate 252 is operatively associated with the carrier return and index interposers (see also FIG. 10) in such a way that movement of either interposer due to being unlatched results in movement of the switch plate 252. The plate 252 is mechanically associated with the actuating arm 253 of a function memory release control switch 254 through an extension arm 256 which is rigidly secured to the plate 252 at one of its ends and in abutting relationship to the actuating arm 253 at its other end. When the plate 252 is moved in response to movement of either interposer 222 or interposer 208 moving, the switch 254 is actuated by virtue of its actuating arm 253 being moved by the arm 256. An L-shaped actuating plate 257 is operatively associated with the space and backspace interposers (see also FIG. 2) and is mechanically associated with the switch actuating arm 253 through an extension arm 258 and operates to actuate the switch 254 when either the backspace interposer or space interposer moves during a function operation. Thus, whenever one of the four functional operations described above is initiated through unlatching of an interposer the function memory release control switch 254 (FMR) is actuated. The purpose of this switch will be made clear during the detail description of the translator which will be set out below.

As previously mentioned, shift arm 53 (see FIGS. 11, 15 and 16) has two possible positions, one of which corresponds to the type head 31 being positioned for lower case printing while the other corresponds to the head being positioned for printing in upper case. The position of shift arm 53 is dependent upon the position of a cam 273, the camming surface of which engages a roller 274 carried by the shift arm 53. The shift arm is pivotally mounted on a shaft 276 for movement away from or toward the rotate arm pulley 47 for the purpose of operating the rotate pulley 33.

The cam 273 is mounted on the operational shaft 27 but does not rotate therewith unless a clutch mechanism generally indicated as 277 secures the cam to the shaft. A shift release arm 278 is mounted for rotation about a shaft 279 and operates in its normal position to maintain the clutch mechanism 277 in that position which prevents the cam 273 from rotating with the shaft 27. When the shift release arm 278 is disengaged from the clutch mechanism as by a shift release link 281 being pushed toward the rear of the typewriter, the cam is connected to the shaft 27 resulting in 180 degrees of rotation of the cam.

The cam 273 is disc shaped and has a peripheral thickness which varies from that shown in FIG. 15 to that shown in FIG. 16. When the narrowest peripheral thickness of the cam is disposed between the shift arm cam roller 274 and a roller 282, the band 46 is able to urge the pulley 48 toward the rotate arm pulley 47 until the shift arm adjustment screw 283 contacts a stop 284.

When the clutch release arm allows the cam to rotate with the shaft 27 the thickest peripheral portion of the cam 273 is disposed between the roller 274 and the roller 282 causing the arm 53 to rotate in a counterclockwise direction (as illustrated in FIG. 16) thus shifting the pulley 48 away from the pulley 47 and thereby inducing the head 31 to assume the upper case position.

When the shift release arm 278 is urged back to its lower case position (the position shown in FIG. 11) from an upper case position, the cam once again is allowed to rotate with the shaft 27 until the lower case position is once again achieved at which time the clutch between the shaft and the cam operates to prevent further rotation of the cam.

The shift mechanism is operated by depressing either shift key 286 or shift key 287 both of which engage a shift bail 288 which connects to shift release link 281 through a bellcrank arrangement 289. When the shift release arm 278 is in its lower case position and bail 288 is rotated in response to either keylever 286 or 287 being depressed, the rotation of the bail is transferred through bellcrank 289 to link 281 causing the shift arm 278 to rotate counterclockwise (as illustrated) about its shaft 279. This places the shift arm 178 in its upper case position which as previously described results in the cam 273 urging shift arm 53 to its upper case position. As long as the keylever is maintained in its depressed condition the release arm 278 will stay in its upper case condition and the head 31 will also remain in that position which produces upper case characters and symbols. Release of the keylever causes the bail 288 to rotate back to its rest position which in turn causes the release arm 278 to resume its lower case position which as previously described causes the cam 273 to rotate back to that position which places the shift arm 53 in its lower case position.

When either keylever 286 or keylever 287 is depressed in response to pushing keylever button 291 or 292, respectively, the shift which results therefrom will only be maintained as long as pressure is applied to the keylever button. A third keylever button 293, however, associated with shift keylever 286 has associated therewith a lock mechanism 294 which operates to hold the keylevers 286 and 287 in a partially depressed condition after pressure is released from the keylever button 293. To release the lock mechanism 294 it is necessary to depress the keybutton 291 or keybutton 292 as if to initiate an upshift.

Interlocking mechanisms are provided in an unmodified Selectric typewriter to prevent a space function or case shift from occurring during any print operation, and vice versa. However, any of the functions together with the case shift may occur concurrently. As an example, if the space keylever and the case shift keylever are operated at the same time the typewriter will respond by performing both a space operation and change of case (180 degree rotation of type head) simultaneously. The effect of this is that the typewriter has performed the two operations in one cycle period of the typewriter. The important significance of this inherent feature of the typewriter will be explained later with reference to the case verification principle.

In order for the shift mechanism 54 to be responsive to electrical signals a solenoid 296 is connected to the shift release arm 278 through a solenoid link 297. When the solenoid is energized it retracts the link 297 causing a rotation of the link 278 which is identical with the rotation which it experiences when one of the keylevers 286 or 287 is depressed. Mechanically associated with the solenoid 296 is a relay 298 which operates through lever 295 to maintain the solenoid in a retracted position even after the termination of the energization which initially retracted the solenoid. Thus when the solenoid is energized for the purpose of placing the shift arm 53 in an upshift position, the relay 298 operates on the solenoid to maintain the shift arm in that position until a downshift signal is received. When the shift mechanism is changed from an upshift to a downshift condition, the relay 298 receives an electrical signal which causes the lever 295 to be drawn upwardly, which releases the solenoid. The shift release arm 278 is then able to rotate back to its lower case position.

Because of the fact that the present invention teaches a system wherein a given typewriter may be a transmitting typewriter one moment and a receiving typewriter the next, certain problems arise which are not present in a machine which is exclusively a transmit or receive machine, or which is simply used as a non-transmitting typewriter. Such a problem arises in connection with the shift mechanism of the typewriter. If, for example, the receive typewriter, which last received an upshift, is locked in upper case through mechanism 296, 297 and 298 and then the typewriter becomes the transmit typewriter, the following situation occurs. The relay 298 is holding the solenoid 296 in its upper case condition and will release it only upon receipt of an electrical signal. The mechanical upper case release does not override the relay solenoid upper case mechanism and thus the receive typewriter which has now become the transmit typewriter can only transmit in upper case. In order to overcome this problem a switch 299 is disposed below the keylever 286 and actuated whenever the keylever 286 is depressed. As will be more fully explained below the switch 299 is electrically associated with the relay 298 such that actuation of the switch causes the relay to release the solenoid 296 and thereby enables the transmit typewriter to operate in lower case.

Due to the flexibility of shift bail 288 the left shift keylever 286 never bottoms in its stroke when the shift occurs as the result of depressing right shift keybutton 292 or energization of upshift solenoid 296. The shift unlock switch 299 is disposed so as to remain in its normal state in both lower case and upper case conditions until downward finger pressure is exerted on keybutton 291 to bottom the keylever 286. This is the same technique an operator would use to release mechanical lock 294.

Another problem occurs when an attempt is made to remotely downshift a receive typewriter which has been left in a locked upper case position. Normally the electronic equipment associated with a system of the type described herein is designed to virtually eliminate upshift signals which occur when a typewriter is already in an upshift condition. For most operations this is satisfactory since it is a redundant signal and normally employed only as a case shift in the event that the typewriters are not properly case coordinated. Since the only way that a typewriter can be released from a locked upper case position is by actuation of the keylevers as if to effectuate an upshift, the very signal needed to unlock the typewriter is eliminated by the accompanying electronic system. In order to overcome this problem a switch 301 is disposed in conjunction with the relay 298 and operated by lever 295. As will be more fully described below, the switch 301 is disposed in an electrical circuit which allows an upshift signal to operate the solenoid 296 when the switch is not actuated and which prevents an upshift signal from operating the solenoid 296 when the switch is actuated. Since the switch 301 is not actuated when the shift mechanism is either in lower case or locked in upper case by mechanism 294, the present invention provides means for unlocking a remote typewriter which has been locked in upper case through shift lock mechanism 294.

An elongated hole 278*a* is provided in shift release arm 278 to permit manual shifting without carrying upshift solenoid 296 piston to lock position. This means no electrical source is necessary to unlock the typewriter upshift solenoid 296 while in ordinary typing operation.

Mounted in close proximity to the shift arm 278 are a pair of switches 302 and 303 which are actuated each time the shift arm rotates about its shaft 279. A precise explanation of the operation of switches 302 and 303 will be set out below when the translator is described.

Mounted on the shift arm brace 305 is a switch bracket 304 which has a microswitch 306 and 307 mounted on either end. The microswitches 306 and 307 are mounted on the bracket 304 in such a manner that the actuating button of switch 306 is engaged when the shift mechanism is in its downshift condition (FIG. 15) while in that same condition the actuating button of switch 307 is unacted upon. When the shift mechanism is in its upshift condition (FIG. 16) the button of switch 307 is actuated and the actuating button of switch 306 is unacted upon. By disposing switch 306 in electrical series with switch 307 and making both of the switches normally closed switches, it is clear that in either the upshift or downshift states one of the switches is open and the circuit is noncontinuous. The only time that the two switches are both in their normal (closed) condition is that brief time when the shift mechanism is changing from an upshift to a downshift or vice versa. Thus the switches 306 and 307 operate to identify the fact that a shift is occurring and as will be more fully explained below the switch 302 operates prior to the actual cycling of the shift mechanism to determine if the impending shift is an upshift or a downshift.

Referring now to FIGS. 7 and 19, paper 259 is placed in the typewriter by placing it between the typewriter platen 261 and a deflector 262 and then manually rotating the platen by turning the handle 263. As the platen rotates, the paper is drawn between the platen surface and a rear feed roller 264 which firmly holds the paper to the platen and causes the paper to advance as the platen is turned. As the paper advances from the roller 264 it passes between a front feed roller 266 which directs the paper upwardly in position to receive the type head which strikes the platen during the print cycle.

For the purposes of the present invention the platen 261 is provided with a circumferential proove 267 which receives the actuating arm 268 of a switch 269 that is disposed in close relationship to the platen. When there is no paper in the machine the actuating arm 268 falls into the groove 267 and places the switch in an open condition.

When paper is placed into the machine it forces the actuating arm 268 out of the groove 267 and causes the switch to close. As will be fully described in detail below, the translator circuit associated with the present invention makes it possible for a transmit typewriter to determine whether or not the switch 269 of a receive typewriter is open or closed and thus whether or not the receive typewriter is equipped with paper and in condition to receive a message. This provides a very important feature in that it prevents a message from being transmitted while the transmitting operator believes paper is in the remote typewriter. Without the benefits of this feature of the present invention it is possible for a message to be transmitted in the full belief that it has been received and the receive typewriter in no way even indicate that a message had been received but not recorded.

The foregoing description teaches an economical and highly advantageous means for modifying an IBM Selectric typewriter in a manner which results in the typewriter emitting an electrical signal each time it performs a print or function operation. The modifications taught above also make it possible for the typewriter to respond to electrical pulses by performing any of the print or function cycles which it is capable of performing in response to a manual signal. The particular modifications set forth above form a portion of the present invention but are not required for the overall system which is taught by the present invention. Thus those typewriters presently known in the art which generate electrical signals characterizing their operation and which are capable of responding to electrical signals by performing their various operations can be employed as part of the overall system of the present invention to the extent they are compatible with those components of the invention yet to be described.

The description which follows teaches that portion of the present invention which enables the signals generated by a transmitting typewriter to be conveyed over a two-wire transmission system such as telephone wires to a receive typewriter and effectively energize those solenoids necessary to induce the desired typewriter operation. Since a transmit typewriter characterizes a print operation by the condition of seven different switches and it is necessary for as many as seven solenoids of the receive typewriter to be energized simultaneously, it becomes apparent that in order for the typed information to be electrically transmitted over a two-wire transmission system some type of translating system must be electrically interposed between the typewriters.

TRANSLATOR

If selector latches 61, 62, 76, 77, 78 and 79 are arbitrarily assigned binary weights of 1, 2, 4, 8, 16 and 32 respectively, a code chart can be constructed which uniquely identifies each character and symbol that the typewriter prints by a particular number, where the number associated with a character or symbol is arrived at by adding the binary weights of all latches withdrawn during the print cycle of that character or symbol. A code chart constructed this way is set out in FIG. 20 wherein of the 64 possible binary combinations, 44 are employed to uniquely identify the 44 upper case and 44 lower case characters and symbols carried by the type head. From the chart, it can be seen, for example, that the lower case letter "n" is printed when the latches having binary weights of 1, 4 and 16 are withdrawn. And, in fact, when latches 61, 76, and 78 are withdrawn, the remaining latches produce the necessary rotation and tilting of head 31 to dispose the lower case "n" in a position to be printed. Due to the fact that the code is predicated on those latches which are withdrawn, instead of those latches which remain, the code, in fact, represents the discarded information as opposed to the information used. This is somewhat more advantageous due to the fact that it is the removal of corresponding latches in a remote typewriter which is the final result desired.

As previously described, a switch is associated with each of the selector latches and is changed from its normally open condition to a closed condition when the latch is withdrawn. By definition, an open switch is referred to as a "space" and a closed switch is referred to as a "mark" whereby every character is defined as a certain combination of marks and spaces. The letter "n" reading from the lowest binary weight to the highest is given by the following combination of marks and spaces: mark, space, mark, space, mark, space. Since all of the latches which are withdrawn during the print cycle of a particular character are withdrawn simultaneously, the particular mark-space pattern which defines that character is generated in parallel form which is not suitable for transmission over a two-line system. Accordingly, it is necessary for the parallel, six-bit (each space and each mark being considered a single bit) character to be translated into a six-bit serial pulse train which preserves the mark-space arrangement which defines the character which is being printed at the transmit typewriter and which is to be printed at the remote typewriter. To perform this function the present invention teaches a parallel-to-serial translator of a unique design having many advantages over parallel-to-serial translators now known in the art, most of which employ shift registers of one variety or another.

(a) Transmit logic

Referring now to FIG. 21, a transmit typewriter is characterized in general terms as a data source which is disposed to present information to six separate information channels. When the typewriter performs a print cycle, the switch associated with latch 61 provides information to Channel 1 (CH1), the switch associated with latch 62 provides information to Channel 2 (CH2), the switch associated with latch 76 provides information to Channel 3 (CH3), the switch associated with latch 77 provides information to Channel 4 (CH4) and the switches associated with latches 78 and 79 provide information to Channels 5 and 6 (CH's 5 and 6), respectively. Each channel is comprised of a space side (S) and a mark side (M) wherein each side has a normal state (not energized) and a set (energized) state. Except for CH's 5 and 6, the space side of each channel has associated therewith a gate which is capable of directing an input signal presented thereto to one of two paths. The particular path to which a gate directs an input signal depends on whether or not the space side of the channel with which the gate is associated is in its normal state or in its set state. The particular channel with which an S gate is associated is identified by the numeral associated therewith. Thus, gate S1 is the gate which is associated with the S side of CH1 and operates in accordance with conditions thereof. In a like manner, the M side of each channel, with the exception of CH1, has associated therewith a gate which directs an input signal to one of two possible paths depending on the condition of the M side of the channel with which that particular gate is associated. The numerals associated with the M gates identitfy the channel with which that gate is operatively associated.

Each time the data source (typewriter) generates a character, a signal is sent to an S set device which responds to the signal by setting (energizing) the S side of each of the channels (with the exception of CH6 which has no S side). At the same time that the S set device is setting the S side of each channel, the data source directs a signal to the M side of each channel which is associated with a latch that has been withdrawn. Thus, using the example of the letter "n" which the chart of FIG. 20 shows to be expressed by a mark in CH's 1, 3 and 5 and a space in CH's 2, 4 and 6, the M side of CH's 1, 3 and 5 receive signals from the data source which are set. Actually, CH1 does not receive mark signals from the data source. That mark signal associated with CH1 is diverted to the Next Bit Interpreter (NBI) for reasons which will be made clear below.

Thus, channels represent a space condition (their associated latch has not been withdrawn) by having only their space side set, and a mark condition (their associated latches withdrawn) by having both their mark and space sides set.

At the same time that the S set device energizes the S side of the channels it also sends a signal to the Transmit Clock which responds thereto by generating a train of evenly spaced pulses all of the same polarity. The pulses from the Clock are directed to an output gate 306 which is capable of transmitting a mark (positive) pulse in response to a clock pulse or a space (negative) pulse in response thereto. Whether a mark or space pulse is generated in response to a clock pulse is determined by the Next Bit Interpreter. The NBI is a device having two states, one of which can be considered a normal state and the other a set (energized) state wherein the output gate 306 transmits a mark signal when the NBI is set and a space signal when the NBI is not set. The first pulse out of the Clock must induce the gate 306 to transmit a pulse which corresponds to the information associated with CH1. In our example of the letter "n," CH1 is in a mark condition and thus the NBI must be energized when the first clock pulse is generated. In order for the NBI to be so properly energized, the mark information from the data source is not directed to CH1 but diverted to the NBI instead. A mark signal from the data source to the NBI results in the NBI being energized. Having been energized by the mark signal from the data source, the NBI conditions the gate 306 to transmit a mark signal in response to the first clock pulse and in this way the information associated with CH1 and the first transmitted pulse correspond to one another.

Simultaneously with the first clock pulse going to gate 306 it also goes to a Line Alternator, L/A, which operates to direct the clock pulse alternately to one of two output paths 307 and 308. The L/A directs the first pulse from the clock to path 307 which leads to the input of the S1 gate. The S1 gate has an output path 309 and an output path 311 to which the incoming pulse can be directed. When the S side of CH1 is set, the S1 gate directs all incoming pulses to its path 311 and blocks them from path 309. Conversely, when the S side of CH1 is not set all pulses coming into gate S1 are directed to path 309 and prevented from entering path 311. The path 311 has an associated branch path 312 which leads to the First Bit Latch device, 1st BL, which responds to a pulse by providing continuing energization for those sides of the channels which have been set (all S sides and selected M sides) so that the data source can be isolated from the information channels to prevent subsequent data generated by the data source from interfering with the data in the translator which has not yet been transmitted.

Thus, the first pulse from the clock passes through the Line Alternator, L/A, to the S1 gate from which it travels to the 1st BL which provides a source of energy for maintaining the information in the channels. Besides energizing the 1st BL, the pulse which passes through the S1 gate also enters the M2 gate which is associated with the S1 gate by the path 311. The M2 gate has a pair of output paths 313 and 314 which lead to the S side and M side of the NBI respectively. A pulse which passes over path 313 to the NBI places the NBI in its normal state such that the gate 306 is conditioned to respond to a clock pulse by transmitting a space signal. A pulse traveling over path 314 operates to energize the NBI which in turn conditions the gate 306 to respond to a clock signal by transmitting a mark signal. The M2 gate directs the incoming pulse to path 313 if the M side of CH2, is not set and to path 314 if the M side of CH2 has been set. Since the latch associated with CH2 is not withdrawn during the print cycle of the letter "n" the M side of CH2 has not been set, and the pulse from S1 passes through gate M2 to path 313.

Thus the results after the first pulse from the clock is the transmission of the mark signal, the energization of the 1st BL, and the conditioning of the NBI to its normal state for the purpose of placing the gate 306 in condition to transmit a space signal.

The second pulse out of the clock is directed to the gate 306 which responds thereto by the transmission of a space signal by virtue of the NBI having been placed in its normal state. At the same time, the second pulse passes through the L/A to the path 308 which directs it through the S2 gate. The S2 gate has a pair of output paths 316 and 317 to which the incoming pulse can be directed. When the S side of CH2 is set, the S2 gate directs incoming signals to path 316 and prevents them from entering path 317. A branch path 318 off of path 316 leads to the S side of CH1 and a pulse transmitted over this path operates to de-energize (reset) the S side of CH1 and place it in its normal state. The line 316 leads to gate M3 which has a pair of output paths 319 and 320 which leads to the S side and M side of the NBI, respectively. Thus, the second pulse travels over path 308 to path 316 from which it branches off to the path 318 to reset the S side of CH1. The pulse also travels over path 316 and enters the gate M3 from which it emerges on path 320 which leads to the M side of the NBI. Since the M side of CH3 was set, the M3 gate directed the incoming pulse to path 320. Had CH3 been in a space condition the M side would not have been set and the incoming pulse to M3 would have been directed to path 319. Since the NBI receives a pulse from the M path it becomes energized and thus conditions the gate 306 to transmit a mark signal in response to the next clock pulse.

The second pulse is thus seen to have performed three distinct operations which can be characterized as having connotations of past, present and future. The second clock pulse operated to de-energize the S side of CH1 and in that regard operated on the past. It provided the pulse which initiated the transmission of the number 2 pulse to represent the condition of CH2 and in this regard is associated with the present. Its operation in conditioning the NBI has future connotations since the condition of the NBI determines what the gate transmits in response to the subsequent (in this case third) pulse. As will be seen from the following description, each pulse, with the exception of the first and last, operates to perform three distinct operations one of which is associated with the past, the other with the present and the third with the future.

The third pulse out of the clock is directed to the gate 306 and results in the transmission of a mark signal due to the NBI having been energized by the second pulse. The L/A directs the third pulse to path 307 and gate S1. By virtue of the fact that the second pulse de-energized the S side of CH1, gate S1 is in its normal state and thus directs the input pulse thereto to path 309. Path 309 acts as the input to gate S3 which directs input signals to one of its two outputs paths 322 and 333. When the S3 gate is energized by virtue of the S side of CH3 being energized, input signals are directed to path 333 which has a branch path 334 leading to CH2. The path 333 itself leads to gate M4 which has a pair of output paths 336 and 337 which lead to the space path and mark path, respectively, of the NBI. When the M4 gate is energized by virtue of the mark side of CH4 being energized, incoming signals are directed to path 337. When the M4 gate is not energized, incoming signals are directed to path 336. Thus, the third clock pulse enters gate S3 from which it travels over path 334 to de-energize CH2 and over path 333 to gate M4 from which it is directed to path 336 which leads to the space side of the NBI de-energizing the NBI and conditioning the gate 306 to transmit a space signal in response to the next clock signal.

Thus, the first three pulses from the clock have induced transmission of a mark, space and mark signal, in that order, corresponding to the mark, space, and mark conditions of CH's 1, 2 and 3, respectively.

The fourth clock pulse is directed to gate 306 which responds thereto by transmitting a space signal due to the NBI having been de-energized by the third pulse. At the same time, the fourth clock pulse passes through the L/A to path 308 which leads to gate S2. Since the third pulse operated to de-energize the S side of CH2, the S2 gate is de-energized and directs the incoming pulse to path 317 which leads to gate S4. Gate S4 has a pair of output paths 338 and 339 with input signals being directed to the former when the S side of CH4 is set and to the latter when the S side of CH4 is not set. A branch path 341 off of path 338 leads to CH3 and pulses directed over this path operate to reset the S side of that channel. Thus, the signal which enters gate S4 is directed to paths 338 and 341 resulting in the resetting of the previously set S side of CH3 and the presentation of a pulse to the gate M5 to which path 338 leads. Gate M5 has a pair of output paths 343 and 344 which lead to the space and mark sides, respectively, of the NBI. When the M5 gate is energized in response to the mark side of CH5 being energized, incoming pulses are directed to path 344 while path 343 receives the incoming pulses when the mark side of CH5 is not in a set condition. Since the mark side of CH5 is set for the letter "n," the pulse traveling over path 338 passes through gate M5 to path 344 and operates to set the NBI and thereby condition gate 306 to transmit a mark signal in response to the next clock pulse.

The fifth clock pulse passes through gate 306 as a mark signal and passes through the L/A to the path 307. Gates S1 and S3 having been reset, the pulse travels over paths 309 and 322 to gate M6 to which path 322 leads. The pulse also travels over branch path 345 off to path 322 to CH4 for the purpose of resetting the S side of that channel. Gate M6 has a pair of outputs 346 and 347 which lead to the space side and the mark side of the NBI respectively. When the M side of CH6 has been set, pulses coming into gate M6 are directed to path 347 while path 346 receives pulses when the M side of CH6 has not been set. Since our example does not include a CH6 mark condition, the gate M6 is in its normal state and the incoming signal passes over path 346 to the space side of the NBI causing it to be reset and thus condition the gate 306 to respond to the next clock pulse by transmitting a space signal.

It is noted that there is no S5 gate corresponding to the S side of CH5. This is due to the fact that the fifth pulse is the last odd pulse in the six channel system illustrated in FIG. 21. Thus, there is no subsequent odd pulse to direct around CH6 and the necessity for an S gate does not exist. This will be true of the penultimate channel in any system regardless of the number of channels employed.

The sixth pulse out of the Clock passes through gate 306 and as a space signal, corresponding to the space condition of CH6, and is simultaneously directed through the L/A to path 308 leading to gate S2. Gates S2 and S4 have been previously set to their normal state and thus the pulse travels over path 317 and 339 to the 1st BL to which path 339 leads. A branch path 348 off of path 339 leads to CH5 and a pulse transmitted over that path results in the S side of CH5 being reset. Since the S side of CH5 does not operate an associated S gate it would be possible to completely eliminate the S side of CH5 and thus the connection therewith of the 1st BL and also path 348. As will be apparent in the description which follows, however, the S side of CH5 is essential to proper operation of the translator as a receiving device and thus is present for that purpose.

The effect of the sixth pulse on the 1st BL is to release the 1st BL from the channels whereby the channels are conditioned to receive another character from the data source.

In the foregoing description it becomes clear that each time a pulse is generated by the Clock an output is transmitted from gate 306 and the output is a mark or a space signal in accordance with the information which the data source placed in the six information channels. Thus, the first pulse transmitted from gate 306 corresponds to the information in CH1, the second pulse to the information in CH2 and so on through CH6. It is clear that the number of channels is merely a matter of choice which will be dictated by the needs of the system with which the present invention is employed and in no way affects the overall logic or theory of the present invention. In fact, the clock pulse current requirements do not increase as channels are added to the system.

There are several circuits or devices presently known in the art which can perform the functions of the channels and their S and M gates, the NBI, the S set, the 1st BL, the L/A, the Clock, and the gate 306. The present invention teaches a particular set of circuits and devices, some of which are new and novel, for realizing the functional operation described above. The preferred embodiment, to be described in detail, has many advantages over other means for realizing such a device but does not necessarily limit the invention to this one approach.

Thus, to summarize the transmit portion of the translator: as the typewriter cycles it supplies information to the channels of the translator and this information is employed to generate a series of pulses which is a sequence of mark and space signals which correspond to the sequence of mark and space signals which form the parallel information provided by the data source. A print cycle on a typewriter takes approximately 64.5 ms. The total time required by the translator of the present invention to translate the parallel information into serial information and transmit this information to a second translator which translates the information back into parallel information, is approximately 50 ms. This 50 ms. time for translation is achieved using the particular components which will be described below. By virtue of the ability of the present invention to operate considerably faster than an associated typewriter, it is apparent that the present invention has solved the serious problem of the typewriter overrunning the transmission system and thereby limiting the ultimate transmission speed of information by such a system.

The transmit logic of the present invention is a contribution to the art aside from its relation to the overall communication system taught herein. The transmitter is a parallel-to-serial converter which has many advantages over shift registers which are popularly used for converting purposes. The logic of the transmitter teaches a converter which does not tax the driver pulses as a function of the number of channels. Since each incoming pulse goes directly to the channel with which it is associated and no other, the energy requirements of information pulses is totally independent of the number of channels in a system. This makes it possible to design systems with very large numbers of channels without creating a serious problem as to the energy level of information pulses.

The logic of the transmitter also teaches, for the first time, a converter which does not require a counter to inform the system when a complete code character has been converted. The complete elimination of a counter greatly simplifies the converter and thereby reduces its cost while increasing its reliability. Also, the gates associated with the converter of the present invention operate, on the average, only one-third as often to convert a six-bit code as the corresponding gates of a shift register. This becomes even more significant as channels are added. This results from the arrangement whereby each channel operates only once for each code conversion.

The foregoing description of the transmit portion of the translator of the present invention was made with reference to a typewriter character print cycle which was characterized by the operation of a six-latch system having six switches associated therewith. When a function operation is performed by the typewriter, generally only a single switch is operated as a result thereof and this single switch does not in itself provide enough information to enable it to be sent directly to the translator. Accordingly, it is necessary that each switch which identifies a particular functional operation be associated with a matrix which will be described in detail below. The output of this matrix is a six-bit signal suitable for properly energizing the channels of the transmit portion of the translator in essentially the same manner described above. Once the channels are properly energized the operation of the transmitter proceeds in the identical manner described above.

(b) Transmit circuits

The logic circuit of FIG. 21 is advantageously realized with the use of control modules formed from glass encapsulated reed switches disposed within multiple wound coils. The use of glass encapsulated reed switches within multiple wound coils for logic circuit operations is well-known in the art, although it is a technique which has found relatively widespread use in only the last several years. Switching circuits employing coil-operated glass reed switches are extremely versatile, small, quiet and relatively low cost and are most advantageously used in situations which do not call for extremely high speed operation. In the present invention the output from the clock is set at 120 pulses per second which is a speed well within the capability of glass reed switches thus making it unnecessary to employ less versatile and more costly solid-state switches. Because of the fact that glass reed switches' lives are extended in circuit operations which do not require load switching (in most instances there is no voltage potential on the individual switch elements during contact transfer), these switches are capable of operating over long periods of time with high degrees of reliability. These circuits are often referred to as dry switching circuits.

The control modules used in the present invention employ single-wound coils, as well as double-wound coils, which surround glass reed switches, some of which are normally open and some of which are normally closed, as well as single-pole double-throw switches which are the equivalent of two parallel switches one of which is open when the other is closed and vice versa.

When a normally open, single-pole, single-throw glass reed switch is disposed within a double-wound coil, for example, and one of the windings is energized, the switch closes. The switch can be open or restored to its normal state in one of two ways. Either the energized winding can be de-energized in which case there is no source of a magnetic field to act upon the glass reed switch, or else the other and oppositely polarized winding of the double-wound coil can be energized for the purpose of counteracting the effect of the winding which was initially energized to close the switch. Thus when both windings of a double-wound coil (each winding developing an oppositely polarized magnetic field to the other) are energized they cancel the effect of one another and the switch assumes its normal condition. When a winding is energized for the purpose of counteracting an associated winding, it is referred to as a buck-down coil and the entire coil module is said to have been bucked-down. The primary logic of FIG. 21 is advantageously realized through the use of glass reed-coil modules as will be seen from the following description. With regard to certain of the switches it is advantageous, however, to employ a small number of solid-state switching devices where a load must be switched.

The schematic symbol which is most widely used to indicate a glass encapsulated reed switch is a pair of spaced-apart parallel straight lines which are perpendicular to the lines representing the circuit conductors in which the switch is electrically disposed. It is recognized that this same symbol has been used to represent a capacitor, but confusion is avoided in the present application by using a straight line and an arched line in spaced-apart opposing relationship to represent a capacitor as has become the symbol more widely used in the past several years. A glass-encapsulated reed switch which is normally open is represented by a pair of spaced-apart parallel straight lines as mentioned above, while a normally closed switch is represented by same two spaced-apart parallel straight lines with a single slash line drawn through the two parallel lines. Because of the fact that a single coil (whether it be single-wound or double-wound) will usually surround a plurality of switches, and these switches are almost always in circuits remote from the circuit of the coils which determine their state, it becomes necessary to adopt an identification convention which will make it readily apparent which switches are associated with which coils. Thus, all of the switches which are associated with the S side of CH1 (i.e., which change their state when the S side of CH1 is energized and which are in their normal state when the S side of CH1 is not energized) are identified as **S1*n*** switches where the number *n* is used to distinguish between the several switches which may be operated by the S side of the CH1. Similarly, the switches associated with the M side of CH2, for example, are identified as **M2*n*** switches. A similar convention is adopted for the other modules (i.e., NBI, L/A, etc.) and will be explained as the need arises.

Figure 22:
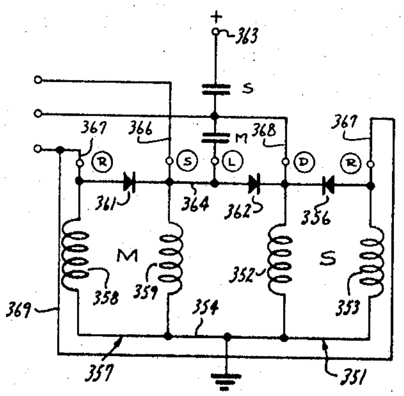

FIG. 22 illustrates a circuit which is advantageously employed to perform the functions previously described as being performed by CH's 2 through 5. CH's 1 and 6 employ a somewhat different circuit which will be described below. Referring now to FIG. 22, the S side 351 of the channel includes a double-wound coil comprised of windings 352 and 353. The windings are wound on a common core with voltage applied in opposite directions so that when both windings are energized, they cancel (buck down) the effect of one another. The windings are electrically joined at one end by a conductor 354, which is grounded, while the other ends are connected through a diode 356. The diode is oriented such that it presents a low resistance current path from winding 353 to winding 352 and a high resistance path in the opposite direction.

The M side 357 of the channel includes a double-wound coil comprised of windings 358 and 359, which are wound on a common core such that when both windings are energized they cancel the effect of one another. One end of each winding is connected to ground through conductor 354 while the other ends are joined through a diode 361 which is oriented to establish a low resistance path from winding 358 to winding 359 and a high resistance path in the opposite direction. Diodes 361 and 356 are electrically connected through a diode 362 which is oriented to establish a low resistance current path in the direction of diode 356 from diode 361. A normally open M switch (a switch which is controlled by the windings of side 357 of the channel) and a normally open S switch (a switch which is controlled by the windings of side 351 of the channel) are electrically joined in series between a positive voltage source 363 and the conductor 364 which joints diode 361 to diode 362. The circuit between source 363 and conductor 364 is commonly referred to as the latch line circuit and identified by an L in a circle. Both the M side 357 and the S side 351 of the channel can be set (one winding of each energized) by a single pulse on the set line 366 (the set line being identified by an S in a circle). The set line is electrically connected to conductor 364 and a pulse on the set line is directed down the winding 359 of the M side of the channel and winding 352 of the S side of the channel. Diodes 361 and 356 prevent the windings 358 and 353, respectively, from receiving the set pulse. As the pulse energizes the windings 359 and 352 the switches associated with each side of the channel are changed from their normal state to their energized state. Thus the M and the S switches close. When the M switch and S switch close a complete circuit is established between the source of potential 363 and the line 364 whereby windings 359 and 352 are provided with a source of energization which continues after the duration of the set pulse ends. The voltage magnitude of the set pulse is designed to be approximately equal to the magnitude of the voltage magnitude of the source 363 so that when the S and M switches change from an open to a closed state (which occurs during the duration of the set pulse) they are not required to switch a load. All of the other switches associated with the M and the S sides of the channel (which are not shown in FIG. 22) also change from their normal state to their energized state and remain so energized as long as only one of the windings of the coil with which they are associated is energized.

Reset conductors 367 (indicated by an R in a circle) are electrically connected by conductor 369 and together therewith connect the diode-isolated winding 358 of coil 357 with the diode-isolated winding 353 of coil 351. When both sides of the channel are set and a pulse is established on the reset conductors 367 the pulse travels down windings 358 and 353 and operates to buck-down the associated coils 359 and 352 and thus restore the switches associated with the coils to their normal state (the channel is reset). When both the M and S sides of the channel have been bucked down, the M and S switches both open whereby the latch line no longer makes a source of potential available to windings 359 and 352. An important feature of the reset line is that a pulse established thereon is not exclusively directed to windings 358 and 353, but is also available to windings 359 and 352. This is important to insure that the coils remain bucked down for the duration of the reset pulse.

A direct conductor 368 (identified by a D in a circle) electrically connects the juncture between the M and S switches with the juncture between diodes 362 and 356. When a pulse is established on the direct line 368 it operates to energize the winding 352 of S coil 351 exclusively and thus set only the S side of the channel. The connection between the S switch and winding 352 by the direct conductor enables the winding 352 of S coil 351 to be latched to source 363 even though the M switch remains open. Thus, a pulse on direct conductor results in the S side of the channel setting while the M side remains unset. In order to reset the S side when it has been set by a pulse on the direct conductor, the reset conductor 367 is again pulsed resulting in winding 353 bucking-down winding 352 whereby the S switch is opened and no longer provides a path between the winding 352 and the voltage source 363.

It should be noted that as either the M latch switch or the S latch switch begins to open there is no arc since as either switch opens and the resistance in that particular circuit increases as the result of the contact separation the voltage potential for windings 352 and 359 is supplied through reset conductors 367 until the end of the reset pulse.

By properly directing pulses to either the set, reset or direct conductors of the channel it is possible to perform all of the functions which CH's 2–5 were described as performing in the description given above with reference to FIG. 21.

Figure 23:
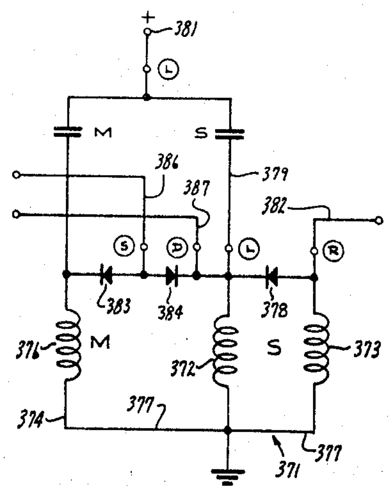

Referring now to FIG. 23, CH1 includes a space side 371 including a double wound coil comprised of windings 372 and 373, and a mark side 374 which includes a single-wound coil 376. The space side of CH1 is similar to the space sides of CH's 2–5 in that one end of each winding is grounded through a conductor 377 and the other ends of the windings are connected through a diode 378 which is disposed to provide a high resistance current path in the direction of winding 373 from winding 372. Connected to the winding 372 at its non-grounded end is a latch line 379 which includes an S switch that is normally open and separates the latch line from a voltage source 381. The non-grounded end of winding 373 is connected to a reset line 382.

One end of coil 376 is connected through line 377 to ground while the other end is connected to diode 378 through a pair of series-connected diodes 383 and 384 wherein the anodes of these diodes are connected to each other and the cathode of diode 383 is connected to the winding 376, and the cathode of diode 384 is connected to winding 372 and the cathode of diode 378. A set line 386 is electrically connected between the diodes 383 and 384 while a direct line 387 is connected between the diodes 384 and 378. An M switch, which is normally open, is electrically disposed between the source 381 and the non-grounded end of coil 376. As previously described with reference to FIG. 21, CH1 does not receive mark signals from the data source and thus it is not necessary to provide CH1 with means for storing a mark signal during the transmit cycle. The single mark coil 376 which is present in the CH1 is for receiving purposes and its operation will become clear when the receive portion of the invention is described. Thus when the translator operates as a transmitter, CH1 receives only an S set signal which results in a pulse on direct line 387 and winding 372. A pulse through winding 372 results in it being latched to source 381 due to the S switch closing. A pulse on the reset line 382 operates to energize winding 373 which bucks-down winding 372 and causes the S switch to open and remove the source from the S side of the channel. A pulse signal on set line 386 results in both the mark and space sides of the channel being set, and since the reset line 382 does not operate to reset the M side of the channel, the only way of resetting the M side of CH1 is to remove the source of voltage from the latch line, and thereby open the M switch. As will be shown in detail below, the circuit of the preferred embodiment of the present invention includes means for removing the source 381 and thereby resetting the coil 376.

Figure 24:
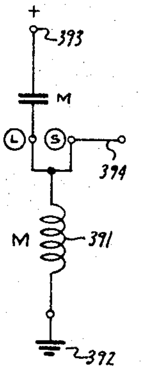

Referring to FIG. 24, CH6 is formed from a single coil 391 which is electrically disposed between ground 392 and a source of voltage 393 with an M switch electrically disposed between the source 393 and the coil. The line in which the M switch is disposed acts as a latch line while a line 394 connected to the ungrounded end of coil 391 acts as a set line. A pulse on the set line operates to energize coil 391 and thus close the M switch which is normally open. This results in the coil being latched to the source 393. There is no reset line since there is no buck winding and once again the only means for resetting the coil is to remove the source 393.

The previous description of the operation of CH6 stated that it does not need a space side for operation as part of the transmitter. The description of the receive portion of the translator which will be given below shows that CH6 does not enter into the receive function and thus the needs of the transmit operation dictate the design of CH6.

Figure 25:
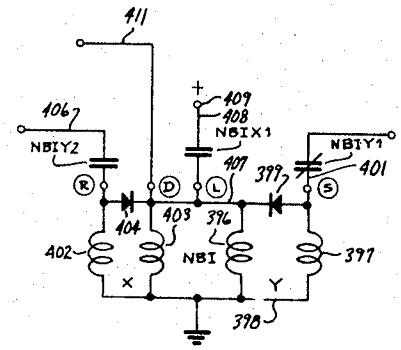

Referring to FIG. 25, the NBI has an X side and a Y side each including a double wound coil. The double wound coil of the Y side is comprised of a winding 396 and a winding 397 which are connected at one end by a conductor 398 leading to ground, and at their other end by a diode 399, the anode of which is connected to winding 397 and the cathode of which is connected to winding 396. Electrically connected between diode 399 and winding 397 is a set line 401 which includes a normally closed Y switch NBIY1. The double wound coil which forms the X side of the NBI comprises a winding 402 and a winding 403 which are joined at one end by conductor 398 which lead to ground. The other ends of windings 402 and 403 are joined through a diode 404 which presents a high resistance current path from winding 403 to 402 and a low resistance current path in the opposite direction. Electrically connected between diode 404 and winding 402 is a reset line 406 which includes a normally open Y switch NBIY2. The diodes 404 and 399 are electrically joined by a conductor 407 to which a latch line 408, leading to a voltage source 409, and a direct line 411 are electrically joined. The latch line includes normally open switch NBIX1 which is controlled by the X side of the NBI.

When the set line 401 of the NBI is pulsed, the diodes 399 and 404 direct the pulse down windings 397, 396 and 403. The presence of a pulse in both windings 396 and 397 prevents the Y side of the NBI from setting while the X side sets by virtue of the fact that the single winding 403 is energized while winding 402 is not. The setting of the X side operates to close the switch NBIX1 providing a source of potential to the winding 403 which is not terminated when the pulse ends. As long as the pulse is in the circuit, windings 396 and 397 buck each other and prevent the Y side from setting. When the pulse ends, however, the latch line 408 supplies a source of potential to winding 396 which is not available to winding 397 and the Y side sets. Thus, while the set pulse is in the circuit only the X side of the NBI sets, while when the pulse ends the Y side also sets.

When the Y side of the NBI sets, the normally closed NBIY1 switch opens and the normally open NBIY2 switch closes. This prevents a pulse on the set line 401 from bucking-down the Y side of the NBI and makes it possible to buck-down the X side by applying a pulse to the reset line 406.

When the NBI is in its normal, unset state and a pulse is directed over the direct line 411 both the X and Y side of the NBI set in response to the pulse energizing windings 403 and 396. Unlike the situation when a pulse is presented over the set line 401, both sides set as the pulse enters the system and remain set after it terminates, due to source 409 being latched to windings 403 and 396 by the latch line 408. The reason for providing these two different methods of energizing both sides of the NBI is related to the potential conditions which exist in the circuit and which must be accounted for to prevent a switch operating under load conditions. A more complete explanation of the reason for providing two means for energizing the X and Y sides of the NBI is best given together with the description of the NBI in relation to the other sub-circuit and will, therefore, be postponed until that description is given.

Assuming both the X and Y sides of the NBI being set, a pulse on the reset line 406 operates to energize winding 402 which bucks down winding 403 causing the latch switch NBIX1 to open and thereby remove the source of potential from windings 403 and 396. At the termination of the reset pulse the NBI is restored to its normal state and is in condition to respond to a set pulse in the manner previously described.

Figure 26:
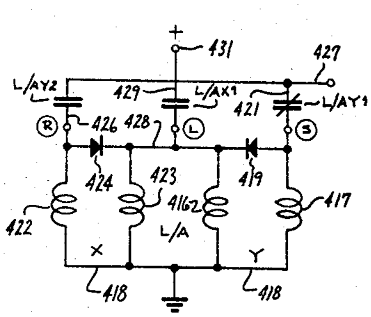

Referring now to FIG. 26, the L/A includes a Y side formed from a double wound coil comprising winding 416 and winding 417 which are joined at one end to a conductor 418 that leads to ground. The other ends of the windings are joined by a diode 419 which is oriented to provide a high resistance path in the direction of winding 417 from wnding 416. Electrically connected between diode 419 and winding 417 is a set line 421 which includes a normally closed switch L/AY1.

The L/A also includes an X side comprising a double-wound coil formed by windings 422 and 423 which are joined at one end to conductor 418 which leads to ground. The other ends of the windings 422 and 423 are joined by a diode 424 which is oriented to provide a high resistance path in the direction of winding 422 from winding 423. Electrically connected between diode 424 and winding 422 is a reset line 426 which includes a normally open switch L/AY2. The input to the set line and reset line is provided over a common line 427. Thus the L/A operates not as a function of where a pulse is applied but as a function of its condition when a pulse is applied. The diodes 424 and 419 are electrically joined by the conductor 428 to which a latch line 429, including a normally open switch L/AX1, is electrically joined. Assuming the circuit is completely unenergized, a pulse on line 427 will pass down the set line 421 from which the diodes 419 and 424 direct the pulse down windings 416, 417 and 423. The presence of the pulse in both of the Y windings prevents the Y side from setting but the X side is conditioned to set whereby the latch line switch L/AX1 closes making a voltage source 431 available to conductor 428. When the pulse ends, winding 423 remains energized by virtue of the voltage provided down latch line 429 and the Y side sets by virtue of the energization to winding 416 which is provided with current through the latch line. Winding 417 cannot receive energization from the latch line due to diode 419 and thus the termination of the pulse results in de-energization of winding 417 whereby the single energized winding in the Y side of the L/A enables that side to set. When the Y side sets, switches L/AY1 and L/AY2 switch from their normal state to their set state and become opened and closed, respectively.

The next pulse presented to line 427 is directed down the reset line (switch L/AY1 is now open) from which it is directed down windings 422, 423 and 416. The presence of energization in both windings 422 and 423 causes the X side of the L/A to be bucked-down which results in switch L/AX1 being restored to its normal state and thus isolating the source 431 from the windings. As long as the reset pulse is in the circuit, winding 416 is energized while winding 417 is not energized and the Y side remains set until the pulse terminates. The X side of the L/A resets immediately, however both windings become energized and buck one another. Thus at the termination of the reset pulse the L/A is restored to its normal state and the next pulse received operates in the manner described above. Thus the L/A changes its condition each time a pulse is directed to line 427.

The reason for having one portion of the L/A circuit bucked down immediately upon the presence of a reset pulse and the other portion reset at the termination of the pulse is to insure that all switching takes place under no-load condition.

Figure 27:
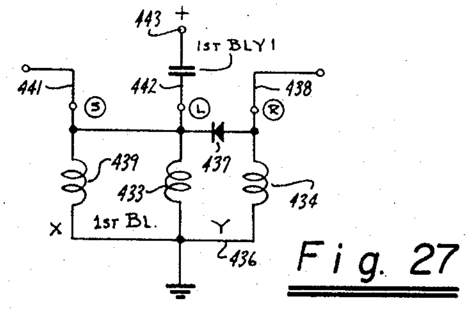

Referring now to FIG. 27, the 1st BL includes a double-wound coil Y side and a single coil X side. The Y side is formed from a pair of windings 433 and 434 which are joined at one end to a conductor 436 which leads to ground. The other ends of the windings are connected through a diode 437 which is oriented to provide a high resistance path in the direction of the winding 434 from winding 433. Electrically connected between the winding 434 and diode 437 is a reset line 438.

A single-wound coil 439 electrically connected at one end to conductor 436 and at its other end to a set line 441 and diode 437 forms the X side of the 1st BL. A latch line 442, including normally-open switch 1st BLY1, is connected between diode 437 and coil 439 at one end and at its other end is connected to a voltage source 443.

A pulse on set line 441 operates to energize coil 439 and winding 433 resulting in both the X and Y side of the 1st BL being set. The setting of the Y side operates to close the normally open switch 1st BLY1 thereby latching coil 439 and winding 433 to the source 443. When both sides are set, a pulse on reset line 438 operates to energize windings 433 and 434 resulting in the Y side of the 1st BL being bucked-down which operates to restore switch 1st BLY1 to its normally open state whereby the source 443 is isolated from the winding 433 and the coil 439 and the 1st BL resumes its normal condition. It is to be noted that coil 439 is energized by a reset pulse, such that the X side holds onto the reset pulse and actually resets only upon termination of that pulse. The Y side on the other hand, terminates at the leading edge of the reset pulse. This difference is mainly for the purpose of insuring that all switching is dry.

One of the several novel sub-circuits taught by the present invention is that which performs the function of a clock as previously described. The clock (pulse generator) serves as the primary source of output pulses which are transmitted over the two-wire communication system and thus is required to generate six whole evenly spaced pulses for each typewriter operation. A most convenient source of electrical pulses having the time requirements of the present invention is found in common sixty-cycle line voltage sources. By full-wave rectification, a sixty-cycle line source is converted into a pulsing D.C. source which generates six pulses every fifty milliseconds.

One of the problems in using this readily available source of properly timed pulses is the possibility of starting a series of pulses with a partial pulse. Since the typewriter operator is obviously unable to time the operation of the typewriter so as to have the data source operate the S set device at precisely that moment which occurs between the pulses of the pulsed D.C. source, some other means must be provided by which the clock begins operation only at the beginning of a pulse and not during a pulse. By designing a clock to operate in this manner it is possible that the transmit operation will be slowed down by the time required to wait for a partial pulse to pass so that the next complete pulse can be emitted at the first pulse. Since the maximum time of such a delay is something less than one complete pulse (which is approximately 8⅓ ms.) the total time for a complete transmit operation under the most adverse circumstances is approximately 58⅓ ms. This is enough less than the 64½ ms. required to complete a typewriter cycle to insure that the transmitter is cleared and ready to receive the next character in sufficient time.

Figure 28:
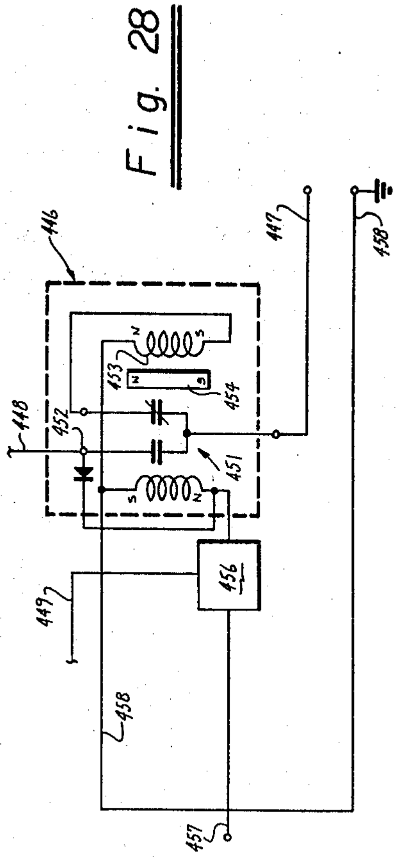

Referring to FIG. 28, the clock 446 has an input of full wave rectified sixty-cycle voltage over conductor 447 and directs that voltage to its output conductor 448 when a signal indicating that a character code is to be transmitted is present on conductor 449. The primary element of the clock 446 is a form C (single pole, double throw) glass encapsulated reed switch 451 which is enclosed within a double wound coil comprising windings 452 and 453. In addition to the windings 452 and 453, the switch 451 is influenced by the presence of a permanent magnet 454 to maintain its operated state (i.e., the normally closed side is open and the normally open side is closed). The orientation of the winding 453 is such that when it is energized it produces a magnetic field which adds to that of the magnet 454 in influencing the switch to maintain its operated state. The winding 452 is oriented in the opposite direction to winding 453 and thus when it is energized it creates a magnetic field which partially (½) bucks the magnetic field of magnet 454 and winding 453. The important relationship between the two windings and permanent magnet is that the magnetic field produced by the winding 452 is not sufficient to buck both the energized winding 453 and the magnet 454 to the extent of releasing the switch to change from its operated state to an normal state. The magnetic field of winding 452 is sufficient, however, to counteract the effect of the permanent magnet 454 alone to the extent of releasing the switch to assume a normal state.

One end of the winding 452 is electrically connected to a gate 456 which communicates with a source of D.C. voltage 457 and enables the voltage to energize the winding 452 when the gate is open. The normal state of the gate is closed. The conductor 449 leads to gate 456 and when a signal is transmitted over conductor 449 it operates to open gate 456 and enables the D.C. voltage 457 to energize winding 452. A complete circuit is formed through conductor 458 to which the other end of winding 452 is electrically connected and which leads to ground. The conductor 447 which carries the full wave rectified voltage is electrically connected to the input of the form C switch 451 which directs that voltage through the normally open (biased closed) side of the switch which in turn is electrically connected to the winding 453. The other end of winding 453 is connected to conductor 458 which leads to ground thereby forming a complete electrical circuit. The output conductor 448 is connected to the biased open side of switch 451 and can only produce output pulses when the switch changes from its operated state to its normal state.

As long as no signal exists on conductor 449 winding 452 is not energized and all pulses on conductor 447 travel through the biased closed side of switch 451 to the winding 453 from which they continue through conductor 458 to ground. As long as a pulse is traveling through the circuit just described, both the magnet 454 and the winding 453 operate to maintain the switch in its operated state. Thus, if during the existence of a pulse in the circuit, conductor 449 transmits a signal to gate 456 which results in winding 452 being energized, the switch will not at that time change its state since the energization of winding 452 is only sufficient to buck the effect of magnet 454 thus leaving the field produced by energized winding 453 to maintain the switch in its operated state. Once the winding 452 is energized, however, it remains energized. Thus when the pulse traveling through the winding 453 terminates the winding 453 will be de-energized and the winding 452 will be able to sufficiently buck the permanent magnet 454 to release the switch to assume its normal state. The subsequent pulses on line 447 will be directed to output line 448 by virtue of the switch 451 having changed to its normal state. Only by termination of the signal on conductor 449 can the switch 451 be reoperated by the biasing magnet.

Thus, the clock is prevented from issuing an output pulse until any partial pulse in this system is cleared. After any partial pulse is cleared, the next pulse becomes the first signal pulse.

When the clock is used in a circuit which is capable of cutting short the last output pulse (by closing gate 456 during the last pulse) the clock can be made to hold to the last pulse by addition of conductor 450 between conductor 448 and the juncture of gate 456 and coil 452. Once the last pulse starts (or any pulse, for that matter) the coil 452 is insured of energization for the remaining duration thereof and since the switch 451 can only change state when coil 452 is de-energized, the output pulse cannot be cut short.

The relative simplicity of the circuit gives it economic and reliability advantages not to be found in any other circuit capable of performing a similar function.

Having described the overall logic of the transmit portion of the translator of the present invention with reference to FIG. 21 and the preferred embodiment of the various functional components thereof with reference to FIGS. 22 through 28, a detailed description of the precise manner in which the functional components are operatively associated with one another, for the purpose of translating parallel information into serial information and transmitting that serial information, will now be described with reference to FIGS. 29 through 32 which combine as shown in FIG. 39 to form one electrical schematic illustration.

(c) Overall transmit circuit

The six switches labeled BW1, BW2, BW4, BW8, BW16 and BW32 above the line 500 are the six glass encapsulated reed switches which are associated with the six selector latches of the transmit typewriter. One such switch is shown in FIG. 3 and was previously described in detail. All of the components shown above line 500 are components which are physically mounted on the transmit typewriter while those components illustrated below the line 600 are the components physically mounted on the receive typewriter with the components shown between the lines 500 and 600 being separately housed and forming the translator of the present invention. As has been previously mentioned, each typewriter is designed to act as both a transmit and receive typewriter and, therefore, each typewriter which operates with the present invention will include all of the components shown above the line 500 and below line 600.

The six switches associated with the selector latches are numbered in a way which identifies the binary weight which they represent in accordance with the arbitrary binary weights which have been ascribed to the various selector latches as previously discussed. Thus, the letter "n" which the chart of FIG. 20 indicates as being characterized by the total binary weight of 21 is electrically present in the translator when switches BW1, BW4, and BW16 close. It follows that the switches which must close to represent a particular character or symbol are readily obtainable by reference to the chart of FIG. 20.

All of the selector latches associated switches are normally open and electrically connected to a common conductor 461. The conductor 461 is electrically connected to one end of the normally open cycle clutch switch 151 (see FIG. 7) the other side of which leads to the negative side of a 24 volt D.C. power supply 462 via conductor 463, conductor 464, conductor 466, conductor 467, and conductor 468. The other side of each BW switch is electrically connected through a current limiting resistor to the base of a transistor. Switch BW1 is electrically connected to transistor T1, switch BW2 is electrically connected to transistor T2, switch BW4 is electrically connected to transistor T4, switch BW8 is electrically connected to transistor T8, switch BW16 is electrically connected to transistor T16, and switch BW32 is electrically connected to transistor T32. The emitter of each of the aforementioned transistors is electrically connected to a conductor 469 which electrically communicates through conductors 471 and 472 with the positive terminal of the D.C. voltage supply 462. The collector of transistor T1 is electrically connected to the set line of the NBI, the collector of transistor T2 is electrically connected to the set line of CH2, the collector of transistor T4 is electrically connected to the set line of CH3, the collector of transistor T8 is electrically connected to the set line of CH4, the collector of transistor T16 is electrically connected to the set line of CH5 and the collector of transistor T32 is electrically connected to the set line of CH6. The T transistors operate as normally open switches between the set lines of the channels and the positive voltage on conductor 469. When their base circuits find ground through their associated BW switch, the transistors conduct and energize their associated channel. Thus, when a print operation takes place, one or more of the BW switches will close (except for the hyphen which is represented by all spaces). Those channels associated with a closed BW switch will receive a set pulse and thus both their M and S sides will set.

The S set device of FIG. 21 is advantageously realized by transistor 488 the emitter of which is electrically connected to the conductor 469 which carries a source of positive potential. The collector of transistor 488 is electrically connected to a set line 489. Conductor 473, 474, 475, 476 and 477 connect the direct lines of CH's 1, 2, 3, 4 and 5, respectively, to the set line 489. Each of the aforementioned lines between set line 489 and CH's 1–5 includes a diode which is oriented to allow current to flow from the set line to the channel but to prevent current flow in the opposite direction. As previously described with reference to FIG. 22, a signal on the direct line of a channel results in the S side of that channel being set. Thus when the base of the S set transistor 488, which is connected through a conductor 559 to switch 151, finds ground through switch 151, the S set transistor conducts whereby the positive potential on conductor 469 is established on S set line 489 resulting in the S side of CH's 1–5 being set. Thus the S side of all of the channels (with the exception of CH6 which has no S side) are set regardless of whether or not the BW switch associated therewith has closed. On the other hand, only those channels associated with a BW switch which has closed have their mark sides set.

Electrically disposed between the S set line 489 and the conductor 466 is the series circuit of a diode 479 and a transmit control coil T/C. The diode 479 is oriented to allow current to flow from S set line 489 through coil T/C and prevent current from flowing in the opposite direction. Thus, when S set line 489 is electrically connected to the conductor 469, which carries a positive voltage, current will flow through coil T/C to conductor 466 which leads to the negative terminal of the power supply.

The coil T/C has associated therewith a number of switches which are operated when the coil is energized. One such switch, T/C1, is electrically disposed in series with a resistor 481 in the base leg of a transistor 482 which acts as a gate that operates in conjunction with the clock circuit 446. One side of normally open switch T/C1 is connected to resistor 481 which in turn is connected to the base of transistor 482, while the other end of the switch is connected to a conductor 483 which is electrically joined to conductor 467 which leads to the negative terminal of voltage source 462 via conductor 468. The emitter of transistor 482 is electrically connected to conductor 471 via conductor 484 and thus communicates electrically with the positive terminal of the voltage source 462. The collector of transistor 482 is electrically connected to one end of clock coil winding 452 and supplies energizing current thereto when the transistor is biased for conduction.

When the switch T/C1 closes, the base of transistor 482 finds ground and draws current and thus biases the transistor into conduction resulting in coil winding 452 being energized. This results in output pulses from the clock circuit 446, as previously described in connection with FIG. 28. Thus, by establishing voltage on conductor 489 as a result of the transistor 488 being biased for conduction (which in turn is a result of the cycle shaft rotating and closing switch 151), operates to start a series of pulses from the output of the clock.

A normally open switch T/C2 is electrically disposed in a conductor 484, one end of which is secured to a main latch line 486 and the other end of which is connected to conductor 469 through an intermediary conductor 487. Besides switch T/C2, conductor 484 also includes normally open switch S12 (the state of which is dependent on the conditions of the S side of the CH1). Since the T/C coil and the S side of CH1 are both energized at approximately the same instant that the S set transistor 488 switches voltage to conductor 489, the main latch line 486 carries voltage which is available for latching the various channels in an energized condition in the manner previously described with reference to FIGS. 22–24.

Electrical conductors 491, 492, 493, 495 and 496 are connected to main latch line 486 and serve as latch lines for CH's 1, 2, 3, 4, 5, and 6 respectively. Each latch line includes an M and S switch (with the exception of CH6 which includes only one switch) the operation of which has been previously described.

A normally open switch T/C3 electrically connects coil T/C with conductor 486 and acts as a latching switch which enables the coil to remain energized after removal of voltage from conductor 479.

Output pulses from clock 446 travel over output conductor 448 to the common input conductor 427 of L/A. The latch line 429 of the L/A is electrically connected to the main latch line 486 and draws latching voltage therefrom. The L/A finds ground through the conductor 466 to which it is electrically joined.

As previously described with reference to FIG. 26, the L/A alternates between a set condition in which both its X and Y side are set and a normal condition in which both its X and Y side are not set. Each pulse received on conductor 427 operates to switch the L/A from whatever condition it is in to its other condition. Because the electrical potential on main latch line 486 is removed after each complete code is transcribed by the translator and then re-establishtd for a subsequent code and the fact that the last pulse of a 6-bit code is even, the L/A always receives the first clock pulse while in its non-set condition, Thus, immediately prior to the first pulse from the clock, the form C switch L/AY3, which is controlled by the Y side of the L/A and which comprises a normally closed side L/AY3*a* and a normally open side L/AY3*b*, is in its normal condition. A conductor 499 is electrically connected to the output conductor 448 of the clock and also to switch L/AY3. The first pulse out of the clock thus travels through the normally closed side L/AY3*a* to a conductor 501 connected thereto. The first clock pulse is not operable to change the L/A from its normal state to its set state until the pulse terminates (as previously described). Thus side L/AY3*a* is the path which the first pulse must travel. The second pulse, however, will find side L/AY3*b* closed and thus the path it must travel.

In addition to passing through switch L/AY3*a* on to conductor 501, the first pulse also passes through a pulse shaper 502 via a conductor 503 which is electrically connected to the output line 448. The pulse shaper operates to transform the full-wave rectified pulsing D.C. on line 448 to a train of square-wave pulses wherein each pulse is approximately 5 milliseconds in duration and the time between pulses is approximately 3⅓ milliseconds (for an approximate total period of 8⅓ milliseconds).

The pulse shaper 502 comprises a transistor 506, a first Zener diode 507 and a second Zener diode 508. The emitter of transistor 506 is electrically joined to the conductor 503 over which clock output pulses travel to the shaper. The collector of transistor 506 is connected through a resistor 509 to the output gate 306 which comprises a pair of form C switches controlled by the NBI. The base of transistor 506 is connected to the emitter through a resistor 511 and to ground through the series connection of Zener diode 507, resistor 512 and conductor 467. The second Zener diode 508 is electrically connected across the output transistor 506 on the remote side of resistors 509 and 512.

The input to the clock 446 has been previously described as a pulsing D.C. achieved by fully rectifying an A.C. source of voltage. In its rectified form the source provides half sine waves which rise from zero voltage to about 35 volts maximum during each half cycle. When the clock is putting out these pulses on line 448 they can only reach the NBI control gate through the emitter-collector path of transistor 506. This path through the transistor is only available when the transistor is conducting which occurs when the base of the transistor is able to find ground. The base of transistor 506 finds ground through the first Zener diode 507 which conducts only after a voltage of 8.2 volts is applied across it. Thus, after the half sine wave of the pulsing D.C. source has increased from zero to 8.2 volts, the first Zener diode 507 conducts, and the base of transistor 506 is able to find ground. This biases the transistor to a conducting state making it possible for the transistor to pass subsequent portions of the wave to the gate 306. The Zener diode 508 is selected to conduct at 6.8 volts and thus the voltage to the gate 306 will either be 6.8 volts or zero since the only voltage output signals from transistor 506 are 8.2 volts or more. As the voltagesine wave descends and passes below 8.2 volts, the Zener 507 becomes non-conducting and prevents the base of the transistor from finding ground, thereby causing the transistor to cease conducting and thus terminates the signal to the gate 306.

This unique arrangement of two Zener diodes and a transistor produces a highly effective and simplified pulse shaper which is not limited to the particular values given above for successful operation. The conduction voltage of the first Zener diode 507 must be greater than that of the second Zener diode 508, however, in order to produce a clean square wave. The time which is required to increase the voltage from zero to the conduction voltage of the first Zener diode constitutes one-half of the time between pulses and is adjustable by adjusting the conduction voltage of the Zener diode which results in a proportionate variation of the length of the pulse.

The gate 306 comprises two form C switches NBIY3 and NBI4 controlled by the Y side of the NBI. When the Y side of the NBI is not set the NBIY3*a* side of switch NBIY3 is closed and connects the M output line to the negative terminal of the voltage source 462. The NBIY3*b* side is open and thus prevents the output pulse from the wave shaper 502 from passing over the output M line. Under the same conditions, (NBI not set), the side NBIY4*a* of switch NBIY4 is closed and communicates the pulse shaper output conductor 513 with the S output conductor, whereby the output pulse passes over the S output line. The side NBIY4*b* is open preventing communication between the negative side of source 462 and the S line. Thus, when a pulses passes out of the pulse shaper 502 and the NBI is not set, the M line becomes negative and the S line carries the output pulse. These conditions define a space signal.

The M and S output conductors communicate with the transmission lines 514 and 516, respectively, through a pair of form C switches T/C4 and T/C5 which are controlled by the T/C coil. The M output conductor is connected to transmission line 514 through the normally open side T/C5*b* of switch T/C5 while the S conductor is connected to the line 516 through the normally open side T/C4 of switch T/C4. When the T/C coil is energized the two normally open sides T/C4*b* and T/C5*b* close and complete the circuit between output conductors M and S and transmission lines 514 and 516, respectively.

Thus the T/C coil is extremely important in that its energization results in voltage on latch line 486, output pulses from Clock 446 and communication between the output of the translator and a pair of transmission lines over which the typewritten information is to be sent.

When the Y side of the NBI is set the M output conductor communicates with the output conductor 513 of the pulse shaper through side NBIY3*b* and the S output conductor communicates with the negative terminal of the voltage source 462 through the side NBIY4*b*. Under these conditions a pulse out of the pulse shaper appears on the M conductor while the S conductor is connected to a negative voltage. These conditions characterize a mark signal. By changing the conditions of switches NBIY3 and NBIY4, the NBI operates the gate 306 and thereby determines whether a pulse from the clock appears on the transmission lines 514 and 516 as a mark or a space.

The conductor 501, to which the L/A directs the first pulse from the clock, is electrically connected to a form C switch S13 which is controlled by the S side of CH1 and which includes a normally closed side S13*a* and a normally open side S13*b*. Since the S side of CH1 is set (as are the S sides of all of the channels) the first pulse over conductor 501 passes through switch side S13*b* to conductor 518 which leads through an isolation diode 519 to a form C switch M22 which is controlled by the M side of CH2 and which includes a normally closed side M22*a* and a normally open side M22*b*. A conductor 521 electrically joined to conductor 518 leads through a diode 522 to the set line of the 1st BL. Thus when the first pulse passes through the S13*b* side of switch S13 it operates to set the 1st BL which is then latched in a set condition through its latch line 523 which communicates with the main latch line 486. A normally open switch 1st BLY2 is controlled by the Y side of the 1st BL and is electrically disposed in a conductor 524 which is joined to the main latch line 486 and to conductor 487 which in turn is joined to conductor 469 which leads to the positive terminal of voltage source 462. Thus when the 1st BL is set the main latch line 486 obtains its potential through switch 1st BLY2 and need only rely on that switch in order to maintain the necessary voltage for continued latching of the channel circuits.

The X side of the 1st BL control normally closed switch 1st BLX1 which is electrically disposed in the conductor 463 which joins the switch 151 to the conductor 464 (through the normally closed side SC/MR1*b* of switch SC/MR1), which leads to the conductor 466 that communicates with the negative side of the voltage source 462. The S set transistor 488 and all of the T transistors associated with a closed BW switch find their ground through switch 151 and switch 1st BLX1 and thus depend on switch 1st BLX1 being closed (and side SC/MR1*b* of switch SC/MR1 being closed) for their operation. When the leading edge of the first pulse enters the set line of the 1st BL is energizes the X coil and causes the normally closed 1st BLXI switch to open whereby the channels all lose their mark and space coil energization from the T transistors and the S set transistor. As described above, however, the first pulse also induces the Y side of the 1st BL to set and thereby provides a path through switch 1st BLY2 for maintaining the energization conditions previously established within the channels. The loss of voltage which occurs when the S set transistor 488 becomes nonconductive does not de-energize coil T/C due to the fact that the T/C coil has a latch line through switch T/C3 which connects to main latch line 486.

The M22*a* side of form C switch M22 leads to the NBI/S conductor through a conductor 526. The M22*b* side of that switch leads to the NBI/M conductor through a conductor 527. Thus, if CH2 is in a space condition, the mark side will not be set and the M22 switch will be in its normal state whereby the NBI/S conductor will receive the first pulse. On the other hand, if CH2 is in a mark condition, the M side will be set and the M22*b* side of switch M22 will carry the first pulse and direct it to the NBI/M conductor.

The NBI/M conductor leads to the set line of the NBI whereby a pulse carried by the NBI/M conductor results in both sides of the NBI setting and thereafter remaining set by virtue of the NBI latch line 529 which is electrically joined to the main latch line 486. When the NBI is in this set condition, the gate 306 sends out mark signals to the transmission lines as previously described.

The NBI/S line is joined to the reset line of the NBI whereby a pulse directed over the NBI/S conductor operates to reset the NBI and restore it to its normal condition. When the NBI is in its normal state, the gate 306 produces a space signal in response to a clock pulse (also previously described). Since the reset line includes normally open switch NBIY2, a pulse directed on the NBI/S line when the NBI is already in its normal state will be precluded from reaching the NBI circuit and thus have no effect thereon (which is the result desired). Similarly, the set line of the NBI includes normally closed switch NBIY1 which is open when the NBI is set and thus excludes signals on the NBI/M conductor from reaching the NBI circuit when the NBI is already in a set condition.

The first pulse of a code passes through the form C switch M22 (which is controlled by the M side of CH2) and places the NBI in a condition which reflects the condition of CH2 (i.e., if CH2 is in a mark condition the NBI is set and if CH2 is in a space condition the NBI is reset). The second pulse from the clock then passes to the gate 306 and creates either a mark signal or a space signal depending on whether or not CH2 is in a mark condition or a space condition, respectively.

Thus, the NBI is put in a condition which reflects the information in CH*n* (where *n* is greater than 1) in response to the *n*—1 pulse passing through a switch controlled by CH*n*. It now becomes clear why it is necessary for the NBI to receive CH1 mark signals (there being no *n*—1 pulse with respect to CH1).

When the first pulse terminates, the L/A sets and the normally closed side L/AY3*a* of the switch L/AY3 open while the normally open side L/AY3*b* of the same switch closes. Under these conditions the next pulse out of the clock (which is the second pulse) passes from conductor 499 through switch L/AY3*b* to conductor 431. The second pulse also passes through the pulse shaper to the output gate 306 from which it emerges either a mark or a space signal depending on the previously established conditions of the NBI. The second pulse also enters the L/A circuit (as all code pulses) and operates to reset the L/A so that it resumes its normal condition after the second pulse terminates.

Conductor 531 connects to a form C switch S23 the condition of which is controlled by the S side of CH2 and which includes a normally open side S23*a* and a normally closed side S23*b*. The S side of CH2 being set, the pulse passes through side S23*a* to conductor 532, which includes an isolation diode 533 and which leads to a form C switch M32 the condition of which is controlled by the M side of CH3 and which includes a normally closed side M32*a* and a normally open side M32*b*. The conductor 532 is electrically joined to the reset line of CH1 by a conductor 534. When the second pulse travels over conductor 534 to the reset line of CH1 it operates to reset the S side of the channel which results in the form C switch S13 being reset to its normal state.

The resetting of the S side of CH1 also results in switch S12 resetting to its normal state (which is open) and thus illustrates the necessity of the 1st BL and switch 1st BLY2 to provide an alternate path for maintaining latching potential on the main latch line 486.

The pulse passes through switch M32 to either conductor NBI/M or NBI/S depending on whether CH3 is in a mark condition or a space condition, and in this way places the NBI in the proper condition to have the gate 306 put out a signal which corresponds to the condition of CH3 in response to the third clock pulse.

The activity of second pulse includes one function which was not performed by the first pulse; namely, the resetting of a CH1. The activities of the second pulse are typical of the activities of the clock pulses in general in that they include the function of generating a mark or space signal for transmission, resetting the next previous channel, and putting the NBI in a condition which reflects the condition of the next subsequent channel.

The function of resetting the next previous channel is extremely important in that it enables all the pulses to be directed over either line 501 or 531 regardless of the number of channels involved. This becomes more apparent after the following description of the path followed by the third pulse.

The third clock pulse, like the first and second pulses, passes through the gate 306 and transmits either a mark or space signal on the transmission lines 514 or 516 in accordance with the condition of the NBI. Also the pulse enters the L/A and prepares it to change the state of switch L/AY3 when the pulse terminates. The pulse is directed to conductor 501 in that it is an odd numbered pulse. Since the second pulse reset the S side of CH1, the third pulse passes through the S13*a* side of switch S13 to switch S33 which is controlled by S side of CH3 and which includes a normally closed side S33*a* and a normally open side S33*b*. The S side of CH1 remains reset for the duration of the code, and thus all subsequent pulses which pass over conductor 501 pass through the S13*a* side of switch S13 on to a form C switch associated with one of the subsequent odd-numbered channels. The S side of CH3 is reset by the fourth pulse and thus the fifth pulse passes through the S13*a* side of switch S13 and the S33*a* side of switch S33 from which it is able to perform the functions necessary to properly condition the NBI for the sixth pulse and reset the S side of the fourth pulse to clear the path for the sixth pulse.

Since the activity of the third, fourth, and fifth pulses is identical with the activity described with reference to the second pulse it is not necessary to trace their paths in detail. All the odd-numbered pulses are directed to conductor 501 and all even-numbered pulses are directed to conductor 531 and a pulse on either conductor will continue to travel until it encounters a form C switch associated with the S side of a channel which is still in a set condition. A switch of this description will direct the pulse to a form C switch associated with the M side of the next higher numbered channel and this switch will direct the pulse to either the set or reset side of the NBI depending on whether or not that channel is in a mark or space condition. The energized S switch will also direct the pulse to a conductor which leads to the reset line of the next previous channel.

The very last pulse (which in this case is the sixth pulse) is directed over conductor 531. Since there are no seventh or eighth pulses it is not necessary for the sixth pulse to condition the NBI for a subsequent pulse nor is it strictly necessary for the sixth pulse to reset the CH5 for the purpose of clearing the path for the next odd pulse. Thus the activity of the sixth pulse in generating an output signal which reflects the condition of CH6 is really the only activity of the sixth pulse which is similar to the activity performed by the prior pulses.

The sixth pulse passes through the normally closed side S23*b* of switch S23 to conductor 536 which leads to switch S43 which is in its normal state by virtue of the fact that the fifth pulse operated to reset CH4. Thus the pulse passes from conductor 536 through the normally closed side S43*b* of switch S43 to conductor 537. Conductor 537 is electrically joined to conductor 538 which is electrically joined to both the reset line of CH5 and the reset line of the 1st BL. Conductor 538 is also electrically joined to conductor 539 which includes an isolation diode 541 and which electrically connects to the main latch line 486. The leading edge of the sixth pulse operates to reset CH5 and at the same time reset the 1st BL resulting in switch 1st BLY2 opening and thus disconnecting the main latch line 486 from the source of positive potential via line 469. While it is desirable for the system to be completely cleared at the termination of the sixth pulse, it is not desirable for the system to clear before that time and thus the conductor 539 enables the sixth pulse itself to supply the main latch line 486 with potential during the duration of the pulse. Thus the main latch line 486 and all of the latch lines which are fed therefrom hang on the sixth pulse. At the termination of the sixth pulse, the system is completely cleared and all channels as well as the T/C coil, the 1st BL, the NBI, the L/A and the clock resume their normal conditions preparatory to receiving the next six-bit code for transmission.

The cycle which occurs for each code differs only in the channels which have their mark sides set, and thus in the sequence of mark and space signals which are transmitted to the transmission lines 514 and 516. The transmit cycle described above produces a sequence of mark and space signals which corresponds to the sequence of mark and space conditions in the channels whereby the *n*th pulse is a mark if the *n*th channel has its mark side set and is a space if the *n*th channel does not have its mark side set.

The two form C switches which connect the M and S output conductors to the transmission lines are, as previously described, controlled by the T/C coil. Thus, when the coil is de-energized at the termination of the sixth pulse, the switches T/C5 and T/C4 assume their normal state which results in the M and S output conductors being electrically separated from the transmission lines. When the translator is in this condition it can receive signals from a remote typewriter and present them to the typewriter for purposes of operating the typewriter as will be described in detail below. It is important at this time to note that the change of the translator from a transmitter to a receiver is performed automatically and the translator acts as a transmitter only for the precise time necessary to transmit information and thereafter automatically resumes the condition necessary to act as a receiver. This is a highly desirable feature in that an unattended typewriter is automatically capable of receiving messages without the necessity of special conditioning by an attendant.

The foregoing detailed description of the preferred embodiment of the transmit portion of the translator of the present invention was made with reference to a typewriter performing a print cycle. The print cycle includes the operation of the six selector latches associated with the typewriter and it is through these latches that the BW switches are operated for the purpose of setting the mark side of selected channels. During a function cycle there is generally only one switch which is operated to uniquely identify the function and it is through this switch alone that preselected channels must be instructed to set their mark sides. In order to accomplish this result it is necessary to provide a matrix between the function identifying switch and the T transistors so that the proper conditions will exist in the six channels to identify the particular function which is being performed.

(d) Function matrix

All of the switches previously described as being mounted on the transmit typewriter and operative to uniquely identify a particular function operation are shown above the line 500 indicating that they are physically mounted on the typewriter and not in the translator housing. Each of the several switches is electrically disposed such that one side has a path to the ground line 463 while the other side is electrically connected to the function matrix 546. Matrix 546 is comprised of twenty-one diodes which are electrically joined in such a way as to establish a preselected code in the translator in response to a given switch being operated. Each of the conductors which joins a BW switch with its associated T transistor, with the exception of the conductor which joins the BW4 switch and the T4 transistor, is electrically joined by a branch line to the function matrix. When one of the function identifying switches closes, a circuit is formed between one or more T transistors and the ground line 463 through the function matrix 546 and the particular switch which has closed. Those T transistors which see ground through the function matrix react in precisely the same way as when their associated BW switch is closed. Thus, the function matrix provides the logic by which preselected transistors conduct whenever a particular function identifying switch closes.

For reasons which will be discussed in detail below all binary characters which represent a function operation are characterized by the presence of a binary weight of 16 (mark condition in CH5) and the absence of a binary weight of 4 (space condition in CH3). This accounts for the absence of a connection between the switch BW4 and the matrix 546, which was mentioned above.

A conductor 547 connects the conductor 542 between switch BW16 and transistor T16 to a conductor 548 within the matrix 546. The conductor 548 is in turn electrically connected to a conductor 549 which leads out of the matrix to the normally closed down shift side 303*a* of the switch 303 which also has a normally open side 303*b*. The other end of down shift side 303*a* is connected to a conductor 551 to which one side of the normally open upshift side 303*b* is also connected. The conductor 551 is electrically joined to a line 552 which serves as a link between all of the other function identifying switches and transistor T16. The conductor 552 is also electrically joined through the normally closed shift arm switches 306 and 307 to conductor 463. Since one of the shift arm switches (which were previously discussed with reference to FIGS. 15 and 16) is in its activated condition at all times other than during a shift from one case to the other case, the shift arm switches will normally establish an open circuit between conductors 463 and 552.

The normally open space switch 250, which is actuated each time a space function is performed by the typewriter, is electrically joined at one of its sides to a ground return line 550 which is electrically connected to line 463. The other side of switch 250 is electrically joined to the cathodes of matrix diodes 553 and 554. The anode of diode 553 is electrically connected to the conductor 552 which as previously described leads to transistor T16 through downshift side 303*a* of switch 303, while the anode of diode 554 is electrically joined to the conductor 540 between switch BW1 and transistor T1 by conductor 556. When the space switch 250 closes in response to the occurrence of a space function cycle by the typewriter, transistors T16 and T1 (and only these transistors) find ground through the closed switch and its associated diodes and thus are biased from a nonconducting to a conducting condition. This results in CH's 1 and 5 being placed in a mark condition and the first and fifth pulses generated by the transmitter being mark signals while all of the other pulses are space signals. Since the space function is uniquely identified by the binary weight 17, the signal which the transmitter transmits in response to switch 250 closing uniquely identifies the function cycle.

As previously described with reference to the print cycle, it is necessary for the S set transistor 488 to find ground before the system can start transmitting. The switch 151 which is operated by the cycle shaft 14 (see FIG. 7) does not close during a function cycle and thus some alternate means must be provided for biasing transistor 488 into conduction. A conductor 557, including an isolation diode 558, electrically joins the conductor 559 (which connects transistor 488 to switch 151) to conductor 542 which joins switch BW16 to transistor T16. Since all function codes include a binary weight of 16, the conductor 542 leads to ground each time a function code is to be transmitted. The connection of conductor 559 to conductor 542 results in the S set transistor 488 finding ground each time a function cycle is to be transmitted. Once the selected T transistors have been biased to a conducting state and the S set transistors simultaneously conditioned, in a like manner the operation of the transmitter is identical with that previously described with reference to a print cycle.

Since each function cycle is characterized by a different binary weight, a different combination of T transistors must be biased to conduction for each separate function cycle. Accordingly, one side of the normally open backspace switch 192 is electrically joined to line 550 while the other side is electrically joined to a pair of matrix diodes 561 and 562. Diode 561 connects switch 192 to the line 552 for the purpose of providing transistor T16 with a path to ground while the diode 562 is electrically joined to transistor T2 via conductor 563 whereby transistor T2 finds ground through switch 192 when it closes. The combination of transistor T2 and T16 gives a signal with a total binary weight of 18 which is the characteristic binary weight that uniquely identifies a backspace function.

Although not previously described with reference to the mechanical operation of the IBM Selectric typewriter, it is possible to equip such a typewriter with a power tab and as in the case of all other function operations it is possible to uniquely identify a power tab operation by the closing of a switch. Accordingly a normally open switch 564 represents a switch associated with the power tab mechanism and which closes each time the power tab operates. One side of the switch is connected to the conductor 550 while the other side of the switch is electrically joined to three matrix diodes 566, 567 and 568. Diode 566 electrically joins switch 564 to conductor 552, diode 567 electrically joins the switch to conductor 563, and diode 568 electrically joins the switch to conductor 556. Thus when switch 564 closes, transistors T16, T2 and T1 all conduct and cause a signal to be transmitted which has a total binary weight of 19, which uniquely identifies a power tab operation.

The normally open index switch 237 and the normally open carrier return switch 236 are electrically joined in parallel relationship to one another, one end of the parallel circuit being electrically joined to the conductor 550 by a conductor 571 and the other end of the circuit being electrically joined to one end of a parallel circuit formed by normally open double line feed switch 235 and normally closed single line feed switch 246. The other end of the parallel combination of switches 235 and 246 is electrically joined to a pair of matrix diodes 272 and 273, the former of which is electrically joined to the line 552, and the latter of which is electrically joined to the conductor 543 via conductor 574. As previously described with reference to FIG. 10, most typewriters do not include a separate index keybutton and are thus only capable of indexing (linespacing) through operation of the carrier return keylever. The index mechanism, including an index interposer, is present in the typewriter, however, since it is necessary for performing continuous line feeding (indexing) in response to holding the carrier return keylever button in its extreme downward position and thereby depressing bail 240 (see FIG. 10*a*).

When a carrier return operation is performed by the typewriter the normally open switch 236 closes and a circuit is formed through single-linefeed switch 246 and carrier return switch 236 by which transistors T16 and and T8 are able to find ground and conduct (a carrier return operation being characterized by the binary weight of 24). Because the carrier return (and index) operation requires 360 degrees of revolution of the operational cam shaft instead of 180 degrees for other typewriter cycling, the carrier return (and index) switch remains closed for double the cycle time which carries the closed switch condition into the second code time period resulting in transmission of not one but two carrier return signals during a single carrier return or index operation unless some means is provided for preventing the second signal from being established. For this reason the single-linefeed switch 246, which is actuated by the index mechanism, must operate prior to termination of the last code pulse to pervent resetting the code when switch 1st BLX1 recloses. When operated, switch 246 changes from its normally closed state to an open state. This opens the circuit between the matrix and ground line 463 so that no code signals are established in the translator for transmission during the second code period of the carrier return or index cycle. If the carrier return button is depressed to its most downwardly position for repeated indexing, the first carrier return and index operation will be followed by repeated index operations as evidenced by repeated closing of index switch 237 and opening of switch 246 before commencement of the second code period. When this occurs a current path is formed through single-linefeed switch 246 and index switch 237 by which index code signals are repeatedly established in the translator for transmission. The index operation function is performed for as long as the carrier return keylever button is depressed. For each index operation performed the translator receives and transmits an index code signal. In this way the repeat operation of indexing can be transmitted in the form of a carrier return code from one typewriter to another.

In the event that it is desired to double-linefeed the receive typewriter along with a carrier return, the switch 235 is actuated by the linefeed control lever 239 and thereby closed to complete a circuit around switch 246. Under these conditions, there will be two linefeed signals established in the translator for each carrier return operation (the second signal coming during the second 180 degrees of the carrier return cycle since switch 246 is ineffective to break the ground circuit). Thus even though the transmit typewriter may itself be conditioned to single-linefeed it can transmit a signal which induces a double-linefeed operation at the remote typewriter by reason of the storing ability of the receive circuitry. The linefeed conditions of the transmit typewriter and the remote typewriter are maintained independent by the fact that the mechanism operated at the transmit typewriter for determining the linefeed conditions at the remote typewriter is totally independent of the linefeed mechanism of the transmit typewriter.

Since double linefeed operation at the receive typewriter requires two complete 129 ms. cycles for each operation of the transmit typewriter carrier return-index operation it is necessary to disable the index operation of the transmit typewriter to prevent the transmit repeat index from overrunning the receive typewriter when double linefeeding the receive typewriter from the transmitter. For this reason the lug 245 on control lever 239 prevents repeat operation at the transmit typewriter when the control is set for double linefeeding the remote typewriter.

When the typewriter is in a lower case condition and upshifted to an upper case condition the switch 303 changes from its normal state to its actuated state whereby side 303*a* thereof opens and side 303*b* closes. The upshift is also accompanied by the switches 306 and 307 both being in their normally closed condition for the brief time required for the shift arm to change from its lower case position to its upper case position. The change of state of switch 303 which opens side 303*a* prevents transistor T16 from seeing ground through conductor 548. An alternate ground path exists, however, over conductor 547, connecting conductor 576, diode 581, conductor 577 and side 303*b* of switch 303 which connects to conductor 551. Conductor 551, as previously described, is connected to conductor 552 which includes the switches 306 and 307 and is connected to the ground line 463 when both switches 306 and 307 are closed. When the ground path is through the upshift side 303*b* instead of downshift side 303*a*, the transistor T32, as well as transistor T16 finds ground and conducts. The transistor T32 is electrically connected to conductor 577 by a conductor 578 while a diode 579 in conductor 578 and a diode 581 in conductor 576 prevent the signal from traveling in the wrong direction. Thus an upshift signal characterized by a code which has total binary weight of 48 (16 plus 32) and thus is distinguishable from the downshift signal which has a total binary weight of only 16.

It follows that when a typewriter is operating in upper case (switch side 303*b* closed and switch side 303*a* open) a space function will result in transistor T32 conducting as well as transistors T16 and T1 as previously described. Thus, the space function cycle which takes place while the typewriter is operating in upper case is identified by a binary code having a total binary weight of 49 and generated by the closing of the space switch 250. Thus, the same identical space cycle function and the closing of the same identical switch which identifies the space operation results in one of two possible binary codes depending upon whether the typewriter is operating in upper case or lower case.

The same is true of the backspace wherein the binary weight of the lower case backspace code is 18, as previously described, and the upper case backspace code is identified by a binary code with an additional weight of 32 thus giving it a total binary weight of 50.

By having a separate upper case code and lower case code for space and backspace as well as for tabulator, carrier return and index, it is possible to confirm the proper case each time one of these function cycles is performed by the typewriter. The details of precisely how the case confirmation operates is best deferred until the receive portion of the translator is described.

Because of the fact that the closing of a single switch will result in one of two binary characters being transmitted by the translator, depending on whether the typewriter is operating in upper case or lower case, it is possible for the operation of a single switch to identify two distinct operations. Thus the switch 248, which is associated with the index key button (the index key button being disconnected from the index interposer, as shown in FIG. 10) is employed as both a remote off switch and a bell switch. One side of switch 248 is electrically joined to conductor 550, which leads to ground, while the other side of the switch is electrically joined to matrix diodes 582, 583 and 584. Diode 582 is electrically connected to conductor 552, diode 583 is electrically connected to conductor 574 leading to transistor T8, and diode 584 is electrically connected to conductor 563 leading to transistor T2. When switch 248 closes and the typewriter is operating in lower case, transistors T16, T8 and T2 all conduct to form a binary code having a total binary weight of 26. This binary code uniquely identifies to the remote typewriter a remote typewriter OFF operation and it responds thereto by turning off. When the typewriter is operating in an upper case condition and switch 248 is closed, the transistor T32 conducts along with transistors T16, T8 and T2 to establish a binary code having a total binary weight of 58. This code uniquely identifies to the remote typewriter a bell ringing operation and not a remote off operation. As will be described more fully below, the operation of switch 248 while the typewriter is in upper case produces a bell ringing not only in the remote typewriter but also in the transmit typewriter so that the operator does not mistakenly believe he is turning the remote typewriter off when in fact all he is doing is ringing a bell at the remote typewriter.

Another switch which produces dual operation is switch 586 which is mechanically associated with the portion of the ribbon mechanism that determines whether or not the typewriter types in black or red. This portion of the typewriter was not previously described but is an available mechanism on IBM Selectric typewriters and one which can be easily made to include an identifying switch. One side of the switch 586 is electrically joined to ground line 550 while the other side of the switch is electrically joined to diodes 587, 588 and 589. These diodes are electrically joined to conductors 552, 574 and 556 respectively, whereby the closing of switch 586 while the typewriter is operating in lower case produces a binary code having a total weight of 25. When the typewriter is operating in upper case an additional binary weight of 32 is added to the 25 to give a code having a total binary weight of 57. By operating switch 586 while the typewriter is in lower case a code is transmitted which uniquely identifies to the remote typewriter that it is to print with the black portion of the ribbon, and by actuating the same switch while the typewriter is in upper case a code is transmitted which uniquely identifies to the remote typewriter that it is to print with the red portion of the ribbon.

A switch 591 is illustrated as having one of its sides electrically joined to conductor 550 and its other side connected to matrix diodes 592, 593, 594 and 595. While these diodes are included in the matrix and are electrically joined to conductors 552, 574, 563 and 556 respectively, the switch 591 is not in fact mounted on the typewriter so as to uniquely identify any particular typewriter function. The switch is only shown as an available means for identifying some auxiliary function which the typewriter might be especially equipped to perform. Thus the codes having the binary weights of 27 and 59 are open and available in the event a typewriter includes functions other than those described.

All function switches are capable of developing two weighted codes, each weight differing from the other by a weight of 32 as determined by the condition of the switch 303 controlled by shift release arm 278.

Since 16–32 binary weighting switch 303 is conditioned so as to indicate a new case condition prior to its actual occurrence it is possible for an operator to depress the shift key and the space bar simultaneously (as can, may and does occur) and still have the correct case-conditioned space codes set into the translator so that the receive typewriter will receive the dual information in parallel.

Without the 16–32 weighting switch 303 and its integration into the function matrix and under the circumstances described above, either an erroneous code would be generated or one or the other of the codes would be completely missed.

The IBM Selectric typewriter is designed to prevent (through various interlocking mechanisms) input from the keyboard of two selector latch codes simultaneously (as the translator also does); to prevent print and case shift operations from occurring simultaneously, and to prevent print and space operations from occurring simultaneously (as the translator also does); to prevent print and case shift operations from occurring simultaneously, and to prevent print and space operations from occurring simultaneously, but no provision is made to prevent simultaneous operation of the functions and the case shift since no purpose would be served. In fact, the absence of an interlock system in the latter situation is used to advantage in the present invention by simultaneously case-shifting and function-operating in the receive typewriter under the conditions discussed above.

By virtue of the matrix 546 it is possible to uniquely identify all typewriter function operations in terms of six-bit binary character codes.

(e) Receive logic

Those components which are illustrated in FIGS. 29–32 and have been described above are employed by the translator for the purpose of transmitting information from a transmit typewriter to a transmission line which leads to a receive typewriter. Before describing the detailed operation of the receive portion of the translator with reference to the preferred embodiment illustrated in FIGS. 29–32, in the receive portion of the translator will be described the overall logic and operational sequences involved with reference to FIGS. 33–37.

Before the serial information which the transmit portion of the translator places on transmission lines 514 and 516 can be employed to operate a remote typewriter, it is necessary for it to be translated back into corresponding parallel information since the typewriter responds only to information in parallel form. There are many problems involved in receiving serial information, translating it into corresponding parallel information, and subsequently operating a typewriter in accordance with the particular binary code represented by the information. It is first necessary to receive the serial pulses and temporarily store them so that as the last pulse of the code is received there is present in parallel form a binary code which corresponds to the binary code of the serial pulses received by the translator. Secondly, this information must be identified as either identifying a print cycle or a function cycle and if the system identifies the code as that representing a function cycle it must be determined whether it is a memory function (requires the operation of the translator memory to be described below) or a non-memory function (does not require the memory of the translator). At the same time as the translator identifies the information, the information must be stored in a more permanent memory.

The more permanent memory portion of the present invention plays a vital role in the successful operation of the communication system in that it overcomes the problem presented by the fact that no two electric typewriters operate at the identical speed. Because of inherent non-synchronous relationship between any two typewriters, it is not uncommon for the transmit typewriter to operate somewhat faster than the receive typewriter. If no memory portion is provided separate from the input portion, it is possible for one code to still be in the translator (where it must remain during the operation of the typewriter in response thereto) while a subsequent code is being received. This can cause the remote typewriter to attempt to change the tilt and/or rotate position of the typehead before the head returns to its home position. When this occurs the various steel bands previously described as operative to position the head for printing a selected character or symbol are placed under unusual strain and often break. Thus, before a system can be successfully employed it must overcome this problem and to do so the present invention provides a memory which stores a code for a portion of the cycle responsive thereto. While the cycle is being completed, the input portion is free to receive a new code, and transfer it to the memory after the previously stored code is released. As will be shown in detail below, the memory portion of the translator enables two typewriters to get out of synchronization by as much as one complete binary code and still function accurately. Each time that the carrier is returned for the purpose of typing a new line, the transmit typewriter and the receive typewriter are synchronized so that any difference in operating speeds is only cumulative for a single line. Since two properly operating typewriters will only have operating speeds that differ slightly, the receive typewriter will not fall more than a single code character behind during a single line of operation and thus the present invention in providing a memory capable of storing one full binary code completely solves the vexing problem of maintaining typewriter synchronization.

Attempts by others to solve the typewriter synchronization problem have lead to reducing the speed of the transmit typewriter so that it always transmits at a slower rate than the receive typewriter is capable of receiving information.

When using conventional tape transmission methods (e.g. punched paper tape, magnetic tape) this means that the cycle clutch operates on both typewriters during each typewriter print cycle. Assuming a 10-word typing line and each word consisting of an average of five letters, the cycle clutch operates 50 times. By using the present invention and running the typewriters wide open (the preferred method) the cycle clutch may be held open for an entire word at a time thus reoperating the cycle clutch only after each space so that the cycle clutch operates only 10 times per line—an increase of 500% in cycle clutch life expectancy. Since experience shows that the cycle clutch is the first and most-often replaced expensive and major part assembly in the typewriter this feature of the present invention is of great importance.

FIG. 33 illustrates in block diagram form the over-all logic of the input portion of the translator which operates to translate the incoming serial information into corresponding parallel information. This input portion of the receiver of the translator employs a plurality of channels similar to those channels previously described with reference to the transmit portion of the translator. Where the number of bits in a binary character being translated by the translator is *n*, the number of channels in the input section of the receive portion of the translator is $n-1$. Thus in the case of the six-bit code of the present invention, there are five channels. Each channel has a mark section and a space section which are independently capable of being either in a normal or set condition. The input section illustrated in FIG. 33 functions to energize the channels so that a mark condition (both the mark and the space sides set) is established in CH*n* if the *n*th pulse of a code is a mark signal, or a space condition (the space side only set) is established in CH*n* when the *n*th code pulse is a space signal. Once the first five channels have been properly energized and the sixth pulse is received, the code is immediately transferred to a memory and the input section is cleared preparatory to receiving the next binary code. Since it is not necessary to temporarily store the information of the sixth pulse while a subsequent pulse is being received, the sixth pulse is placed directly into the memory along with the information from the first five channels, thus explaining the absence of a sixth input channel to correspond to the sixth pulse.

The incoming serial signal on transmission lines 514 and 516 is directed to the Line Alternator L/A which has four output paths to which the pulse can be directed. The four output paths from the L/A include an M/Odd path, an M/Even path, an S/Odd path and an S/Even path. When an incoming pulse is an odd-numbered pulse (1, 3 or 5) it will be directed to the S/Odd path if it is received on line 516 (thus a space signal) and to the M/Odd path if it is received on line 514 (and thus a mark signal). Similarly for even-numbered pulses (2, 4 and 6) a signal on line 514 is directed to the M/Even path while a signal on conductor 516 is directed to the S/Even path.

Each of the output paths from the L/A includes two channel operated gates, each of which is capable of directing a pulse to a branch path which leads to one of the channels. More particularly, the S side of CH's 2 and 4 control gates in the M/Odd and S/Odd paths and the branch paths from these gates lead to the next preceding odd channel (3 and 5, respectively). The S sides of the odd-numbered channels (with the exception of CH1) control gates in the M/Even and S/Even paths, and the branch paths from these gates direct pulses to the next preceding even channels (4 and 6). The gates direct pulses to their branch path if the S side of their associated channel has not been set. When the S side of a channel has been set, the gates associated therewith direct pulses further down the same main path.

If the first pulse received by the L/A is a mark signal, it will be directed to the M/Odd path which leads to gate S2*a* which is controlled by the S side of CH2. Since all of the channels are initially in their normal state, the pulse will be directed to the branch path 601, in accordance with the conditions set out above. The path 601 leads to both the M and the S sides of CH1 and thus is operative to set both sides of the channel, thereby placing it in a mark condition. Since the first pulse was a mark signal CH1 is correctly set to reflect the first code bit.

If the first pulse to the L/A is a space signal, it will be directed to the S/Odd path leading to gate S2*b*. Since the S side of CH2 is not set, the pulse is directed by the gate to the branch path 602 which leads only to the S side of CH1 resulting in the S side of CH1 being set. When the S side of CH1 is set and the M side is not, the channel is in a space condition and once again the channel correctly reflects the information of the first pulse bit received by the L/A.

The second pulse into the L/A will be directed to either the M/Even or the S/Even line depending on whether it is a mark signal or a space signal. If it is a mark signal it will be directed to gate S3*a* and from there to a branch path 603 leading to the mark and space sides of CH2. If the signal is a space signal, it will be directed to gate S3*b* and from there over branch path 604 to the space side of CH2. Thus, whether the signal is a space signal or a mark signal, the space side of CH2 is set and gates S2*a* and S2*b* are thereby changed from their normal state to their set state (they subsequently do not direct pulses to their branch paths).

In general, the *n*th pulse received is directed to a gate controlled by CH$n+1$ and directed by that gate to CH$n$ to put that channel in either a mark or space condition. Since a channel in either the space or mark condition has its S side set, the *n*th pulse will always be operative to change the state of the gates controlled by the CH$n$. In this way the $n+2$ pulse will be directed through the CH$n$ gate to another gate instead of to the branch path associated with the CH$n$ gate.

Accordingly, the third pulse passes over either the M/Odd path or the S/Odd path to either gate S4*a* or S4*b*. Gates S4*a* and S4*b* associated branch paths 606 and 607 respectively. Since each pulse is operative not only to properly set the channel to which it corresponds but also to condition the pulse paths for subsequent pulses, the number of paths from the L/A does not have to be increased above four for an increased number of channels.

When the sixth pulse passes through the L/A it is directed either to path M/Even or S/Even and passes directly through the channel controlled gates disposed in those lines (the third pulse having energized the S side of CH3 and the fifth pulse having energized the S side of CH5). Instead of the sixth pulse being directed to CH6, however, it is directed over either line 608 or 609 to the memory circuit (to be described below). The sixth pulse is also directed to a line 611 by either line 612 or 613. Line 611 leads to the memory control circuit the operation of which will be described below.

A path 614 off of transmission lines 514 and 516 directs all incoming pulses to a set control and memory release, SC/MR, circuit, the details of which will be disclosed below. Similarly a path 616 off of transmission lines 514 and 516 directs all incoming pulses to a discriminator which performs the important function of preventing spurious signals from causing erroneous operation of the translator. The details of the discriminator are also described below.

The overall operation of the input section of the receive portion of the translator is to gather and tentatively retain the pulses which comprise a single code character and are transmitted in serial form over transmission lines. When all of the pulses have been received by the translator they can then be transferred simultaneously (thus in parallel form) to a memory section, thereby enabling input section to be available for the next code character even though the information contained in the previous code has not been entirely released from the translator. The particular logic of the channel controlled gates gives the present invention many advantages over presently known systems for the same or similar purposes.

As previously mentioned, it is often necessary to store a binary code character in the translator for a number of milliseconds after it has been received. In order to receive binary characters as fast they may be transmitted, it becomes necessary to transfer a character from the input section to the memory section the instant all of the pulses of a given code have been received. In this way new information can be received by the input section while the memory section retains the previous information for the time required to insure proper response by the typewriter to the code. FIG. 34 illustrates in block diagram form the overall logic of the functional components which comprise the memory section of the translator.

Referring to FIG. 34, there is associated with the M side of each of the *n* channels (where *n* is any number), with the exception of the last channel, a normally closed gate M*nc*, which opens when the M side of the channel with which it is associated is set. (An open gate being one that will pass a pulse or signal while a closed gate is one which will not pass a signal.) Thus if the first pulse received by the receiver is a mark signal both the M and the S sides of CH1 will be set, as previously described, and gate M1*c* will open.

The gate M1*c* is disposed in a path 621 which is joined to a main path 620. In a like manner, gate M2*c* is disposed in a path 622, gate M3*c* is disposed in a path 623, gate M4*c* is disposed in a path 624, and gate M5*c* is disposed in a path 625, all of which join path 620. A normally open gate 628 joins the path 620 to ground 627 as long as the gate remains in its normal state. A sixth path 626 joins path 620 but does not include a channel-operated gate.

A second main path 630, which terminates in a ground 629, is associated with each of the paths 621–626 through normally closed gates 631–636, respectively. Associated with gates 31–63 are current actuated devices 641–646, respectively, which when energized operate to open their associated gates. The device 641 is disposed in a path 651 which joins path 621 to a third main path 640. The device 642 is disposed in a path 652 which joins path 622 to path 640, device 643 is disposed in a path 653 which joins path 623 to path 640, device 644 is disposed in a path 654 which joins path 624 to path 640 and device 645 is disposed in a path 655 which joins path 625 to path 640. The device 646 is disposed in a path 656 one end of which is joined to path 626 and the other end of which leads to path 640 through a normally closed gate 649 which opens along with gate 636 when device 646 is energized. The path 608 which carries a pulse, if the last pulse of a code is a mark signal, terminates at the path 658 between the device 646 and the normally closed gate 649.

When CH1 is in a mark condition, gate M1*c* is open and a path exists between path 640 and ground 627 via path 651 including device 641, path 621 including gate M1*c* and the first main path 620 through normally open gate 628. Similarly, for each channel in a mark condition the M gate operated thereby is open forming a current path which includes the current operated device electrically associated with that M gate. If current is made to flow in the path 640 all of the current operated devices associated with an open M gate will be energized and the normally closed gates controlled by those current operated devices will open. Thus, when gate 631 opens, for example, an alternate current path between main path 640 and ground is established through the gate 631 and over the path 630 to ground 629.

If the sixth pulse is a mark signal its leading edge will pass through device 646 and cause the gates 636 and 649 to open. When the path 640 carries current, it travels through gate 649, device 646, path 656, path 626 and gate 636 to path 630 and ground 629. This latches the gates open and makes them independent of the availability of a path to ground 627. In a similar manner the other gates 631–635 are latched open (when their corresponding M gate is open) and independent of ground 627. When all of the gates 631–636 which are associated with an open M gate are latched through the path 630 to ground 629, the gate 628 is closed and the information in CH's 1–5 is cleared. Due to the latching described above, the clearing of the channels and the closing of gate 628 does not affect the condition of the gates 631–636 and thus the information represented by the particular pattern of open and closed gates 631–636 is preserved. Once the gate 628 has closed the channels can start receiving a new character code since the opening of M gates does not complete a path to ground 627 until gate 628 re-opens. Gate 628 only re-opens, as will be described below, after the memory has cleared, indicating that the information in the memory is no longer needed.

The memory portion of the translator is intimately associated with the channels through the M gates for the purpose of receiving information. At the same time, the memory is capable of being isolated from the channels for a time period approaching one full character (64½ ms.). The memory can be characterized as having two parts. One part is always associated with the channels and always reflects the information in the channel. This portion of the memory is provided by the M gates. The other part of the memory holds information which is received from the first part of the memory but does not always hold the same information which the first part of the memory holds. It is the ability of this second part of the memory to hold onto one binary code character while the other part of the memory is receiving a different binary code character which enables typewriters associated through a translator taught by the present invention to operate at their maximum speeds without damage to the typewriter.

Each of the solenoids associated with one of the selector latches (see FIG. 3) is indicated by the designation LS (latch solenoid), together with its binary weight. Each of the LS solenoids is in a path which joins one of paths 621–626 to a source path 650. The paths 621, 622 and 624 are also joined to a second source 660 by paths which include a function solenoid FS. The function solenoids are those solenoids previously described with reference to the typewriter mechanism which when energized induce the typewriter to perform a function operation.

When path 650 carries current, all of the LS solenoids associated with an open M gate are energized and operated by virtue of their being in a path which leads to ground 629. In this way selector latches are withdrawn and a selected character or symbol is printed. If the path 660 carries current instead of the path 650, one of the FS solenoids will be energized and a selected function cycle will be initiated. A third path 670 may carry current instead of paths 650 or 660, in which case a function operation not associated with the memory (a non-memory function) will be performed. Thus in order for the information stored in the memory to be operative in inducing a desired operation in the remote typewriter, the system must know which one of paths 650, 660 and 670 is to carry current.

Through the combination of unique circuit logic and careful selection of binary codes to represent the various function operations, each code identifies itself to the translator as either a print code, a memory function code or a non-memory function code. When properly identified the system is informed as to which of the paths 650, 660 or 670 is to carry current for operating the remote typewriter.

As previously mentioned, the chart of FIG. 20 is arrived at by arbitrarily assigning the binary weights of 1, 2, 4, 8, 16 and 32 to the selector latches 61, 62, 76, 77, 78 and 79, respectively. Since there are only forty-four lower case characters and forty-four upper case characters, it is not necessary to use all of the sixty-four possible combinations of the six selector latches. There are in fact a complete set of codes which are eliminated by the particular mechanical logic of the rotate mechanism 51 (see FIG. 12). As previously mentioned, mechanism 51 requires that the selector latch 76 be withdrawn whenever the latch 78 is withdrawn. Put in another way, the selector latch 76 produces a plus 2 rotation as does the latch 78 if either of them is pulled downwardly alone. Since the latches produce a redundancy in this regard the system is designed such that the latch 76 is only employed in combination with latch 78 for the purpose of inducing positive rotation of four and five units. The latch 78 has an assigned binary weight of 16 and the latch 76 has an assigned binary weight of 4. It can thus be stated that wherever a character code includes a binary weight of 16 (indicating that latch 78 is withdrawn) it will also include a binary weight of 4 (indicating that the latch 76 is also withdrawn). Thus, all of those posible codes including a binary weight of 16 but no accompanying binary weight of 4 are at once recognized as codes not identifying character or symbol print operation. Recognizing this important fact, the present invention teaches the use of a code system wherein all of the binary codes which include a binary weight of 16 but not a binary weight of 4 are assigned exclusively to function operations as opposed to print operations. There are sixteen such codes and FIG. 35 presents a chart illustrating how these codes are used. In order to make effective use of this binary code arrangement, the present invention teaches a logic circuit which is capable of distinguishing between a code which includes a binary weight of 16 together with a binary weight of 4 and a code which includes a binary weight of 16 without an accompanying binary weight of 4. When the logic circuit determines that the code includes a binary weight of 16 and a binary weight of 4, it operates in conjunction with the memory control circuit (to be described below) to direct current through path 650. When the logic circuit recognizes a code as having a binary weight of 16 but no binary weight of 4 it responds by directing current over path 660 or path 670. The manner in which the logic circuit determines whether current is to be directed through path 660 or path 670 (the former for memory functions and the latter for non-memory functions) will be described below along with the detailed description of the logic circuit. The logic circuit which determines whether or not a code is a character print code or a function code is referred to as the C/F Code Discriminator and will be referred to as such throughout the remainder of the description.

Now that the importance of properly selecting codes to represent function operation has been explained the reason for not associating function solenoids with CH's 3 and 5 becomes clear. The latch solenoid in path 623 is only energized when the code in the memory includes a binary weight of 4. Thus unless CH3 has been placed in a mark condition the solenoid LS4 will not be energized. Since the codes associated with functions are all characterized by the absence of a binary weight of 4 it would not be possible to energize a function solenoid disposed in path 623.

The path 625 containing the latch solenoid LS 16 is connected to the ground 629 through path 630 for all function codes (since all function codes include a binary weight of 16 and thus a function solenoid associated therewith would be energized every time a function code was received by the translator. This would deprive the system of the selectivity necessary to distinguish between the various function codes. Accordingly these two paths, paths 623 and 625, are not used with function solenoids.

Referring now to FIG. 36, the C/F Code Discriminator comprises a plurality of gates controlled by the M side of CH's 1–5. The Discriminator has three main inputs: print code path C, function code path F and non-memory function code paths NMF. Each of these paths is separated from a ground 661 by a number of gates which are either open or closed depending on the state of the M side of the channel with which they are associated.

The path C communicates with a branch path 662 which leads to ground 661 through a normally open gate M5*e* (normally closed gates are represented by empty squares, normally open gates are represented by squares enclosing a diagonal line). Thus whenever a code does not include a CH5 mark (a binary weight of 16) the C path will lead to ground 661 through path 662. The C path also leads to a path 663 through a normally closed gate M3*e* which opens whenever CH3 is in a mark state. Thus when a particular code has both a binary weight of 16 and a binary weight of 4, the C path will lead to ground but instead of doing so through gate M5*e*, it will do so through gate M3*e*. On the other hand, when a code has a binary weight of 16 (the mark side of CH5 set) and no binary weight of 4 (the mark side of CH3 not set) the C path will not lead to ground 661 since gate M5*e* will be closed as will be gate M3*e*. Since any code having a binary weight of 16 and no binary weight of 4 is representative of one of the function operations, it can be stated that the C path will only lead to ground when a code represents a print cycle and will not lead to ground when a code represents a function cycle.

The F path leads to a normally open gate M1*d* which is joined by a path 664 to a normally open gate M2*d* the output of which leads through a path 665 to a normally closed gate M4*d*. An output from gate M4*d* is directed over path 666 to a normally open gate M3*d* the output from which is directed over previously described path 663. Since the gate M3*d* is controlled by the same channel as gate M3*e*, namely CH3 (which represents a binary weight of 4, the F path will be unable to reach ground 661 when CH3 is in a mark condition as this causes gate M3*d* to close and gate M3*e* to open. Since the presence of a mark condition in CH3 indicates that the code is not representative of a function (function codes do not have a binary weight of 4), the ability of the F path to reach ground is dependent on the code representing a function.

A code which represents a function operation includes a binary weight of 16 without an accompanying binary weight of 4, and results in gates M5*d* and M3*d* being open. Under these conditions path 666 leads to ground 661. As the following description will show, the remaining C/F Code Discriminator gates are arranged to establish a path between path F and path 666 whenever the code in the channels represents one of the memory function operations.

An instance where a function code does not result in communication between the F path and path 666, and thus ground 661, occurs when the code is simply a binary weight of 16 (5th pulse only mark signal). As reference to the chart of FIG. 35 will show, the operation represented by a binary weight of 16 is a shift operation. A shift operation, as will be described below, does not employ the same memory system as the other memory functions employ and which was described above. Thus when there is a binary weight of 16 and no other channels are in a mark condition, the gate M4*d* will remain closed and prevent communication between the F path and line 666 which communicates with ground 661. An independent shift path 671 leads to gate M3*d* which is normally open and the output of which leads to line 663. Thus, when the shift code is present in the channels ground will be found through the path 671 and not through the C path or the F path; however, a shift code is present in all function codes, either memory or non-memory so that when ground is found through the F path it will also be found through the path 671 (shift), but when ground is found through the path 671 it may (or may not) be found through the F path.

The F path will lead to path 666 and thus to ground 661, however, whenever a channel in addition to CH5 is in a mark condition, and CH3 is in a space condition (binary weight of 16 with no binary weight of 4). When CH1 is in a mark condition along with CH5, the F path finds path 666 through a branch path 672 which includes normally closed gate M1*g*. The gate M1*g* is open when CH1 is in a mark condition and the F path leads to normally open gate M4*e*, to which path 672 leads. The output of gate M4*e* leads directly to path 666 which sees ground through gates M3*d* and M5*d*. If CH2 is in a mark condition along with CH16, path F finds ground over path 673 which includes normally closed gate M2*f* which opens when CH2 is in a mark condition. The F path is thus joined with path 672 which as described above leads through gate M4*e* to path 666. When CH4 is in a mark conditon along with CH5, the F path finds path 666 through gate M1*d*, path 664, gate M2*d*, path 665, and gate M4*d* (now open) which leads directly to the path 666 which leads to ground 661.

When a function code includes a binary weight of 16 together with a binary weight of 8 plus a binary weight of either 1 or 2, the F path does not lead to the ground 661. The presence of a binary weight of 8 causes the gate M4*e* to close requiring all paths to ground to be via path 665. When the binary weight of 16 is combined with the binary weight of 8 alone as mentioned above, the F path leads to ground through the normally open gates M1*d* and M2*d*. When either of these gates are closed, the F path is effectively disconnected from the ground. These codes, which are identifiable as function codes in that they include a binary weight of 16 with the absence of a binary weight of 4 but do not produce a ground connection with the F path, are characteristic of non-memory function operations.

The bell, for example, is associated with path 676 which leads to normally open gate M1*h*, the output of which follows path 677 to a normally closed gate M2*e*, the output of which communicates with path 665. The bell code (see FIG. 35) is established when CH's 2, 4, 5 and 6 are in a mark state. This code is identifiable as a function (binary weight 16, no binary weight 4) and further identifiable as a non-memory function (a binary weight of 8 plus a binary weight of 1 or 2) whereby the F path does not lead to ground. Due to CH2 being in a mark condition the gate M2*e* is open whereby the path 676 is able to see path 665 which leads to path 666 and ground through gate M4*d* which is open by CH4 being in a mark condition.

The path 678 leads to the normally closed gate M1*e* and finds ground when a code includes a binary weight of 16, a binary weight of 8 and a binary weight of 1. The path 679 leads to normally closed gate M1*f*, the output of which is connected over path 677 to gate M2*e* and communicates with ground when both CH's 1 and 2 are in a mark state together with CH's 4 and 5.

The overall function performed by the C/F Code discriminator is that of establishing a ground path that exists only when a given code is received and which thereby identifies a given code as a print code or a function code, and if a function code, whether a memory or non-memory function. It is through this identification that the remainder of the system is able to energize those solenoids which operate the typewriter to perform the operation which the code represents. The discriminator is greatly simplified by establishing a code pattern wherein a single test determines whether or not a code is a print code or a function code. When the code is identified as representing a print operation (the C path leads to ground) the previously described memory is employed and it is necessary to control the memory so that it isolates itself from the input portion of the receiver at the proper time, retains the information on hand for a sufficient period of time to enable the typewriter to operate properly, and then discharges the information preparatory to receiving new information the instant the information is no longer necessary for the typewriter operation. This same operation of the memory is needed when the F path finds ground since, as previously described, the F path leads to ground only when the code represents a function operation requiring the use of the previously described memory. That portion of the receiver which is responsible for coordinating the operation of the input section, the C/F Code Discriminator and the memory is referred to as the Memory Control, which will now be described with reference to FIG. 37.

The Memory Control comprises a control unit M/C which has an X side and a Y side, each of which is capable of being energized and each controlling a number of gates some of which are normally open and some of which are normally closed. In addition, the Memory Control includes a number of gates which are independently operated and function to provide current to an associated path when the gates open.

A sixth code pulse, whether it be a mark signal or a space signal, operates to connect path 681 to ground. The path 681 leads through a normally open gate M/CY*a* to a gate 682 in a path 683. The gate 682 is normally closed and thus prevents a source of potential 684 from being applied through the path 683 to the control M/C. The grounding of path 681 operates to close the gate 682 and thereby provides energizing potential from source 684 to the control M/C.

Together with the closing of gate 682, the grounding of path 681 results in a current flow in path 640 which, as previously described, results in the memory receiving the code information and effectively separating from the input section of the receiver. The path 640 looks to a source 686 for current but is normally separated therefrom by a gate Me which is disposed in a path 687. Path 687 connects to a path 688 which in turn connects to the path 681. The gate M*e* responds to path 687 seeing ground through path 681 by opening and thereby communicating path 640 with source 686. Thus, the first results of the sixth pulse are the energization of control M/C and current flow over path 640.

While the closing of gate 682 communicates source 684 with path 683, the energization of control M/C further requires the establishment of a ground path through path 689 from the M/C. The path 689 leads through a gate 691 to a path 692 which is joined to the C path, previously described with reference to FIG. 36. If the code received by the input of the receiver represents a print cycle, the C line will communicate with ground and the M/C will be energized. If the code does not represent a print cycle and thus the C path does not lead to ground, path 692 may still find ground through a connecting path 693 which is joined to a path 694 which in turn leads through a normally open gate M/CY*d* to path F. If the code in the input section of the receiver represents a memory function operation, the F path will lead to ground and the M/C will be energized. Thus, the only time that the memory control operates is when the code represents either a print cycle or a memory function.

If the code represents a non-memory function, the M/C will be unable to find ground and the memory control will not operate. If either the C path or the F path leads to ground, the M/C will be energized initially from the source 684. The source 684 is only available to the M/C, however, for the duration of the sixth pulse since the ground provided through path 681 is not available thereafter. Since the pulse has a duration of approximately 5 milliseconds and the memory control must operate for something approaching a complete typewriter cycle (64½ ms.) it is apparent that a supplemental source of energization for the control M/C must be provided. As will be explained below, such supplemental energization is provided and the energization which the M/C realizes from the supplemental source conditions the M/C differently than does source 684.

During the duration of the sixth pulse, and thus while source 684 provides the energization to M/C, the X side of M/C is energized (set) while the Y side remains in its normal state (unset). The setting of the X side of M/C results in normally closed gates M/CX*a* and M/CX*b* opening and also results in the supplemental source 696 being made available to the M/C over path 697. At the termination of the sixth pulse, the source 696 becomes the sole source of energization to the M/C and at that time the Y side becomes energized along with the X side.

The previously mentioned path 694 is joined to the paths 697 and 683 leading to sources 696 and 684 respectively and includes a current operated device 698 which when energized changes the state of the normally open gate **699*a* and normally closed gate 699*b*. One side of these gates leads to a ground 701. The other side of the gate 699*b* joins path 694, and the other side of gate 699*a* joins a path 702. If a code identifies a function operation which establishes a ground path over path F, the device 698 will be energized by the current flow through the path 694. Under these conditions the gates 699*a* and 699*b* will change from their normal states to their energized states. If the M/C initially finds ground through path C instead of path F, current will be unable to flow in path 694 and the gates 699*a* and 699*b*** will remain in their normal state.

Assuming this latter condition (ground found through path C) a gate CC will open as a result of the path 703 leading to ground through connecting path 702 and gate **699*a*. The communication of path 703 with path 702** occurs immediately upon the energization of the X side of M/C which causes the gate M/CX*b* to open. When the CC gate opens, the source of potential 686 associated therewith is made available to path 700 which leads ont of gate CC and which, as will be described in detail below, leads to the cycle clutch solenoid CCS. The communication between the source 686 and the cycle clutch solenoid results in the operation of the cycle clutch. Thus, the fact that the M/C finds ground through path C rather than path F results in the operation of the cycle clutch. If the reverse is true—the M/C finds ground through path F, then the gate 699*a* is closed and the cycle clutch is not energized.

Since the gate M*e* must maintain communication between source 686 and path 640 for a duration which extends far beyond the duration of the sixth pulse, it is necessary to insure that the path 687 leads to ground after the sixth pulse terminates (and thereafter gate M/CY*a* closes). When the X side of the M/C sets (which it does with the leading edge of the sixth pulse), the gate M/CX*a* opens communicating path 687 with path 694. If the code in the channels represents a function, the gate 699*b* is open and the path 694 leads to ground 701 through that gate. If the code represents a print cycle the path 687 finds ground via path 688, which is connected to path 687, and which leads to path 703 which leads to ground through open gate M/CX*b*, path 702, and open gate 699*a*. Thus whether the code represents a memory function or a print cycle, the gate M*e* is communicated with ground via a path which is more stable than that which is initially employed for initiating operation.

Even though the X side of M/C sets almost simultaneously with the occurrence of the leading edge of the sixth pulse and thus the gate *Me* is able to find ground at that time through either gate M/CX*a* or M/CX*b*, the memory control is designed to initiate operation of the M*e* gate even before the short period of time required for the aforementioned gates to open. In this way the information in the input section of the receiver is immediately transferred to the memory section for more permanent storage at the earliest possible instant of time; namely, when the sixth pulse has entered the receiver, which concludes the information necessary to define the code.

During the approximate 5 ms. duration of the sixth pulse, the memory control determines if a code represents a print cycle or a memory function, immediately establishes a ground for a memory current path 640, and also establishes a more permanent ground for the M*e* gate. And, if the code is identified as representing a print cycle, the cycle clutch solenoid is energized to initiate operation of the cycle clutch.

When the sixth pulse terminates, the source 696 is the only source of energization to the control M/C and the previously unenergized Y side of the M/C becomes energized and sets. This results in the M/CY*a* gate closing and isolating the memory control from the input section to prevent any further signals from the input section disrupting the orderly operation of the memory control. The gate M/CY*b* (previously referred to as gate 628 in FIG. 34) also closes and thereby disconnects the path 620 from the ground 627, for the purpose described above with reference to FIG. 34.

As previously mentioned, the termination of the sixth pulse results in the reseeting of the 1st BL, the effect of which is to clear the input channels and the CF Code Discriminator. Thus, when the sixth pulse terminates it becomes necessary for the M/C to find ground through some path other than paths C or F, since both are effectively disconnected from ground when the sixth pulse terminates. The path 689 from M/C communicates through gate 691 with path 692 which leads to path 693 which is joined to path 694 that leads to ground 701 through gate 699*b* when the gate is open. As previously described, gate 699*b* opens when a function code has been detected and thus a function code will result in a more permanent ground path for the M/C than that previously provided. In a similar manner, the path 692 leads to a path 705 which is joined in path 703 which leads through gate M/CX*b* to path 702 which leads through gate 699*a* to ground 701. This path is available (gate 699*a* is open) whenever a print code is received and thus under these circumstances a more permanent ground is provided to the M/C. Thus the termination of the sixth pulse and the elimination of code information from the input channels and the CF Code Discriminator does not result in termination of the operation of the M/C nor does it result in the code information being eliminated from the memory section of the receiver.

When the sixth pulse terminates and the Y side of M/C sets, as explained above, the gate M/CY*c* opens and if the gate 699*b* is open due to a function code being stored in the memory, a path will be established from the MF gate through path 706 to path 694 which leads to ground 701. When path 706 leads to ground the MF gate finds ground in this manner, it opens and communicates the source 686 with the path 660 whereby a solenoid associated with the path 660 (see FIG. 34) is energized. If the code in the memory does not represent a function, but instead represents a print cycle, the gate 699*a* will be open instead of gate 699*b* and the MF gate will not see ground through path 706. Under these conditions, however, the Code gate will see ground through path 708, gate M/CY*e* (which is now closed by virtue of the Y side of M/C setting), path 702 and gate 699*a*. This results in the Code gate opening source 686 communicating with path 650. Path 650 provides energization for one or more of the latch solenoids LS (see FIG. 34).

Both the MF gate and the Code gate lead to a path 711 through paths 712 and 713 respectively. Path 711 leads to the control M/C and operates to reset the X side of the M/C and disconnect the Y side from the source 696 (latch gate closes). While the Y side is disconnected from source 696, it remains set for as long as either the Code gate or MF gate remains open.

When the X side is reset, gate M/CX*a* and M/CX*b* both close and the M*e* gate is required to find ground through some path which does not include either one of these gates. If the code being acted on represents a print cycle, the M*e* gate finds ground via paths 687, 688, 703, 712, gate M/CY*e*, path 702, and gate 699*a*. If the code being acted upon represents a function, the M*e* gate finds ground via path 687, path 713, path 706, gate M/CY*c*, path 694, and gate 699*b*. Thus the resetting of the X side of M/C does not result in the termination of current in the memory supply path 640. The memory only releases its information in response to the Y side of the control M/C resetting. This occurs when either the MF gate or Code gate (depending on which is being held open) is closed. By having the signal which opens the Code gate or MF gate generated by either the character print operation mechanism or the function cycle mechanism of the typewriter, the memory control can be made to release the information in the memory at the precise instant it is no longer necessary for typewriter operation.

The normally open gate 716 in path 706 and the normally open gate 717 in path 708 operate to close the MF gate and the Code gate, respectively, in response to a signal from the typewriter which indicates that the function cycle has commenced and the memory information is no longer needed which clears the memory section to receive new information even though the typewriter cycle is just beginning, or the print cycle has progressed beyond the tape breakage point. When one of these gates closes its associated MF or Code gate also closes for a want of a path to ground and thus the source 686 is discontinued from one of the paths 660 or 650 to which it was connected. This results in the Y side of the M/C resetting and the current through paths 640 and 700 being terminated whereby the memory releases its information and the cycle clutch solenoid CCS is de-energized. The closed gate remains closed for the remainder of the typewriter cycle which enables information to be transferred to the memory even before the typewriter completes cycling. This is possible due to the fact that the typewriter has it own sort of memory. It is then possible for the typewriter to be cycling in response to a first code, the memory circuits containing a second code and the M gates receiving a third code. The gate 716 is advantageously realized as switch 254 previously described with reference to FIG. 4 while gate 717 is advantageously realized by switch 157 previously described with reference to FIG. 7.

A most important feature of the present invention is the manner in which the memory control operates the cycle clutch solenoid CCS. During the initial operation of the M/C control when the X side is the only side set, the gate CC which controls the cycle clutch solenoid finds ground through gate M/CX*b* (initially finding ground through path 681) and after the X side of the M/C is reset and the Y side is set, the gate CC finds ground through path 712 and gate M/CY*e*. Thus as long as either side of the M/C control is set, the gate CC remains open and the cycle clutch solenoid is energized. When the transmit typewriter is operated at full speed, (e.g. repeat hyphen or repeat underscore), the cycle clutch of the transmit typewriter does not re-engage between each individual print cycle but rather remains continuously engaged. In order for the receive typewriter to maintain the same speed as the transmit typewriter it is necessary for the cycle clutch of the receive typewriter to also remain disengaged insomuch as repeated engaging and disengaging prevents the necessary speed to maintain correlation with the transmit typewriter. Since the cycle clutch solenoid of the receive typewriter is energized as long as the M/C is energized the high speed repeat operations of the transmit typewriter are faithfully reproduced at the receive typewriter due to its being operated with a continuously engaged cycle clutch. Stated another way, at any time that overrunning memory information is being fed to the receive translator the receive typewriter is operating at full speed in its continuous attempt to clear the memory through the M/C control.

The gate 691 which communicates the output path 689 of the control M/C with the path 692 which leads to ground over one of several possible adjoining paths has been referred to several times previously but its operation has not been explained. The gate 691 is normally open and acts as a safety feature to prevent damage to all memory-associated components. As previously described, the Y side of control M/C remains energized until a signal is received from the typewriter indicating that the selected memory function or print operation has reached a pre-determined point in the cycle. If a print or memory function code is transmitted and received but the receive typewriter does not for some reason actually operate in response thereto, the Y side of the M/C control remains energized. If the remote typewriter is unattended, as is contemplated by the present invention, the situation set out immediately above can lead to the M/C control, memory, power transistors and involved solenoids remaining energized over a long period of time, and possibly being damaged. Thus, the gate 691 remains open as a function of the safety control and memory release, SC/MR, circuit, which will be described in detail below. The SC/MR circuit operates to close the gate 691 whenever approximately 100 ms. passes without a code pulse being received by the translator. Thus, if the situation described above occurs, the SC/MR circuit closes the gate 691 after 100 ms. and thereby disassociates the M/C control from a ground which results in the de-energization of the M/C control (and all associated circuitry). This resets the memory control and enables a subsequent code to enter the receiver in an attempt to operate the typewriter. Without the SC/MR control gate 691 it would be impossible to present a code to the receive typewriter once it had failed to respond to a prior code since the M/C control prevents the memory from receiving a new code as long as it contains a previous code.

(f) Receive circuits

The M/C control is advantageously realized by a circuit comprising glass encapsulated reed switches and associated double-wound coils. Circuits of this description were previously described with reference to FIGS. 22–28 and the M/C control shown in FIG. 38 differs from these aforementioned circuits only in the particular details to be described immediately below.

Referring now to FIG. 38, the Y side of the M/C control comprises a double-wound coil with windings 721 and 722 which are joined at one end to a conductor 723 which leads to ground 724, and at their other ends to a diode 726 which is oriented to present a low resistance path in the direction of winding 721 from winding 722 and the windings when concurrently energized develop opposing magnetic fields. A set line 727 is electrically joined between diode 726 and winding 722.

The X side of the M/C control comprises a double-wound coil with windings 728 and 129 which are joined at one end to conductor 723 which leads to ground 724 and at their other end to a diode 731 which is oriented to present a low resistance path in the direction of winding 729 from winding 728 and the windings when concurrently energized develop opposing magnetic fields. The diodes 726 and 731 are joined by a conductor 732 which is electrically joined to a latch line 733 which leads to a source of latching potential 734 through a normally open switch M/CX1. Electrically joined between winding 728 and diode 731 is a reset line 736.

When all the windings of the M/C control are de-energized and a pulse is received on the set line 727, current is directed by diodes 726 and 731 down windings 722, 721 and 729. The presence of current in both windings 721 and 722 causes the windings to magnetically buck one another and thus prevent the Y side from setting. The X, however, does set since only one of its windings is energized with current. Thus any switches associated controlled by the X side such as switch M/CX1, are changed from their normal to their set states. The opening of switch M/CX1 in response to the energization of winding 729 makes the source 734 available to windings 729 and 721. As long as the set pulse is in the circuit (i.e., for the duration of the set pulse), both windings 721 and 722 will remain energized and thus prevent the Y side of the control from setting.

The initial set pulse stage wherein the X side sets and the Y side remains bucked down, corresponds to the previously described initial condition of the memory control wherein the X side sets in response to a signal over path 683 but the Y side remains in its normal state. When the set pulse terminates the source of potential provided over latch line 733 energizes windings 729 and 721 only and thus the Y side sets. This explains how the termination of the sixth pulse is made to result in both sides of the M/C control setting.

When both sides of the M/C are set and a reset pulse is received on line 736 (corresponding to path 711 of FIG. 37) current is made to flow down both windings 728 and 729 of the X side and windings 721 of the Y side. The presence of current in both windings of the X side of M/C causes the windings to buck one another and thus reset the X side. This results in the switch M/CX1 in the latch line 733 opening and disconnecting the source 734 from the windings. Thus, the X side resets immediately upon the occurrence of the reset pulse while the Y side remains set for the duration of the reset pulse due to the fact that the reset pulse energizes winding 721 and not winding 722. When the reset pulse terminates, winding 721 is deenergized and the entire M/C control is reset to its normal state.

The M/C control initiates either a print operation or function operation and then responds to a signal from the typewriter by resetting. In this way, the memory holds a code character for the necessary time, but no longer.

(g) Overall receive circuit

Now that a description of the general operation and basic logic of the four main sections of the receive portion of the translator (the input section, the memory section, the C/F Code Discriminator section, and the memory control section) have been described, a detailed description of a preferred embodiment of the receive portion of the translator will follow with reference being made to FIGS. 29–32. The following description of the preferred embodiment of the receive portion of the translator includes several features important to the present invention which have not been described to this point, even in general terms. These features have not been described since a full understanding of their operation is best appreciated in the environment of the specific embodiment of the invention to be set out below.

Referring now to FIGS. 29–32, input signals are received over transmission lines 514 and 516 and directed through normally closed switches T/C5*a* and T/C4*a*. If the incoming signal is a space signal it travels over line 516 and through switch T/C4*a* to conductor 741 which is electrically joined to the base of a transistor 742. When the base of transistor 742 is pulsed, the transistor is biased into a conducting state which results in the base of a second transistor 743 seeing ground through a conductor 744 which is electrically joined to conductor 467 which leads to the negative side of source 462. When the base of transistor 743 sees ground, the transistor conducts and the positive voltage which is applied to the emitter of the transistor by conductor 746, which is connected to conductor 471, appears at the collector of the transistor and thus on a connecting conductor 747. Thus the results of a space signal on conductor 516 is a positive pulse on conductor 747.

If the incoming pulse is a mark signal, it is received on transmission line 514 which leads through switch T/C5*a* to a conductor 748 which includes a variable resistor 749 and a fixed resistor 751. The conductor 748 is electrically joined to the base of a transistor 752 and a signal received by the base of the transistor places the transistor in a conducting state. When transistor 752 conducts ground line 774 is seen by the base of a transistor 753 through transistor 752 whereby the transistor 753 conducts. When transistor 753 conducts, the positive voltage established on the emitter thereof by the conductor 746 appears on the collector of transistor 753 which is electrically connected to a conductor 754. Thus, a mark signal on conductor 514 results in a positive pulse on conductor 754.

The conductor 747 is electrically joined through an isolation diode 756 to the common side of a form C switch L/AY5 having a normally closed side L/AY5*a* and a normally open side L/AY5*b*. *d*epending on which side of the L/AY5 switch is closed (which is dependent on the condition of the Line Alternator, L/A) a pulse on conductor 747 will be directed to either the S/Odd line or the S/Even line. The conductor 754 is electrically joined through an isolation diode 757 to the common side of a form C switch L/AY4 which comprises a normally closed side L/AY4*a* and a normally open side L/AY4*b*. A pulse on conductor 754 passes to either conductor M/Odd or M/Even depending on the side of the switch L/AY4 which is closed.

The Line Alternator L/A is in its normal state when the first pulse is received, and thus the first pulse is directed to either the M/Odd or the S/Odd conductor depending on which of incoming lines 514 or 516 it is received over.

Each of conductors 754 and 747 is electrically joined through an isolation diode to a conductor 758 which connects to the set line of the Line Alternator L/A. Thus as the first pulse is passing to either the M/Odd or the S/Odd line it is also operating to set the L/A so as to change the conditions of the switches L/AY4 and L/AY5. As previously described, the condition of the L/A does not change in response to a set pulse until the pulse terminates, and thus the first pulse is properly directed to the M/Odd or the S/Odd line. Once the pulse has terminated, however, the L/AY4*b* switch closes as does the L/AY5*b* switch whereby the next pulse received is directed to either the M/Even or the S/Even line depending on whether it appears on conductor 754 or 747. The second pulse also passes over conductor 758 to the L/A but is directed to the reset portion thereof whereby at the termination of the second pulse, the L/A resets so that the third pulse is properly directed to either the M/Odd or the S/Odd conductors. In this way the L/A operates to direct input pulses in the manner necessary to establish in the input channels the same sequence of mark and space signals as that transmitted from the transmit typewriter.

The L/A is a good example of a subcircuit of the translator which operates as part of both the transmit and receive portions of the translator. As the detailed description of the receiver progresses it will be noticed that several other subcircuits operate as part of the transmit section of the translator and as part of the receive section of the translator. By providing a design which makes possible this duality of operation the preferred embodiment of the invention is capable of being manufactured at a relatively low cost and packaged in a relatively small housing.

If the first pulse is a mark signal, it is directed over the M/Odd conductor to the form C switch S24 having a normally closed side **S24*a* and a normally open side S24*b*. Since both sides of all of the channels are initially in their normal state, the first pulse will find the S24*a* side of switch S24 closed and will be directed over the conductor 759 to which the switch side S24*a* is electrically joined. The conductor 759 leads to the set line of CH1 which results in both the M and the S side of CH1 being set. If the first pulse is a space siinal it is directed to the S/Odd line which leads to the form C switch S25 which includes a normally closed side S25*a* and a normally open side S25*b*. The pulse will be directed through side S25*a* to the conductor 761** which is electrically joined to the direct line of CH1 and which results in the S side only of CH1 being set.

Thus, if the first pulse is a mark signal it results in CH1 being conditioned to a mark state; if the first pulse is a space signal it results in CH1 being conditioned to a space state.

As previously described, CH1 responds to a set signal by setting on the leading edge of the pulse and not requiring the pulse to terminate before setting. Thus as soon as a pulse enters CH1, it sets the S side thereof (whether it is received on conductor 761 or conductor 759) and any switches controlled by the S side of CH1 change their state. The switch associated with the S side of CH1 which is of particular interest to the receive portion of the translator is switch S14 which is normally open. One side of switch S14 is electrically joined to a normally open switch D1 and the other side of the switch is electrically joined through a resistor 762 to the base of a transistor 763. The emitter of transistor 763 is electrically joined to the conductor 469 which leads to the positive terminal of the voltage supply 462 while the collector of the transistor is electrically joined to the main latch line 486. When the base of transistor 763 is able to see ground the transistor conducts and the main latch line is connected to the conductor 469 through the transistor. As long as transistor 763 is conducting, the main latch line is in communication with the positive side of the source of potential and furnishes voltage to the various latch lines associated with the several channels. The switch D1 is electrically joined to conductor 764 which in turn is electrically joined to the conductor 467 which leads to the negative terminal of the voltage supply 462 via conductor 468. Thus the base of transistor 763 will see ground when switch S14 and switch D1 are both closed. As previously mentioned above, the switch S14 closes in response to the leading edge of the first pulse. The switch D1 is normally open and closes when a discriminator coil D is energized.

The discriminator coil D forms part of a transient signal discriminator provided to prevent transient signals from introducing errors in the system and to reset the channels in case less than a full code character is received. This is of importance because, without the resetting feature, a code containing either more or less pulses than proper would leave the energized channels latched so that the next proper incoming code would drive the improper code out of the system but would, itself, end in an improper position in the translator, then followed by the same events with relation to the next code, and so on.

The other portion of the discriminator is formed by a capacitor 766 which is joined in electrical parallel with coil D. The conductors 754 and 747 are electrically joined through isolation diodes to a conductor 767 which is electrically joined to the junction between the coil D and the capacitor 766. The capacitor 766 is selected to lose its charge after approximately 4 ms. When charged, the capacitor maintains a voltage across the coil D for the 4 ms. required for the capacitor to discharge. At the end of 4 ms. time the voltage across the coil is removed and the coil is de-energized. Thus the effect of a transient signal or improper code received by the system is the setting of one or more channels and a temporary communication between conductor 469 and main latch line 486. 4 ms. after the transient signal or improper code terminates, the coil D is de-energized and switch D1, which is normally open and only closes when coil D is energized, opens. This disconnects the base of transistor 763 from ground and operates to place the transistor 763 in a non-conducting state. In this way the source of potential from line 469 is removed from main latch line 486. Thus while the S side of CH1 will set in response to a transient signal it will not be able to remain latched for more than 4 ms. after which time it will be released.

Since the time between pulses of a character code is less than 4 ms. the capacitor 766 is recharged before the coil D is de-energized and thus the switch D1 remains closed for the entire duration of the code.

The operation of the transient discriminator circuit is extremely important in that it prevents the possible loss of an entire message. If a transient signal is able to set CH1 and the channel remains set, the next code received by the system will have each of its pulse signals directed to the wrong channel and thus a completely erroneous code will be received. Further, since the input section of the receive portion of the translator is capable of receiving a new code almost the instant the sixth pulse of the previous code has terminated, the extra pulse created by the erroneous first transient pulse will be carried over to the next incoming code and cause it to present an erroneous pattern in the channels of the receiver. Thus the discriminator circuit operates to prevent more than the loss of only a single character.

The conductors 754 and 747 are electrically joined through isolation diodes to a conductor 768 which leads to the base of a transistor 769 through a resistor 771. The conductor 768 is also joined to a capacitor 772 which is in parallel with the resistor 771 while charging and in series while discharging and is electrically joined to conductor 464 which is joined to the conductor 466 which leads to the ground terminal of the voltage source 462. The capacitor 772 is selected to hold a charge for approximately 100 ms. As long as capacitor 772 is charged, the base of transistor 769 will be properly biased to place the transistor in a conducting state whereby current will flow through the collector of the transistor to the emitter which leads to ground via conductor 773, conductor 464, and conductor 466. The conductor of transistor 769 is electrically joined to one end of the coil SC/MR, the other end of which is electrically joined to the conductor 469 which carries a positive potential. Thus when the transistor 769 is conducting the coil SC/MR will lead to ground and be energized. The energization of coil SC/MR results in the form C switch SC/MR1 being changed from its normal state to its energized state. The switch SC/MR1 includes a normally open side SC/MR1*a* and a normally closed side SC/MR1*b*. In the description of the transmit portion of the translator, the conductor 463 was shown as leading to ground through switch 1st BLX1 and switch SC/MR1*b*. It is this ground path which enables the base of the various T transistors to see ground for purposes of biasing the transistors to a conduction state. The energization of coil SC/MR identifies to the circuit that it is going to receive information. In order to prevent a transmit operation from interfering with the receive operation, the switch SC/MR1*b* is open to effectively disconnect the line 463 from ground. In this way the channels which are employed both to receive and transmit information are available only to receive and are not affected by an attempt to transmit information during a receive operation.

The closing of switch SC/MR1*a* is part of an important safety feature which has been briefly discussed above and which will be described in detail below in connection with the memory control section of the receiver.

The second pulse received is directed to either the M/Even or the S/Even line and encounters either switch S34 or S35, respectively. If the pulse is a mark signal it passes through switch side S34*a* to the set line of $CH_2$ with both the mark and the space side of the channel being set. If the signal is a space signal it will travel through switch side S35*a* to the direct line of CH2 resulting in the space side only of the channel being set. The second pulse, like the first pulse, and like each of the pulses to follow, travels over conductor 767 to the discriminator to prevent the switch D1 from opening, travels over conductor 758 to the L/A to induce it to change its state after the pulse terminates, and travels over conductor 768 to the base circuit of the transistor 769 to keep the coil SC/MR energized.

The third pulse will be directed to either the M/Odd or the S/Odd line and will encounter either switch S24 or S25. Since the S side of CH2 was set by the second pulse the switch side S24*b* will be closed as will be the switch side S25*b*. Thus if the pulse is a mark signal and is directed over conductor M/Odd it will travel through switch side S24*b* to switch S44. If the pulse represents a space signal and travels on the S/Odd line it will pass through switch side S25*b* to the switch S45.

By having all of the channels in their normal states at the start of a receive operation, and successively setting the channels to a mark or space condition, and further by having the *n*th pulse directed to the *n*th channel through a switch controlled by the $n+1$ channel, it is possible to limit the number of necessary conductors to four. This number of conductors does not increase if the number of channels is increased since the basic logic of the system is not affected by the number of channels. As each pulse enters the system it is directed to the first channel which has not yet had its S side set. Thus the fourth pulse is directed to CH4 through either switch S54 or S55 and induces the channel to assume either a mark or a space condition depending on whether the signal is received on the M/Even line or S/Even line. If the fifth pulse is a mark signal it travels on the M/Odd line through normally open side S24*b* and through normally open side S44*b* to the set line of CH5 resulting in both the mark and the space sides of that channel setting. If the fifth pulse is a space signal it travels over conductor S/Odd through normally open side S25*b* and normally open side S45*b* to the direct line of CH5 resulting in the S side only of CH5 being set.

It is necessary to temporarily store the pulse as they enter the system so that they exit together at the same time for simultaneous transmission. The instant the sixth (last) pulse enters the system, all of the necessary information has been received to create the necessary parallel signal. Since the sixth pulse is the last pulse, it is not necessary to wait for any further pulses and the storage of the sixth pulse in an input channel is thus unnecessary. It is necessary, however, to store the entire parallel signal for a sufficient period of time to enable the receive typewriter to properly complete the cycle called for by the particular code formed by the pulses. During the time in which the parallel signal is being stored it may be necessary to start receiving the next signal and thus the input section of the receiver formed by the five channels must be available to receive pulses even though the previously received information is still being employed by the typewriter. Thus, once the sixth pulse enters the system and can be identified as either a space signal or a mark signal all of the pulses must be transferred to a memory section and the input section must be cleared preparatory to receiving a new set of code pulses.

Accordingly, the sixth pulse which travels over either the M/Even or S/Even conductor is not directed to a CH6 but instead is directed to several different parts of the translator for effecting the desired operation outlined above.

Before describing the events which occur in response to the sixth pulse entering the system, the operation of the first five pulses in setting up the C/F Code Discriminator and the memory will be described.

The C/F Code Discriminator comprises a plurality of switches which are controlled by the M sides of the five channels of the input section of the receiver. CH1 controls form C switches M13 and M14 and normally open switch M15, CH2 controls form C switch M23 and normally open switch M24, CH3 controls form C switch M33, CH4 controls form C switch M43 and CH5 controls form C switch M53. These switches are electrically interconnected to form current paths which lead to the ground 775. A given path to ground is only established for a given code or series of codes. It is through the current paths to ground formed by these switches that the code identified by the particular arrangement of mark signals and space signals identifies itself to the translator as either a print cycle code, a memory function code or a non-memory function code.

The switches M16, M26, M36, M46 and M56 form the portion of the memory section of the receiver which associates the input channels with the memory. These switches are controlled by the M sides of the first five channels and close only when their associated channel is in a mark condition. One side of each of these switches is electrically joined to a conductor 776 which leads to ground 777 through a normally closed switch M/CY2. Each closed switch is a potential path to ground for a circuit connected to the other side of the switch. Since these switches are operated as a function of the information in the input channels and it was stated before that the memory must retain information after the input channels have been cleared, the memory has more permanent storage means associated therewith which looks to the switches M16, M26, M36, M46 and M56 for the code information to be stored. The sixth pulse is directed directly into the more permanent storage portion of the memory whereby the memory does store al six pulses of a code even though it is only associated with five input channels.

Each one of the input channels is associated with a specific portion of the memory and each time a mark signal is received by a channel, the channel operates its associated portion of the memory. For example, CH3 is associated with that portion of the memory comprising coil 781 and normally open switch 782. These components are associated with CH3 through switch M36. When CH3 receives a mark signal its M side sets resulting in switch M36 closing. When switch M36 closes a conductor 783 becomes electrically joined to conductor 776 and is thereby able to see ground 777. One end of coil 781 is electrically joined to conductor 783 as is one side of switch 782. The other end of coil 781 is electrically joined to a conductor 785 which has a voltage potential established thereon at specified intervals determined by the memory control circuit. The other side of switch 782 is electrically joined to a conductor 790 which is electrically joined to conductor 468 which leads to the negative terminal of source 462. Thus when the switch M36 closes and a potential is established on conductor 785, current flows through coil 781 to the ground 777 via conductors 783 and 776. This energizes coil 781 which operates to close the normally open switch 82 whereby the current through coil 781 can now find ground over conductors 790 and 468. Once the switch 782 closes the energization of coil 781 becomes independent of the switch M36 and the resumption of switch M36 to its normal (open) condition does not interrupt the current flow through the coil 781.

The switch M36 forms the temporary portion of the memory associated with CH3 while the switch 782 forms the more permanent portion of the memory associated with the channel. The switch M36 is a temporary memory component in that it relies on CH3 being in a mark condition in order for it to be maintained in its energized state. The switch 782, on the other hand, remains in its energized (closed) state even after the CH3 mark condition has been terminated. Switch 782 stores the CH3 information for the period of time required for the typewriter to respond thereto while the switch M36 only remains in a condition which reflects the information in CH3 long enough to enable switch 782 to be properly conditioned. As will be more fully explained below, it is possible for switch 782 to be closed reflecting a mark condition in CH3 for one code character while switch M36 is open reflecting a space condition in CH3 for a different code character.

The coil 786 and associated switch 787 form the memory unit which reflects information from CH4 and are associated with switch M46 through conductor 788. The coil 791 and associated switch 792 form the portion of the memory associated with CH5 and are associated with switch M56 through a conductor 793.

When the more permanent portion of the memory contains a code, the permanent memory switches reflect a space condition in a channel by remaining open and reflect a mark condition in their associated channel by closing. The permanent memory switch 794 for CH6 receives its information directly from the sixth pulse and need only receive the sixth pulse if it is a mark signal since its failure to receive the sixth pulse will result in the switch remaining open while properly characterizing the last pulse as a space signal. In order for switch 794 to receive mark signal pulses, the M/Even conductor is electrically joined through a conductor 796 and isolation diode 797 to one side of coil 798 which operates the permanent memory switch 794. The other side of coil 798 is electrically joined to a conductor 799 which leads to conductor 776 through an isolation diode 801. One side of switch 794 is also electrically joined to the conductor 799 but is isolated from the coil 798 by a diode 802. The other side of switch 794 is electrically joined to the conductor 790. The side of coil 798 to which conductor 796 leads is joined to the conductor 785 through a switch 803 which is normally open and which closes when coil 798 is energized. In this way all sixth pulses which are mark signals are directed through coil 798 to ground 777 and result in switches 794 and 803 closing. The closing of switch 794 provides a path to ground through coil 798 which does not include conductor 776 but instead includes conductor 790. Thus when conductor 776 becomes effectively disconnected from ground 777 by switch M/CY2 opening, current in coil 798 is still able to find ground over conductor 790.

The switch 803 is necessary because of the fact that the conductor 799 does not include a switch as does each of the other conductors which communicate a permanent memory switch with the conductor 776. In the absence of switch 803 the coil 798 would be energized every time the conductor 785 had potential established thereon and thus every code would be interpreted as having a binary weight of 32 whether in fact it did or not. When the sixth pulse is not a mark signal, the switch 803 will be unable to close and will isolate the coil 798 from the potential on conductor 785.

The memory control (which will be more fully described below) establishes a voltage potential on conductor 785 prior to the closing of switch 803 when a sixth pulse is a mark signal. Thus when the switch 803 does close there is a positive potential on both sides of the switch and like all of the other glass reed switches in the circuit it switches dry.

Each of the permanent memory switches has electrically associated therewith one or more of the typewriter solenoids which initiate typewriter operation. Only when a permanent memory switch is closed are the solenoids associated therewith potentially capable of being energized. If a switch is not closed, the solenoids associated therewith cannot possibly be energized since they are not in a circuit which includes a path to ground. Thus one side of the selector latch solenoid SL32 which is associated with the selector latch that has been assigned the binary weight of 32 (latch 79), is electrically joined by conductor 804 and isolation diode 806 to the side of switch 794 remote from the conductor 790. The other side of solenoid SL32 is electrically joined to a conductor 810 which at times carries a voltage potential, the times being determined by the memory control circuit. If the particular code retained in the memory includes a binary weight of 32, the switch 794 will be closed and the occurrence of a voltage potential on conductor 810 will result in current flowing through solenoid SL32 whereby the solenoid will withdraw the latch 79. Similarly, the selector latch solenoid SL16 which is associated with the selector latch having an assigned binary weight of 16 has one side electrically joined to conductor 810 and its other side electrically joined to switch 792 by a conductor 807 and an isolation diode 808.

The selector latch solenoid SL8 is electrically joined to conductor 810 and also to memory switch 787 through a conductor 809, isolation diode 811 and a conductor 812. The permanent memory switch 787 also has associated therewith solenoid 239 which initiates a carrier return operation (see FIG. 10). One end of carrier return solenoid 239 is electrically joined to a conductor 820 which carries a positive potential at times specified by the memory control portion of the translator. The other end of the carrier return solenoid 239 is electrically joined to switch 787 by a conductor 813, diode 814, and conductor 812.

The selector latch solenoid SL4 is electrically joined between conductor 810 and switch 782 via conductor 816 and diode 817.

When the code in the memory includes a binary weight of 8 switch 787 will be closed and both solenoid SL8 and solenoid 239 will be capable of being energized. The one of the two solenoids energized depends on which of conductors 810 and 820 has a voltage potential established thereon. Thus each permanent memory switch can control the operation of more than one solenoid if each solenoid receives its energizing potential from a separate source.

The portions of the permanent memory associated with CH's 1 and 2 include several components not found in the other portions of the memory in order that three different function operation initiating solenoids, all finding a source of operating potential from conductor 820, can be controlled by two permanent memory switches.

A coil 821 and a normally open switch 822 form the portion of the memory which reflects the information from CH1. The coil 821 is electrically joined to a conductor 823 which leads to the switch M16. One side of switch 822 is also joined to conductor 823 while the other side of the switch is electrically joined to the conductor 790 which leads to ground. The other side of the coil 821 is electrically joined to the conductor 785 which is a potential source of voltage.

A coil 826 and associated normally open switch 827 form the portion of the permanent memory which reflect the information from CH2. One side of coil 826 and one side of switch 827 are electrically joined to a conductor 828 which leads to switch M26. The other side of the switch 827 is electrically joined to the conductor 790 while the other side of the coil 826 is electrically joined to the conductor 785. The components described above as comprising the portions of the permanent memory which reflect the information from CH's 1 and 2 operate in an identical manner as the portions of the permanent memory previously described. Thus when CH1 receives a mark signal switch M16 closes and coil 821 becomes energized which results in switch 822 closing and thus providing coil 821 with an alternate path to ground. Similarly a mark signal in CH2 is reflected by the closing of switch M26 which results in the energization of coil 826 and the closing of switch 827. If permanent memory switch 822 reflects a mark signal in CH1, the selector latch solenoid SL1 is potentially capable of being energized since it will have a path to ground and require only a positive potential on conductor 810 for its operation. Similarly selector latch solenoid SL2 will be capable of operation when permanent memory switch 827 is closed in response to a mark signal in CH2. Besides selector latch solenoids SL1 and SL2, however, switches 822 and 827 have associated therewith solenoids B/S, TAB, and SP which initiate backspace, tabulator, and space operations, respectively. All three of these solenoids are electrically joined to the conductor 820 which acts as a source of operating potential for memory function operations.

The chart of FIG. 35 indicates that the space operation is characterized by a binary weight of 17 which is achieved when the first and sixth channels of the input section receive mark signals. Thus when switch 822 is closed and conductor 820 has a voltage potential established thereon, the solenoid SP should draw current while the solenoids B/S and TAB remain unenergized. The solenoid SP is electrically joined to a conductor 824 which includes an isolation diode 825 and which leads to the normally closed side 829*a* of a form C switch 829. Switch 829 is controlled by the coil 826. The normally closed side 829*a* of switch 829 is inturn electrically joined to a conductor 831 the other end of which is connected to conductor 823 to which the permanent memory switch 822 is also connected. The switch 822 was previously described as leading to ground via conductor 790, when closed. Thus when coil 821 reflects the existence of a mark signal in CH1, switch 822 closes and a ground path is made available for the solenoid SP.

The solenoid TAB leads to the normally open side 829*b* of the switch 829 via conductor 832 and isolation diode 833. The only time that the solenoid TAB can possibly find ground is when the coil 826 is energized and the normally open side 829*b* of switch 829 is closed. Since the closing of side 829*b* is accompanied by the opening of side 829*a* the conditions whichc provide a ground path for the solenoid SP preclude the existence of a ground path for the solenoid TAB and thus a selection between the two solenoids is made even though they both look to the same source of potential for energization.

The solenoid B/S also looks to conductor 820 for its energization potential and thus its path to ground must also be discontinuous under those conditions which provide a ground path for the solenoid SP. The solenoid B/S is electrically joined to a normally open switch 836 by a conductor 837 and a diode 838. The switch 836 is controlled by the coil 826 and closes when the coil is energized. The switch 836 is electrically joined to a conductor 839 which leads to a normally closed switch 841 which is controlled by the memory coil 821. Switches 822 and 841 are most advantageously realized as the two sides of a form C switch but have not been described as such mainly to emphasize the identity of the switch 822 as a permanent memory switch corresponding to the permanent memory switches which each of the other channels have associated therewith. The normally closed switch 841 is electrically joined to the conductor 790 which leads to the negative terminal of potential source 462. Since the solenoid B/S cannot find ground unless coil 826 is energized to close switch 836, the previously described conditions of a mark signal in CH1 but not in CH2 precludes the solenoid B/S from operating. Thus the stated conditions provide a ground path for the solenoid SP exclusively.

When CH2 is in a mark condition and CH1 is in a space condition, coil 826 will be energized and coil 821 will not be energized. When coil 826 is energized the normally closed side 829*a* of switch 829 opens and thus precludes the solenoid SP from finding ground. The lack of energization in coil 821 causes switch 822 to remain open and thus the solenoid TAB is unable to find ground. The energization of coil 826, however, closes the switch 836 and enables the solenoid B/S to find ground through the normally closed switch 841. The chart of FIG. 35 indicates that a backspace operation has a binary weight of 18 which is achieved by the existence of a mark signal in CH's 5 and 2. Thus, the solenoid B/S which is responsible for initiating a backspace operation is the only solenoid energized when the CH2 is in a mark condition and CH1 is in a space condition.

The chart of FIG. 35 also indicates that the binary weight of 19 (achieved by a mark condition in CH's 1, 2 and 5) is exclusively identifiable with a tab operation and thus when both coils 821 and 826 are energized the TAB solenoid must be the only one to find ground. The energization of coil 826 precludes the solenoid SP from finding ground due to the normally closed side 829*a* of switch 829 opening. The solenoid B/S is prevented from finding ground due to the normally closed switch 841 opening in response to the energization of coil 821. The TAB solenoid on the other hand, is able to find ground through the normally open side 829*b* of switch 829 which closes and the normally open switch 822 which also closes.

The logic circuit described above which associates the B/S, TAB, and SP solenoids with the portions of the memory corresponding to CH's 1 and 2 enables three solenoids to be operated by only two information channels.

The foregoing description of the memory section of the translator explains how the memory is associated with the input channels, how the memory retains information and how it uses that information to induce typewriter operation corresponding to the particular code retained by the memory. Proper operation of the typewriter, however, requires that only one of the conductors 810 and 820 carries an energizing potential for purposes of solenoid operation. Also, the conductor 785 which carries memory energizing potential, must have potential established thereon prior to the input channels being cleared of information. These and several other operations are performed by the memory control portion of the translator, which will now be described in detail.

The M/Even and the S/Even conductors are electrically joined through isolation diodes 842 and 843 respectively to a conductor 844. Before a pulse can pass over conductor 844 it must pass through either side S54*b* of switch S54 or side S55*b* of switch S55 both of which are normally open and only close after the fifth pulse has been received by the input section of the translator. In this way only the sixth pulse passes over conductor 844. The conductor 844 leads to the base of a transistor 846 through a resistor 847. The transistor 846 responds to a pulse on its base by conducting whereby the ground available at its emitter via conductors 848, 467 and 468 appears at its collector. The collector of transistor 846 is electrically joined through a resistor 849 to the base of transistor 851. When the base of transistor 851 sees ground it conducts and its emitter sees ground through its collector which is electrically joined to conductor 848. The emitter of transistor 851 is electrically joined through a resistor 852 to the base of a transistor 853, which responds to the emitter of transistor 851 leading to ground by conducting. Electrically joined at the juncture of the emitter of transistor 851 and the resistor 852 is a conductor 854 one end of which leads through a resistor 856 to a latch hold transistor LH and the other end of which is electrically joined to one side of a normally closed switch M/CY1 in the memory control circuit. The grounding of the emitter of transistor 851 results in transistor 853 conducting and also in transistor LH conducting.

The emitter of transistor 853 is electrically joined to the conductor 469 which leads to the positive side of voltage source 462, while the collector of the transistor is electrically joined to the reset line of CH1. Thus when the emitter of transistor 851 is grounded, and transistor 853 conducts, the reset line of CH1 receives a pulse which bucks down the S side of the channel. When the S side of CH1 is bucked down the normally open switch S14 opens and breaks the ground path necessary to maintain transistor 763 in a conducting state. The transistor 763, as previously described, operates to maintain voltage potential on the main latch line 486 when switches S14 and D1 are closed making it necessary for the base of transistor 763 to look elsewhere for ground when switch S14 opens. The latch hold transistor LH has its emitter electrically joined to the normally open switch S14 and its collector to the conductor 764 such that a short circuit is effectively established around the switches S14 and D1, when the transistor LH is conducting. The same signal which results in the S side of CH1 being bucked down also results in transistor LH being biased into conduction whereby the opening of switch S14 has no immediate effect on the availability of voltage potential to the main latch line 486. The path over which ground is established on the base of transistor 763 is changed from switches S14 and D1 to transistor LH to enable the potential on the latch line through transistor 763 to be maintained during the sixth pulse and to be removed immediately at the termination of the sixth pulse. The discriminator coil D remains energized for 4 ms after the sixth pulse terminates but due to the opening of switch S14 the discriminator is prevented from keeping potential on the main latch line 486. The transistor LH on the other hand hangs on to the sixth pulse and at the termination of the sixth pulse the transistor immediately becomes non-conducting which, in turn, stops conduction of transistor 763 and removes the potential from main latch line 486. Thus, the termination of the sixth pulse results in the immediate clearing of the information in the input channels making it possible for new information to be received at the earliest possible time. Since the termination of the sixth pulse results in the main latch line 486 losing its potential and thus all of the channels being returned to their normal condition it follows that the memory must store the character code prior to the termination of the sixth pulse.

A memory set transistor MS has its emitter electrically connected by a conductor 888 to the conductor 472 which leads to the positive terminal of the voltage source 462. The collector of transistor MS is electrically joined to the conductor 785 which operates to set the permanent section of the memory when it carries a positive potential. The transistor MS will conduct and thereby establish a potential on conductor 785 when its base leads to ground. The base of transistor MS is electrically connected to a resistor 858 which is joined to a conductor 859 which is electrically connected to a conductor 861 which leads through an isolation diode 862 to normally closed switch M/CY1. The other side of switch M/CY1 is electrically joined to conductor 854 which was previously described as being joined between the emitter of transistor 851 and the resistor 852 in the base leg of transistor 853. The conductor 854 leads to ground when transistor 851 conducts in response to the leading edge of the sixth pulse. Thus, almost simultaneous with the leading edge of the sixth pulse a voltage potential is established on conductor 785 and those permanent memory switches associated with a channel in a mark condition close. Once the conductor 785 has had a voltage potential established thereon the information in the input channels is stored in the memory and will not be lost when the input section releases it. It is essential, of course, that the base leg of the transistor MS leads to ground even after the sixth pulse terminates since the information in the memory is only retained as long as the conductor 785 carries a positive potential. Since the termination of the sixth pulse results in the transistor 846 resuming its non-conductive state and thus disassociating conductor 854 from ground, it is necessary to provide an alternate path to ground for the base leg of transistor MS. This alternate path must be established prior to termination of the sixth pulse.

When the conductor 854 is connected to ground in response to the leading edge of the sixth pulse, it not only provides a ground path for the transistor MS but also provides a ground path for the base of the memory control transistor M/CT which is electrically joined to conductor 854 through normally closed switch M/CY1. The emitter of transistor M/CT is electrically joined to a conductor 863 which in turn is electrically joined to the conductor 469 which leads to the positive terminal of the voltage source 462. The collector of transistor M/CT is electrically joined to the set line of the M/C control (previously described with reference to FIG. 38). Thus, when the transistor M/CT is biased to a conducting state the set line of the M/C control is connected to a source of potential made available through conductor 863. If the output conductor 864 of the control M/C leads to ground, current will flow through both windings of the Y side of the M/C and one winding of the X side. Assuming that conductor 864 does lead to ground, the X side of the M/C control will set immediately with the leading edge of the pulse from the transistor M/CT since only one of its windings draws current. The Y side of the M/C control however draws current through both of its windings and thus the Y side does not set. When the pulse from the transistor M/CT terminates (which occurs when the sixth code pulse terminates) the M/C control will look to its latch line 865 for energizing potential. When the latch line 865 is the source of current for the control M/C only one winding of the Y side receives current and thus the Y side sets. Accordingly, for the duration of the sixth code pulse the X side of the M/C is set and the Y side is not set. When the pulse terminates, both sides of the control M/C set.

Since the control M/C only operates when a code identifying a character print operation or memory function operation is received, the C/F Code Discriminator is designed to provide a ground path for the output conductor 864 only when such a code is in the input channels. The conductor 864 leads through the emitter-collector circuit of a transistor 866 to a conductor 867. Thus, the primary requisite for the M/C control to find ground is to have the transistor 866 in a conducting state. The base of transistor 866 leads through a conductor 868 to the form C switch SC/MR1 and more particularly to the normally open side SC/MR1*a* thereof. When the coil SC/MR is energized the normally open switch SC/MR1*a* is closed and connects the base of transistor 866 to ground thus biasing transistor 866 into conduction which effectively connects conductor 864 to conductor 867 through the emitter-collector legs of transistor 866. When the base of transistor 866 leads to ground the transistor conducts and the control M/C becomes potentially capable of finding a ground path. The coil SC/MR was previously described as controlled by the operation of transistor 769 which in turn is controlled by pulses on conductor 768 and the charge of capacitor 772. The charge on capacitor 772 has a duration of approximately 100 ms. in response to the code pulses and thus makes it possible for the control M/C to be energized for as long as 100 ms. after the sixth pulse of a code. After the 100 ms. duration the transistor 866 will open and prevent further energization of the control if no further pulses are received. This is a safety feature which prevents the control M/C from remaining energized for long periods of time in the event that the remote typewriter does not respond to a code in the manner contemplated and thus does not reset the M/C control in the normal manner provided.

Electrically joined to the conductor 867 is a conductor 869 which acts as the memory set line when the code represents a print cycle. The distinction between a print code and a function code was previously described as residing in the combination of a binary weight of 16 and a binary weight of 4. A code having a binary weight of 16 but no accompanying binary weight of 4 uniquely identifies a function operation and it is only when this occurs (CH5 in a mark condition and CH3 in a space condition) that the conductor 869 is prevented from finding ground.

The conductor 869 is electrically joined to the normally closed side M53*b* of form C switch M53. Side M53*b* leads, electrically, to a ground 775. When a code has no binary weight of 16, the conductor 869 leads to ground through switch M53 and the control M/C is energized. The conductor 869 is also electrically joined to the normally open side M33*b* of form C switch M33. This side of the switch is electrically joined to a conductor 871 which leads to the normally open side M53*a* of the switch M53. Thus if the code represents a print cycle and at the same time includes a binary weight of 16, the conductor 869 must lead to ground but is unable to do so through normally closed side M53*b* of switch M53. A code representing a print cycle and at the same time having a binary weight of 16 is required to have an accompanying binary weight of 4 in order to distinguish it from a code representing a function. Thus the normally open side M33*b* of switch M33 will be closed and communicate the conductor 869 with the conductor 871 which leads to ground 775 through the normally open side M53*a* of switch M53 which is closed in response to the mark condition in CH5. In the absence of a binary weight of 4 accompanying a binary weight of 16 (i.e., CH5 in a mark condition, with CH3 in a space condition) the conductor 869 will be unable to see through to ground 775 due to the normally closed side M53*b* of switch M53 being open and the normally open side M33*b* of switch M33 remaining open. Thus the logic established by the arangement of switches in the C/F Code Discriminator makes it possible for conductor 869 to see ground only when the code in the input channels represents a print operation.

The conductor 867 is also electrically joined to a conductor 872 via an isolation diode 873. The conductor 872 is electrically joined to the common side of a form C switch M/CY4 having a normally open side M/CY4*a* and a normally closed side M/CY4*b*. The normally closed side of the switch M/CY4 is electrically joined to a conductor 874 which acts as the memory set line when the code in the input channels represents a memory function. While all of the codes which represent a function operation are characterized by a binary weight of 16 and the absence of a binary weight of 4, not all of the function operations are memory function operations and thus not all of the codes having the characteristic of a binary weight of 16 and no binary weight of 4 establish a ground line through the C/F Code Discriminator which communicates with the conductor 874. The chart of FIG. 35 shows that the four memory functions (carrier return, backspace, tabulator and space) are represented by codes having a binary weight of 16 combined with either a binary weight of 8 or a binary weight of 1 and/or 2. Thus the C/F Code Discriminator is designed to communicate the conductor 874 with the ground 775 only when one of these four specified binary codes is present in the input channels. It should be noted that the four memory functions mentioned above are also represented by codes which include a binary weight of 32 representing the upper case operation of those functions. Since the C/F Code Discriminator does not include switches controlled by CH6, the presence or absence of a binary weight of 32 does not affect the arrangement of opened and closed switches in the C/F Code Discriminator. The important distinction which the presence or absence of a binary weight of 32 makes will be fully explained in detail below.

When the code for a space operation is present in the input channels, CH5 and CH1 are in a mark state and the normally open switch M15 and the normally open switch M53*a* are closed. The conductor 874 is electrically joined to the normally open switch M15 via a conductor 876 and when switch M15 is closed the conductor 874 is electrically joined to a conductor 877 which is electrically connected to the normally closed side M43*b* of switch M43 which leads to a conductor 878. Conductor 878 is electrically joined to the normally closed side M33*a* of switch M33 which in turn is connected to the conductor 871 which as previously described looks through the normally open side M53*a* of switch M53 for ground 775. The closing of switches M15 and M53*a* in response to a code representing a space operation results in conductor 874 leading to the ground 775 and thus the energization of control M/C.

When the input channels contain a code representing a backspace operation CH's 5 and 2 are in a mark state which results in the normally open switch M24 closing along with the normally open side of the switch M53. The switch M24 is electrically joined to the conductor 874 by a conductor 879 and when closed communicates conductor 874 with the conductor 877 which leads to ground.

When both CH's 1 and 2 are in a mark condition together with CH16, a tabulator operation is represented and conductor 874 finds ground through either switch M24 or M15.

The carrier return operation is represented by a code having a binary weight of 16 and a binary weight of 8 which when contained in the input channels results in the normally open side M43*a* of switch M43 closing along with the normally open side M53*a* of switch M53. This condition establishes a path for conductor 874 to ground 775 which includes normally closed side M13*a* of switch M13, the normally closed side M23*a* of the switch M23 and the normally open side M43*a* of the switch M43. Except for the addition of a binary weight of 32 to any of the four codes described below, no other codes produce a path between conductor 874 and ground 775 and thus those codes which represent memory functions are uniquely identified by the ability of the control M/C to find ground over conductor 874. Those codes which do not represent either a character print operation or a memory function operation (thus representing non-memory function operations) induce typewriter operation which does not include the memory circuit or the memory control circuit as will be more fully described below.

Since the control M/C finds ground through its output conductor 864 for all codes representing a character print operation and certain function operations, the mere fact that conductor 864 does lead to ground does not serve to distinguish between a print code and a function code within the memory control circuit. For the purpose of making this distinction, one side of a coil 881 is electrically joined through an isolation diode 882 to the latch line 865 of the control M/C. The other side of coil 881 is electrically joined to conductor 872 which was previously described as leading to the conductor 874 which seeks ground through the C/F Code Discriminator. When the channels contain a code which represents a memory function, the coil 881 draws current and the form C switch 882 associated with coil 881 changes from its normal state to its energized state—normally open side 882*a* closes and normally closed side 882*b* opens. The common side of switch 882 is electrically joined to the conductor 464 through a conductor 883 and thus any circuit completed through the switch leads to ground. The normally open side 882*a* of the switch is electrically joined to the conductor 872 while the normally closed side 882*b* is electrically joined to a conductor 884 which is electrically connected to a normally open switch M/CY5. It is the state of switch 882 which the memory control circuit looks to to distinguish between a print code and memory function code.

Assuming the presence of either a print code or a memory function code in the input channels, the normally open switches M/CX2 and M/CX3 close in response to the leading edge of the sixth pulse while the switches associated with the Y side of the control M/C remain in their normal state until the sixth pulse terminates. When the switch M/CX3 closes, a conductor 886 which joins the base leg of a cycle clutch solenoid transistor CCT to the normally open switch M/CX3 is electrically joined to the conductor 884. The emitter of transistor CCT is electrically joined to a conductor 887 which communicates electrically with the conductor 472 through a conductor 888.

The collector of transistor CCT is electrically joined to one side of the cycle clutch solenoid CCS (see FIG. 2). The other end of the solenoid is electrically joined to a conductor 889 which is joined to the conductor 468 which leads to the negative terminal of source 462. Since the conductor 472 to which the emitter of transistor CCT is electrically joined carries the positive potential of source 462, energizing current will flow through the cycle clutch solenoid CCS when transistor CCT conducts. The transistor conducts when the base circuit sees ground through conductor 886 which occurs when switch M/CX3 closes and conductor 884 leads to ground. Conductor 884 leads to ground when normally closed side 882*b* of switch 882 is closed. When the input channels carry a code that represent a character the coil 881 will not be energized and thus the normally closed side 882*b* of switch 882 will remain closed. Thus, the cycle clutch solenoid operates in response to the leading edge of the sixth pulse when the code in the input channels of the translator represents a character print operation. This gives the receive typewriter an additional 5 ms. lead against the transmit typewriter overrunning the receive typewriter and memory. Thus the limitation which is imposed by the memory control circuit which only allows the cycle clutch solenoid to be energized when the input channels contain a code representing a character print operation produces the desired typewriter operation. When the code in the input section of the translator represents a memory function operation the normally closed side 882*b* of switch 882 is open and the character clutch solenoid is not energized.

In order for the information which is stored in the memory to operate the remote typewriter, it is necessary for a voltage potential to be established on either conductor 810 for the purpose of energizing a particular combination of selector latch solenoids, or the conductor 820 for initiating a memory function operation. A print code energizing transistor CT has its emitter electrically joined to the conductor 887 which leads to the positive terminal of the voltage supply, and its collector electrically joined to the conductor 810. The conductor 810 has the voltage of conductor 887 established thereon when the transistor CT conducts. The base circuit of the transistor CT is electrically joined to a normally closed print code memory release switch CMR which is electrically connected to a conductor 891 which is joined to the normally open switch M/CY5.

The conductor 820 has the positive potential of conductor 887 established thereon when a memory function transistor MFT conducts and establishes a circuit from its emitter to its collector, the former of which is connected to conductor 887 and the latter of which is electrically joined to conductor 820. The transistor MFT conducts when its base circuit is able to find ground. The base circuit of transistor MFT is electrically joined to a normally closed function memory release switch FMR which is electrically joined to a conductor 892. Conductor 892 is electrically joined to the normally open side M/CY4*a* of the switch M/CY4.

Since both switch M/CY5 and M/CY4 prevent either the code transistor CT or memory function transistor MFT from finding base ground paths while the Y side of the M/C control is in its normal state, none of the solenoids associated with the memory can receive energization until the sixth pulse terminates. Thus, the sequence of events starts with the memory set transistor MS energizing the portions of the permanent memory associated with channels in a mark condition which is quickly followed by the energization of the cycle clutch solenoid CCS when the code is identified as a character print operation. When the sixth pulse terminates, the Y side of the control M/C sets (the X side remaining set) and switch M/CY5 closes as does the normally open side M/CY4*a* of switch M/CY4.

When switch M/CY5 closes, conductor 891 is joined to conductor 884 which leads to ground through conductor 883 when the normally closed side of switch 882 is closed. Since side 882*b* of switch 882 is closed when the code in the memory represents a character print operation, the transistor CT will conduct and conductor 810 will carry a positive potential. If the code in the memory represents a memory function, the normally closed side 882*b* of switch 882 will be open and the base of transistor CT will be unable to find ground. When the normally closed side 882*b* of switch 882 is open, it means that the normally open side 882*a* is closed and thus conductor 872 leads to ground. Since the memory function transistor MFT looks to ground through the normally open side M/CY4*a* of switch M/CY4 and switch M/CY4 leads to conductor 872, the transistor MFT will conduct when the transistor CT does not, provided the code involves memory. Thus the particular code in the memory determines which of the transistors CT or MFT conducts and in this way determines which of the conductors 810 and 820 carries a positive potential for energizing solenoids associated therewith.

At the same time that the termination of the sixth pulse results in the setting of the Y side of the control M/C and thus the conducting of either transistor CT or MFT, information in the input channels is removed by the latch hold transistor LH shutting off and thereby removing the latching potential through transistor 763 from the main latch line 486. When this occurs, all of the switches controlled by the channels are restored to their normal state and all of the information in the C/F Code Discriminator as well as the information in the temporary storage switches of the memory is released. The permanent memory switches not being affected by the input channels do not release their information with the resetting of the channels and thus the termination of the sixth pulse does not mark the end of the information in the memory. In order for the memory to retain its information after the sixth pulse terminates, however, it is required that the transistor MS remain biased to a conducting state. This means that its base must find a new path to ground since its original path to ground is lost with the termination of the sixth pulse and the opening of switch M/CY1. The needed alternate path to ground is supplied to the base circuit of transistor MS through normally open switch M/CX2 which closes prior to the termination of the sixth pulse.

The clearing of the input channels also results in the loss of the ground path through the C/F Code Discriminator which was originally established to energize the control M/C. Thus, the control M/C must also find an alternate path to ground prior to the termination of the sixth pulse. This alternate path to ground is provided over a conductor 894, which includes an isolation diode 896, and which is electrically joined to the conductor 867 at one end and to the normally open switch M/CX3 at its other end. Since the switch M/CX3 closes prior to the termination of the sixth pulse, the conductor 894 is joined to the conductor 884 which leads to ground when the code in the memory represents a character print operation. When the code in the memory does not represent a character print operation and thus conductor 884 does not lead to ground, a ground path is found through diode 873 and conductor 872. Thus in either case, the M/C control finds an alternate ground path prior to the termination of the sixth pulse.

Once information has been cleared from the input channels it is possible that a new code will be received and it is thus imperative that the temporary memory switches M16, M26, etc. be able to close in response to a mark signal without interrupting the information remaining in the permanent section of the memory. This condition is satisfied by the switch M/CY2 which is normally closed and which opens when the Y side of M/C sets (which occurs at the termination of the sixth pulse). The opening of switch M/CY2 disconnects the conductor 776 from ground 777 whereby the closing of any of the temporary memory switches has no effect on the permanent memory section of the memory.

It is also important to prevent the transistor M/CT from being biased to a conducting state after the termination of the sixth pulse as this would buck-down the Y side of the M/C control and prevent the proper operation of the remote typewriter. To prevent this, normally closed switch M/CY1 is disposed in the conductor 854 and remains open as long as the Y side of the M/C control is set. Thus, until the Y side of the M/C control is reset, information from the input section of the translator cannot be operative to trigger the memory control circuit.

Both the transistor CT and the transistor MFT have their collectors electrically joined through isolation diodes 897 and 898 respectively to a conductor 899 which electrically connects to the reset line of control M/C. When either transistor CT or transistor MFT conducts, the reset line of the control M/C experiences a positive potential and current flows down both windings of the X side and one winding of the Y side. This immediately sets the X side and results in all of the switches associated with the X side resuming their normal, unenergized state, which disconnects the source of latching potential from the latch line 865. The resumption of a normal state of all of the X side controlled switches also results in the switch M/CX3 opening requiring the M/C control to find ground through the alternate path of conductor 886, diode 893 and switch M/CY5. It also makes it necessary for the memory set transistor MS to shift its ground path which previously existed through M/CX2 to the normally open side M/CY4*a* of switch M/CY4 via connecting diode 901. Thus, when the X side of the M/C control resets it does not result in any change in the biasing of the various transistors operating to maintain those potentials plained above, occurs precisely at the termination of the sixth pulse. By connecting line 914 to ground, a ground path is established over a conductor 923 which is joined to conductor 914 at one end and at its other end to the base circuit of an upshift transistor U/ST. The collector of transistor U/ST is electrically joined via a conductor 924 to one side of the upshift solenoid 296. The other side of solenoid 296 is electrically joined to ground through conductor 889 and conductor 926. When the emitter collector circuit of transistor U/ST is biased for conduction the upshift solenoid 296 is energized. The emitter of transistor U/ST is electrically joined to a conductor 927 which is electrically connected to the conductor 472 which leads to the positive terminal of the source of voltage 462. Thus, when the base of transistor U/ST finds ground through switch U/S2 and the transistor conducts as a result thereof, the solenoid 296 is energized.

As previously described with reference to FIGS. 11 and 11*a*, the energization of solenoid 296 results in the typewriter upshift mechanism being operated and the solenoid being mechanically locked in its upshift position. As the mechanical operation of the upshift mechanism of the typewriter proceeds, the switch 302 is actuated whereby switch side 302*a* opens and the switch side 302*b* closes. This breaks the ground circuit for the transistor U/ST and the winding 907 and the solenoid loses its energization. This does not return the typewriter mechanism to its lower case condition, however, as the solenoid is mechanically locked in upper case and only a downshift pulse to the holding relay 298 can initiate a downshift operation. Thus, one result of an upshift in the typewriter is the reversal in state of the switch 302. If the typewriter is in upper case and an upper case function operation is transmitted, the winding 907 will be energized through the ground made available over conductor 916, but will be unable to find ground over conductor 889 since the switch 301 will be open as will be the switch side 302*a*. Thus at the termination of the pulse, the winding 907 will be de-energized and the upshift solenoid 296 will not receive energizing current. The function of such a signal is merely to confirm the fact that the typewriter is in upper case and in the event it is not, to so condition it. This feature is most important since it guarantees that any failure in correlation between the case conditions of two typewriters will be quickly remedied and not be allowed to continue for an entire message or a large portion thereof. Besides the difference in upper case and lower case characters, there is the more serious difference in upper case and lower case symbols which could cause a message to be completely unintelligible.

The windings 905 and 906 of the downshift circuit D/S are electrically joined at one end through a diode 931 and at their other end through a conductor 932. A diode 933 electrically joins the winding 906 to the S/Even line and thus provides the winding with a potential source of current each time a code has a sixth pulse which is a space signal. In order for winding 906 to be energized in response to a sixth pulse space signal, the winding 906 must lead to ground. The winding will do so over conductor 916 when the information in the input channels identifies the code as that characterizing a function operation. When winding 906 does draw current and is energized, a normally open switch D/S1, which communicates the winding 906 with latch line 918 via conductor 917, closes and provides winding 906 with a source of energization. The other side of winding 906 is electrically connected through a diode 934 to normally open switch D/32 which closes when winding 906 is energized and communicates the winding with a conductor 936 which is electrically joined to one side of the normally open side 302*b* of switch 302. As previously described, the common side of 302 is electrically joined to ground through conductors 922 and 889 and thus when side 302*b* is closed provides the winding 906 with a route to ground which enables the winding to draw current even after the conductor 916 is effectively removed from the ground 775. The switch side 302*b* is normally open and closes only when the shift mechanism of the typewriter is in the upshift position. When it is closed side 302*b* leads conductor 936 to ground and thus the junction between diode 934 and D/S2 is also grounded. Electrically joined at this junction is a conductor 937 which leads to the base of downshift transistor D/ST through resistor 938. When the base of transistor D/ST finds ground through conductor 937, the transistor conducts. The emitter of transistor D/ST is electrically joined to conductor 827 which leads to a positive source of potential, and the collector is electrically joined, via a conductor 939, to one side of the downshift relay 298 (see FIG. 11). The other side of relay 298 is electrically joined through a conductor 941 to conductor 889 which leads to ground. When the emitter-collector circuit of transistor D/ST is biased for conduction the relay 298 is energized resulting in the release of solenoid 296 from its upshift position.

As the solenoid is released and returned to its lower case position the switch 302 returns to its normal state opening side 302*b*. This terminates the energization to the relay 298 due to the loss of ground at the junction between diode 934 and switch D/S2. This also causes the winding 906 to be deenergized and return to its normal condition. With the switch 302 in its normal condition, a subsequent signal through winding 906 will not result in energization to downshift relay 298 since the conductor 936 will be unable to find ground through the switch side 302*b*. Accordingly, those function codes which include a sixth pulse which is a space signal and which energize winding 906 while switch 302 is in its normal condition will act to merely verify that the remote typewriter is in lower case position.

As stated above, an upshift signal will not energize the upshift solenoid 296 if the receive typewriter is already in an upshift condition. If a typewriter is locked in upper case by mechanism 294 (see FIG. 11) and left in that condition, it becomes impossible for the typewriter to be remotely unlocked and returned to lower case if some means is not provided for enabling the upshift solenoid to be energized since the shift key lever must be depressed, or pulled down, to release the shift lock mechanism 294. In order to provide just such a means, the normally closed switch 301 is electrically disposed between conductors 914 and 936 and physically consists of normally open contacts 301 on D/S relay 298 which are held mechanically closed while the typewriter is in lower case, or while the typewriter is mechanically locked in upper case through latching of mechanism 294 while the solenoid 296 piston is extended. Thus, when the typewriter is locked in upper case the switch 301 is closed and the switch side 302*b* is also closed. Under these conditions a signal to winding 907 will result in energization of upshift solenoid 296 due to the ground path formed through switch 301 and switch side 302*b*.

As an initial procedure, after paper verification and remote typewriter turn-on, the transmit typist shifts to upper case thus energizing receive typewriter solenoid 296. If the receive typewriter is mechanically locked in upper case the solenoid 296 piston is retracted thus releasing the armature plate of D/S relay 298 which opens contacts 301 thus taking transistor U/ST out of conduction at which time the pulse to U/S solenoid 296 terminates. As the transmit typist returns the transmit typewriter to lower case the receive typewriter is conditioned to follow.

Another situation which requires special attention is that which arises when a typewriter has been locked in upper case by a signal from a remote, transmit typewriter. Thus, if a typewriter operator approaches a type-necessary to retain information in the memory and energize selected solenoids. The effect of the bucking-down of the X side of the M/C control is to unlatch the control from the source of potential provided from conductor 469 and make the control dependent upon the potential provided over conductor 899 for continued operation. Thus, as long as the transistor CT or the transistor MFT is conducting a positive potential is established on the conductor 899 and the Y side of the M/C control will remain energized. As long as the Y side of the M/C control remains energized the information stored in the memory will be retained.

The code memory release switch CMR corresponds to switch 157 (see FIG. 7) and opens for a portion of every revolution of shaft 22. The configuration of the cam 156 determines when and how long the switch is open. The opening of the switch signals the termination of the period during which print cycle information is necessary and thus signifies the time when the information in the memory and thus the energization of solenoids is no longer required. The reclosing of CMR switch 157 also informs the CT transistor that it is safe to discharge new selector latch information into the selector latch solenoids. When the source of potential on conductor 899 is due to transistor CT conducting, the opening of switch CMR operates to bias the transistor CT to a non-conducting state and thus discontinues the energizing potential to the control M/C resulting in the Y side resetting. This causes all of the switches associated with the M/C control to assume their normal state and thereby put the M/C in condition for a new memory control cycle. Similarly, the switch FMR which corresponds to switch 254 (see FIG. 4) operates to open at a time when any of the function interposers space, backspace, tabulator or carrier return in unlatched as the result of energization of any of those solenoids. The opening of switch FMR operates to bias the transistor MFT into a non-conducting state which removes the potential from conductor 899. This means that any function interposer (memory) is unlatched and the function cycle started practically immediately after the particular solenoid is pulsed by the transistor MFT. As soon as the function interposer is unlatched the memory is able to receive new information since the unlatching causes operation of switch FMR which, in turn, clears the momory and M/C. This early release of the memory and M/C serves to allow re-entry of memory information at the very earliest point in time and permits highspeed operation of the memory functions without the transmit typewriter overrunning the receive typewriter or memory.

Because the transistor CCT, which controls the energization of the cycle clutch solenoid, CCS, is biased to a conducting state as long as there is information in the memory (the base leg of the transistor finds ground when either the X side or the Y side of the M/C control is set) high speed repeat operations such as the hypen are performed by the remote typewriter with a wide open cycle clutch in the same manner as the transmit typewriter and thus this operation can be faithfully reproduced at the remote typewriter. This is a feature of the present invention not possible with any other system presently known in the art.

Memory function operates require that the information in the memory which determines which of the several solenoids is enegized, be retained until the mechanical cycle of the typewriter informs the translator that the information is no longer needed. For the most part, the non-memory functions only require a signal pulse to induce their operation and do not include a typewriter cycling operation which requires that the information which identifies that function be retained for a given period of time.

A downshift circuit D/S comprising a double-wound coil comprising windings 905 and 906 with a pair of switches disposed within the windings of the coil, and an upshift circuit U/S comprising a double-wound coil comprising windings 907 and 908 with a pair of switches disposed within the windings of the coil, are electrically associated with the M/Even and S/Even lines at a point electrically beyond the switches S54 and S55. A conductor 911 and diode 912 connect the M/Even line to the winding 907 of the upshift circuit U/S. Electrical communication between the diode 912 and the winding 908 is prevented by a diode 913 which electrically joins windings 907 and 908. The other ends of windings 907 and 908 are electrically joined together by a conductor 914 which is joined to a conductor 916 which leads to the C/F Code Discriminator. The conductor 916 is electrically joined to the normally closed side M33*a* of switch M33. Switch M33 was previously described as being electrically joined to the conductor 871 which is connected to ground 775 when a mark signal is present in CH5 (inducing normally open side M53*a* of switch M53 to close). Thus, whenever a sixth pulse is a mark signal and the C/F Code Discriminator identifies the code as representing any function operation, the upshift winding 907 will be energized. Since every upper case function operation is represented by a code having a binary weight of 32 in addition to other binary weights, an upshift signal is received by the winding 907 every time an upper case function code appears in the translator. Since the typewriter should already be in an upper case condition when an upper case function operation code is received, the signal received by winding 907 confirms the case and, as will be shown below, causes the remote typewrier to upshift in the event it has somehow been placed in lower case while the transmit typewriter is still in upper case.

As an example, assume the typewriter to be operating at maximum speed and for some reason failed to respond to the last shift signal and, as a result, is in the wrong case when the next space is received. Upon receipt of an opposite-case space signal the space and case shift will occur during the same time interval and the next print operation will not be delayed. The same principle applies when a transmit operator depresses the shift keybutton and the space bar simultaneously thus developing an upper case space signal. The dual purpose code is read by the typewriter in parallel. It makes no difference whether the situation involves upshifting or downshifting operations.

The upshift circuit is expected to operate the upshift solenoid, however, when the signal is not received merely as a result of the transmission of an upper case function code but as a result of the transmission of an upshift signal itself (a code with a total binary weight of 48).

Assuming the typewriter to be in lower case when an upshift signal is transmitted, the winding 907 will be energized and the latching switch U/S1 will close communicating the winding 907 with a latch line 917 which is electrically joined to the conductor 469 via a conductor 918. The energization of winding 907 will also result in the closing of switch U/S2 which is electrically disposed in conductor 914 along with an isolation diode 919. The conductor 914 is electrically joined to one side of normally closed manual lock switch 301 (see FIG. 11*a*). Conductor 914 also joins to the normally closed side 302*a* of release arm switch 302 (see FIG. 11). The other side of switch 301 is connected through a diode 921 to one side of the normally open side 302*b* of switch 302. The common side of switch 302 is electrically joined to conductor 922 which leads to conductor 889 which was previously described as leading to the negative terminal of the voltage supply 462. All switches are in their normal states when the typewriter is in lower case and the closing of switch U/S2 enables the current through winding 907 to find ground through switch side 302*a*. Because of the ground path through switch 302, winding 907 does not reset when the ground path through the C/F Code Discriminator is interrupted. In this way the winding 907 can remain energized even after the information in the C/F Code Discriminator has been released, which as exwriter for the purpose of sending a message and finds that the typewriter has previously been a receive typewriter which was placed in upper case without being returned to lower case, he finds that he is unable to return the typewriter to lower case. This is due to the fact that a typewriter is remotely locked in upper case by the action of relay 298 holding the solenoid 296. The only mechanism described so far for releasing the solenoid is that which energizes the relay 298. The signal which energizes the relay 298 is generated from a remote typewriter and not from the typewriter with which the relay itself was associated. To enable a typewriter operator to energize the relay 298 associated with his typewriter, one end of a conductor 946 is electrically joined between diode 934 and switch D/S2, and its other end is electrically joined to ground 947 through normally open shift unlock switch 299. When the key-button 291 is depressed, the switch 299 is closed and the transistor D/ST is biased to conduction. This results in a signal to the downshift relay 298. The relay 298 operates when energized to release the solenoid and allow the typewriter to return to lower case. Thus the shift unlock switch 299 and the manual lock switch 301 provide important features which prevent a typewriter from being locked in upper case without a readily available means for shifting the typewriter back to lower case.

While the case shift operation of the typewriter is not associated with the main memory section and thus does not fall directly within the group of memory function operations, it does have a memory to the extent that the circuits which are energized in response to a shift code remain energized until the mechanical operation which the code represents has been completed as evidenced by a signal generated by a mechanical device associated with the operated mechanism. Thus in an upshift operation the winding 907 remains energized until the shift mechanism has reached an upper case condition at which time the switch 302 changes state indicating that the information is no longer needed and the winding can be deenergized.

The upshift circuit is electrically joined to the S/Even conductor by a conductor 951 which is electrically joined between the winding 908 and the diode 913. Thus each time a function code is received and has a sixth pulse which is a space signal, the upshift circuit will be bucked down as current will flow through both windings 907 and 908. This prevents the upshift solenoid from operating when a downshift signal establishes a ground path over conductor 916. The conductor 952 which electrically joins the conductor M/Even and the junction of winding 905 to diode 931 performs the same function with regard to the downshift circuit as conductor 951 does with regard to the upshift circuit.

The red ribbon and black ribbon codes represent nonmemory function operations. In order to have the remote typewriter type with the red portion of the ribbon a keybutton is depressed at the transmit typewriter to generate a signal through the function matrix. The signal generated results in the energization of a circuit at the receive typewriter translator which causes a red ribbon solenoid RR to be energized and remain energized until a subsequent black ribbon signal is received. This operation differs from the upshift operation, for example, in that once the ribbon has been shifted to the red position the circuit does not become de-energized. The ribbon circuit comprises a pair of windings 956 and 957 the ends of which are electrically joined through diodes 958 and 959. The windings are wound around a common core which surrounds latching switch 961 and normally open switch 962. When the coils are both energized they cancel each other and produce no change in the switches 961 and 962. The conductor H/Even is electrically joined to the juncture between winding 957 and diode 959 by a conductor 963 which includes a diode 964. The energization of winding 957 in response to a sixth pulse mark signal depends on the winding having a ground path. The winding will have a ground path when the switches of the C/F Code Discriminator have been conditioned to reflect the code which represents a red ribbon shift. A conductor 966 is electrically joined to the winding 957 through diode 958 and leads to the normally open switch M13*b* in the C/F Code Discriminator. The only time that conductor 966 leads through the C/F Code Discriminator to the ground 775 is when the input channels have that arrangement of mark and space signals which uniquely identifies a red ribbon shift. The chart of FIG. 35 indicates that a red ribbon shift has a binary weight of 57 which is achieved when the first, fourth, fifth and sixth pulses of a code are mark signals. When CH1 contains a mark signal, switch M13*b* closes and communicates conductor 966 with the normally closed switch M23*a* which leads to the normally open switch M43*a* which is closed in response to the CH4 mark signal and thus further communicates the conductor 966 with the conductor 878 which leads through the normally closed switch M33*a* to ground 775, through switch M53*a* which is closed by the presence of a binary weight of 16 in the code. When the first five pulses set up this unique path in the C/F Code Discriminator and the sixth pulse is a mark signal, the winding 957 is energized and switches 961 and 962 close. The closing of switch 961 results in a more permanent source of energization for winding 957 from the latch line 918. The closing of switch 962 results in the winding 957 being communicated to a more permanent ground through a switch 967, conductor 968, conductor 969, conductor 464, and conductor 466.

The conductor 969 is electrically joined to the base circuit of a ribbon shift transistor RT, and operates to place the transistor in a conducting state by leading the base to ground. Inserted in the conductor 969 is a switch 971 which is normally open and which closes along with switches 961 and 962 when the winding 957 is energized. The transistor RT is electrically disposed between the positive source of potential available on conductor 927, and the conductor 972 which leads to one side of the red ribbon solenoid RR. The other end of the solenoid RR is electrically joined to the ground line 889 and thus draws current when the transistor RT conducts.

The switch 967 is electrically controlled by the remote on-off circuit and prevents the ribbon circuit from remaining energized with the typewriter turned off. The operation of switch 967 will be described in more detail below.

At the same time that the winding 957 is being provided with a more permanent source of energization and a more permanent ground path, the transistor RT is biased to its conducting state through a circuit which requires that switch 971 be closed. The switch 971 being controlled by the winding 957 remains closed as long as the winding is energized. Thus the transistor conducts as long as the winding is energized and thus the red ribbon solenoid maintains the ribbon in its red position as long as the winding is energized.

The procedure for returning a ribbon from its red ribbon position to its black ribbon position is less complicated than the procedure for red ribbon operation since it requires only that the red ribbon solenoid RR be deenergized. For this purpose a conductor 974 and diode 976 electrically join the junction between diode 959 and winding 956 to the S/Even line. When a signal on the S/Even line travels through conductor 974, it causes current to flow in both windings 956 and 957. The windings will only draw current when the conductor 966 leads to ground. As previously explained, conductor 966 leads to ground when the first five pulses of the code place a mark signal in CH's1, 4 and 5. When the sixth pulse is also a mark signal, a signal is directed to winding 957 alone. When the sixth pulse is a space signal, conductor 974 carries the signal and both windings 957 and 956 are energized and the circuit is bucked down causing switches 961, 962 and 971 to open. No memory operation is required since the instant the windings are bucked down the associated switches open. Termination of the sixth pulse leaves the circuit de-energized, thus causing the red ribbon solenoid RR to be de-energized. This automatically returns the ribbon to its black ribbon position.

It is often advantageous to have a typewriter type all of the messages which it receives in one color and all of the messages which it transmits in a second color. This function is achieved in the present invention by connecting a manually operated switch 984 between the collector of the cycle clutch transistor CCT and the input side of the red ribbon solenoid RR. When switch 984 is closed, the red ribbon solenoid is energized along with the cycle clutch solenoid CCS. Since the cycle clutch solenoid is energized during the receive print cycle of a typewriter, the ribbon is shifted to its red position for each receive print operation. Since the cycle clutch solenoid is not energized when a typewriter is transmitting, those messages which the typewriter transmits are printed in black.

The circuit which enables the remote typewriter to be turned on and off comprises a pair of windings 977 and 978 which are electrically joined at one end through a diode 979. The junction between diode 979 and winding 978 is electrically joined to the S/Even line and the junction between winding 977 and diode 979 is electrically joined to the M/Even line. The junction of diode 979 and winding 977 is electrically joined to the typewriter on-off relay switch by a conductor 981 whereby any code (whether it ends with a sixth pulse space signal or a sixth pulse mark signal) operates to turn the typewriter on. All sixth pulses also pass through winding 977 to ground, via conductors 968, 969, 464 and 466. The energization of winding 977 results in normally open switch 982 closing and thus providing winding 977 and conductor 981 with a more permanent source of energization via latch line 983. Switch 967, previously mentioned, also closes when winding 977 is energized thus making it possible for the typewriter ribbon to be shifted to its red position. The remote on function is not a memory function in that it does not require the retention of the code for a specified period of time determined by the operation which the code represents. Like the red ribbon shift the remote on signal results in a condition which is only terminated by the transmission of another signal designed to turn the typewriter off. The typewriter is turned off by de-energizing the typewriter-on circuit. The typewriter is only turned off when both windings 977 and 978 are energized simultaneously causing the switches 982 and 967 to open. This will occur only when the winding 978 leads to ground through connecting diode 986 and conductor 987. Conductor 987 is electrically joined to the normally closed switch M14*a* of the C/F Code Discriminator and will be communicated with the ground 775 when the switches of the C/F Code Discriminator are arranged in the unique combination produced in response to a remote typewriter off code signal. The chart of FIG. 35 indicates that a remote off operation has a binary weight of 26 which is achieved by the combination of binary weights 16, 8 and 2. When these binary weights are present in the input channels, conductor 987 is communicated through switches M14*a*, M23*b*, M43*a*, M33*a* and M53*a* to ground 775 enabling the winding 978 to draw current. During the sixth pulse of the remote typewriter-off code, the switches 982 and 967 open and the termination of the pulse results in the de-energization of winding 977 and the return of the typewriter on-off relay to its off position.

To make sure that the transmit typewriter turns on whenever it generates a function code (a Selectric typewriter is capable of generating a function code even when it is turned off) a conductor 1044, including a diode, joins conductor 993 and winding 977. By virtue of conductor 1044 the winding 977 is energized every time a code is transmitted (by the first pulse thereof) and thus turns the transmit typewriter on if it is off. With the typewriter on the function interposer is insured of being returned to its home position and thus terminate the transmission of that code (which would otherwise be repeatedly transmitted). It is to be noted that this is one situation where the condition of the C/F Code Discriminator has a function during a transmit operation.

The same combination of closed switches in the C/F Code Discriminator which provides a ground path for the conductor 987 also provides a ground path for the conductor 988, which is electrically joined to one side of a bell-energizing circuit 989. The difference between a remote off and a remote bell-ringing operation is only the difference between the sixth pulse. Thus when the sixth pulse of a code having second, fourth and fifth pulse mark signals is a mark signal, a pulse will be transmitted over conductor 796 which leads through a diode 991 to one side of bell circuit 989, and the bell circuit will be pulsed by the sixth pulse (conductor 988 leads to ground) once every 50 ms. so long as the bell keybutton is depressed by the transmit operator.

The bell and remote off operations are purposely selected to have a code which differs only by the binary weight of 32 and the difference in the codes (as previously described) is determined by the condition of the weighting switch 303 (operated by shift release arm 278) at the time the keybutton 249 is depressed.

The transmit operator ordinarily uses the bell to signal personnel in the vicinity of the receive typewriter that conversation over the machines is desired. To ring the bell at the receive typewriter to transmit operator shifts to upper case and depresses keybutton 249. In lower case the depressing of keybutton 249 results in turning the receive typewriter off. To avoid the possibility of the operator unknowingly transmitting the wrong signal the transmit portion of the translator is designed so as to ring the transmit typewriter bell when a bell signal is transmitted. When message transmission is complete and the remote off key is depressed and the bell rings at the transmit typewriter this serves as a warning to the operator that the typewriter was in the wrong case condition when the keybutton 249 was depressed. Conversely, if it is desired to ring the remote bell and no bell is rung at the transmit machine it serves to warn the operator that the remote-off code was transmitted.

In order to give the transmitting operator this information, a conductor 993, including a diode 994 and normally open switch M62, is electrically connected at one end to conductor 521 and at its other end to the input side of the bell circuit 989. The switch M62 will close when the coil of CH6 is energized (which is the condition when a bell operation signal is transmitted). Thus, the first transmit pulse, which as previously described is directed over conductor 521 to the 1st BL, will be directed over conductor 994 to the bell circuit and cause the bell to ring. This is another situation where the condition of the C/F Code Discriminator has a function during a transmit operation.

A pair of boxes labeled "open" are illustrated as being electrically joined to a single conductor 996 which leads to the normally open switch M14*b* of the C/F Code Discriminator. When CH's 1, 2, 4 and 5 all contain mark signals, a path will be established between the ground 775 and the conductor 996. Under these circumstances a sixth pulse mark signal is directed over conductor 796 to which one of the boxes marked "open" is electrically attached. The bell circuit 989 was previously described as being electrically joined to the conductor 796 but it will not be energized under these circumstances since the C/F Code Discriminator does not provide a ground path between conductor 998 and ground 775. If the sixth pulse is a space signal, the other box marked "open" receives a pulse by virtue of its connection with the S/Even line via conductor 997.

These boxes are marked "open" because they have not been assigned to a particular typewriter function. They are, however, available for use for any non-memory function which may be desired.

As previously discussed with reference to FIG. 19, the present invention provides a feature which enables the operator of a transmit typewriter to know whether or not the receive typewriter is equipped with paper and thus capable of recording a message. The normally open switch 269 which closes when the typewriter platen 261 contains paper is electrically disposed in the conductor 820 between the solenoid TAB connection and the solenoid SP connection. When the switch 269 is closed (paper in remote typewriter) and the remote typewriter is off, the transmission of a space signal by the transmit typewriter will result in two or three additional space operations occurring at the transmit typewriter even though the space key-lever is depressed only once. In order to determine if paper is present in the remote typewriter the transmit operator first transmits a remote off signal to make sure that the remote typewriter is off and then transmits a single, space signal. If only a single space operation occurs at the transmit typewriter the operator knows that the remote typewriter does not have paper in it and will either signal the operator of the remote typewriter with the bell or simply not send a message, knowing that it will not be recorded.

The motor which is used in the IBM Selectric typewriter is of a type which produces very low torque during its initial starting period and thus the typewriter is equipped with a clutch 15 (see FIG. 7) which causes the motor to spin free until it achieves its operating speed. This procedure requires 250 to 300 ms. during which time the motor is mechanically disassociated from the typewriter mechanism and thus not capable of powering a selected operation in response to an electrical code signal. Thus when a space operation signal is sent to a typewriter which is off, the motor is turned on (there being a sixth pulse which is a space signal) but the typewriter cannot respond to the signal by performing a space function operation for the 250 to 300 ms. required for the motor to come up to speed.

Since the remote typewriter does not respond to the information in the memory by performing the space operation, the safety control memory release SC/MR control causes the memory to release all of the information in the memory after 100 ms. have elapsed. Thus 100 ms. after the space signal was received the translator of the remote typewriter is completely cleared and it is able to operate as a transmitter (SC/MR1 switch has been returned to its unacted-upon position. Since the motor typewriter finds itself with its space operation mechanism in precisely the position it would be in if the space key-lever had been depressed. The remote typewriter responds to this condition by transmitting a space signal back to the transmit typewriter. The remote typewriter will continue to so transmit until the space mechanism is returned to its unacted-upon position. Since the motor takes 250 to 300 ms. before it can power the space mechanism back to its normal position, there are approximately 150 to 200 ms. available for transmitting space signals by the remote typewriter. Thus within this time two or three signals can be transmitted, all of which will be received by the transmit typewriter and cause it to space. The returned spaces indicate that: the transmit translator transmits accurately; there is continuity between the transmitter and receiver; the receive translator receives accurately; the receive typewriter turned on and is operating; the receive typewriter is loaded with paper; the receive translator operates accurately as a transmit translator; and the transmit translator operates accurately as a receive translator.

If there is no paper in the remote typewriter, the switch 269 will be open and the solenoid SP will not be energized and thus the mechanism which initiates a space operation at the remote typewriter will not be activated and thus not cause the receiver typewriter to act as a transmitter during the warm-up period of the motor.

If the transmit typewriter fails to receive spaces from the remote typewriter the operator again depresses the remote typewriter-off key and then the backspace key. If backspaces are returned the continuity of the circuit is provided which establishes that proper signals are being received at the remote and that, therefore, the problem existing is lack of paper in the remote machine and that there is no malfunction of the terminal equipment nor the communication circuit. The signal bell should then be rung at the remote by the transmit operator to attract attention to the problem.

By using the returned-spaces test at the beginning and end of a message sent to an unattended (during the night, etc.) typewriter the receipt of the message is assured.

(h) Alternate embodiment

As previously described, the above system is designed to generate signals for transmission over and to respond to signals over conductors 514 and 516, the pulse signal code patterns being constructed of positive pulses and negative pulses and combinations of positive pulses and negative pulses with each pulse, either positive or negative, being followed by a no-pulse period. Therefore, although the weighting in the translators is binary, the code structure is tertiary (3-condition) in nature. For transmission distances of less than approximately 100 miles over a dedicated pair nothing additional in the form of communications facilities is required. However, for access to voice or channelized communications circuits it is necessary to operate the above system through a 3-condition data set, such as a three-tone system, the center frequency representing the no-pulse period and the two off-center frequencies representing mark and space conditions as related to the translators.

A widely-used and well-accepted data communications principle is based on a 2-condition (binary) signal pattern.

In order to make the invention as taught above compatible with the 2-condition principle it is necessary to modify the translators to provide an embodiment as described below. So modified, the system is compatible with various 2-tone frequency-shift data sets which have baud rates of at least 120 (e.g. Bell Telephone System Data Sets 103–A and 103–B).

FIG. 40 illustrates how FIGS. 41–44 are to be arranged in order to form the entire electrical schematic illustration of the alternate embodiment of the present invention which is designed for operation with telephone and telegraph company 2-condition transmission systems.

Referring now to FIGS. 41–44, the translator of the present invention is connected to a telephone type transmission system through conductors 1001, 1002 and 1003. All information which is received by the translator appears on conductor 1001. The telephone system itself operates to establish a space signal condition on conductor 1001 as a normal condition and only the presence of a mark signal changes this condition. (Actually the present telephone systems define the normal condition as a "mark" condition. Since it is only a matter of terminology, the normal condition is referred to herein as the "space" condition for purposes of nomenclature consistency.) Thus, the conductor 1001 has only two possible conditions. The conductors 514 and 516, previously described, have three possible conditions: a space signal, a mark signal and no signal.

All of the information transmitted from the translator to the telephone transmission system appears on conductor 1003 which, like the conductor 1001, has a normal condition which is identified as a space signal (open switch condition). The conductor 1002 serves as a ground line and is electrically connected to the negative terminal of the voltage source 462 (conductors and components of the embodiment of FIGS. 41–46 which have counter-parts in the embodiment of FIGS. 29–32 are identified by like numeral designations).

Since the conductor 1001 has a standby or normal condition of a space signal, it is necessary that every character code start with a mark signal in order for the translator to be informed that an information code is being received. Since not all character codes have a first bit which is a mark signal, it becomes necessary to provide a start pulse to precede the first information pulse of each character code. Thus the system is modified to recognize the first pulse of a character code as a start signal and not as an information-forming part of the character code.

Conductor 1001 is electrically connected to the base circuit of a transistor 1004, the emitter of which is electrically joined through a conductor 1006 to the normally closed side T/C7*a* of a form C switch T/C7. The common side of switch T/C7 is connected to the ground line 1002. The collector of transistor 1004 is electrically joined through the series circuit of resistors 1007 and 1008 to conductor 469 which leads to the positive terminal of source 462 via conductor 471. The base circuit of a transistor 1009 is connected between the resistors 1007 and 1008. The transistor 1004 responds to a space signal on conductor 1001 (the normal condition) by assuming a nonconducting state whereby current is unable to flow through resistors 1008 and 1007 to ground line 1002. When a mark signal appears on the conductor 1001 (e.g., a start pulse) transistor 1004 is biased to a conducting state and current is drawn through resistors 1008 and 1007. This results in the base of transistor 1009 having a voltage potential established thereon which switches the transistor 1009 into conduction.

The emitter of transistor 1009 is electrically joined to the conductor 469 and the collector is electrically joined through a conductor 1011 to a receive key circuit R/KEY which is comprised of windings 1012 and 1013 which are wound on a common core in opposing relationship. Windings 1012 and 1013 are joined at one end by a diode 1014 and at their other end by a conductor 1016 which is joined to a conductor 1017 leading to the ground conductor 1002. The conductor 1011 from transistor 1009 is electrically joined to winding 1012 and diode 1014 such that current drawn through transistor 1009 finds a path to ground which includes the winding 1012.

The energization of one of the windings of circuit R/KEY results in all of the switches associated therewith changing from their normal condition to their energized condition whereby the normally open switch R/KEY2 closes. The switch R/KEY2 is electrically disposed between a control line 1019, from a multivibrator clock 1021, and a conductor 1022 which is electrically joined to the conductor 467 which leads to the negative terminal of the source 462. Thus, the closing of switch R/KEY2 results in the clock control line 1019 finding ground and the clock 1021 operating. The operation of clock 1021 results in pulses being established on pulse line 1023 which is electrically joined to the common side of the form C switch T/C8. Since the transmit control coil T/C is not energized during a receive operation, pulses on conductor 1023 during a receive operation are excluded from the circuit to which the normally open side T/C8*a* leads, and are directed to the circuit which is electrically available through the normally closed side T/C8*b*.

The normally closed side T/C8*b* is electrically joined by a conductor 1024 to the common side of the switch R/KEY1. When the R/KEY circuit is energized, indicating the presence of a mark signal on the conductor 1001, pulses received by the switch R/KEY1 are directed through normally open switch side R/KEY1*a* to one of the M conductors (either the M/Even or the M/Odd conductor depending on whether a pulse is an even numbered or an odd numbered information pulse—code characters now comprising a start pulse and six information pulses). When the conductor 1001 is in a space condition, the R/KEY circuit is not energized and the pulses received by the switch R/KEY1 are directed through normally closed side R/KEY1*b* to one of the S conductors. Thus, the condition of the R/KEY circuit determines whether a pulse from clock 1021 which is directed to the input section of the translator appears as a mark signal or a space signal. Since the start pulse is always a mark signal, the first pulse from the multivibrator clock 1021 will be directed through normally open side R/KEY1*a* toward the M/Odd conductor. The pulse will be prevented from reaching the M/Odd conductor, however, by the normally open side STY1*a* of form C switch STY1 which is electrically disposed between the normally open side R/KEY1*a* of switch R/KEY1 and the M conductors. Instead, the pulse will be directed through the normally closed side STY1*b* to a diode 1026 which is electrically joined to a conductor 1027 which leads to the set line of a start circuit ST.

The start circuit ST has an X side comprising coil windings 1028 and 1029 which are electrically joined at one end by a diode 1031 and at the other end by a conductor 1032 which leads to the ground conductor 1002 via conductor 1033. The Y side is comprised of coils 1034 and 1036 which are electrically joined at one end by a diode 1037 and at the other end by a conductor 1038 which leads to ground through the conductor 1033. A conductor 1039 joins the diodes 1031 and 1037 and is electrically connected to a latch line 1041 which includes switch STX1.

When a pulse is received on the set line of circuit ST, it results in current flow in windings 1034 and 1036 which prevents the Y side of the circuit from setting. Current is also induced to flow in winding 1029, but excluded from the winding 1028, whereby the X-side of the circuit sets immediately and establishes the latch line as a source of holding current. When the pulse terminates, winding 1034 of the Y-side remains energized while winding 1036 loses its current and the Y-side of the circuit sets. Thus, for the duration of the first pulse from the multivibrator clock (which corresponds to the start pulse) the normally open side STY1*a* is maintained open to prevent any information from being established in the input channels of the translator. Once the first pulse terminates, however, the Y-side of the ST circuit sets, the normally open side STY1*a* closes and subsequent pulses directed to the switch STY1 are directed to one of the M conductors.

In addition to leading to the switch STY1, the normally open side of switch R/KEY1 also leads to the winding 1012 via conductor 1042 which includes diode 1043. This provides an alternate source of energization for winding 1012 which insures that the R/KEY circuit remains energized for the full duration of any multivibrator clock pulse which is generated while the R/KEY circuit reflects the presence of a mark signal on the conductor 1001. Without the conductor 1042, the R/KEY circuit remains energized only as long as the conductor 1001 has a mark signal established thereon. If the conductor 1042 is not provided and the first pulse from the multivibrator clock 1021 in response to a start signal is late in being generated, it is possible that the side R/KEY1*a* will open before the full 5 ms. duration of the multivibrator clock pulse has elapsed, and thus cut the pulse short and wrongly switching the remainder of the pulse to the S conductor. It would be possible without conductor 1042 for this to occur on any of the information pulses and thus be a potential source of error, avoided only by exact synchronization between received code bits and pulses from the clock 1021. The conductor 1042 enables the R/KEY circuit to hang on the multivibrator pulse whereby even if the conductor 1001 reverts to a space condition before the multivibrator pulse has elapsed, the R/KEY circuit remains energized until the termination of the clock pulse.

The conductor 1019 is also connected to a conductor 1022 by normally open switch STY2 and normally open switch STX2. Since a complete path will exist between conductor 1019 and conductor 1022 when any one of switches STX2, STY2 or R/KEY2 is closed, the multivibrator clock 1021 is assured of seeing ground for the entire time required to receive a complete character code signal.

When conductor 1001 is in the space condition, the multivibrator clock pulse is directed through the normally closed side R/KEY1*b* of switch R/KEY1 to one of the S conductors leading to the input channels. Any pulse which passes through the normally closed side R/KEY1*b* is also directed to a conductor 1046 which leads to the juncture between winding 1013 and diode 1014 of the R/KEY circuit. A pulse directed over conductor 1046 results in current flowing down both windings 1012 and 1013 which prevents the circuit from setting. Thus if the conditions on codnuctor 1001 should change from a space signal to a mark signal while a multivibrator pulse is passing through switch side R/KEY1*b*, the R/KEY circuit remains in its unset state until the pulse terminates at which time it will assume a set state to reflect the mark signal on conductor 1001.

The conductors 1042 and 1046, which enable the R/KEY circuit to hang on to a multivibrator clock pulse, assure a proper input rate to the input chanels, and input pulses of uniform duration (approximately 5 ms.). In this way it is not necessary for the occurrence of each multivibrator pulse to be precisely timed with the occurrence of an information bit on conductor 1001. In fact, as long as a multivibrator pulse is initiated at any time during the corresponding information bit on conductor 1001, the translator will receive the correct information. This allows the multivibrator clock 1021 to become as much as 8 ms. out of step with the character code information bits and still have the proper code established in the translator.

After the start pulse from the multivibrator clock 1021 has set the circuit ST, the subsequent pulses which represent the six information bits of the character code are directed to switch L/AY4, when they represent mark signals, and to switch L/AY5, when they represent space signals.

In the present embodiment the normally closed side S25*a* of switch S25 in the S/Odd conductor of FIGS. 29–32 is omitted and the space side of CH 1 is not set while receiving information so as not to close switch S16 which would prevent release of the main latch line 486 when the sixth information pulse terminates. The operation which follows is precisely the same as previously described with reference to FIGS. 29–32.

All signals which are transmitted by the translator are sent out over conductor 1003. The conductor 1003 is maintained in a space condition by the telephone company circuits and is only changed to a mark condition when acted upon by the translator. The conductor 1003 is joined by transmit key switch NBIY5 to conductor 471 which leads to the positive terminal of the source 462. When switch NBIY5 is in its normal, open condition, the conductor 1003 is electrically separated from the translator and thus assumes a space condition. When the switch NBIY5 closes in response to the NBI being set, the conductor 1003 is electrically joned to the positive terminal of the source 462 and is thereby placed into a mark condition. Accordingly, the signal established on conductor 1003 and thus the signal transmitted by the translator is a function of the condition of the NBI, as is the signal transmitted by the embodiment previously described. Since the start pulse which precedes the first code pulse is always a mark signal, the NBI must be in a set condition each time a new character code is to be transmitted. Accordingly, the direct line of the NBI is electrically connected to conductor 489 which has voltage established thereon by the S set transistor 488, as previously described. The conductor 489 and the direct line of the NBI are joined by a conductor 1047 which includes a diode 1048 and a normally closed switch STX3. The instant the S set transistor 488 conducts and establishes a voltage on conductor 489 the Y side of the NBI sets resulting in switch NBIY5 closing and mark signal being established on the conductor 1003.

At the same time that the S set transistor 488 sets the NBI, the coil T/C (while the T/C coil has been moved to the right-hand side of the drawing, it is electrically in the same position as previously described with reference to FIGS. 29–32) which is also joined to the conductor 489, is energized by current flowing therethrough to the ground line 1002. The energization of coil T/C results in the form C switch T/C7 changing from its normal state whereby its normally closed side T/C7*a* opens. Side T/C7*a* is in conductor 1006 such that when it opens it prevents transistor 1004 from conducting and thus prevents any information from being received by the translator. The closing of the normally open side T/C7*b* results in the control line 1019 of the clock 1021 finding ground therethrough and thus starting the clock. The energization of the coil T/C further results in the normally closed side T/C8*b* of switch T/C8 opening and the normally open side T/C8*a* closing such that the pulses from the clock 1021 travel to conductor 1049 instead of conductor 1024. The conductor 1049 is electrically joined to the common side of form C switch STY3 having a normally open side STY3*a* and a normally closed side STY3*b*. The normally closed side STY3*b* is electrically joined to a conductor 1051 which leads through a diode 1052 to switch M12. Electrically joined to conductor 1051 is a conductor 1053 which includes a diode 1054 and which is electrically joined to the conductor 1047 which leads to the direct line of the NBI. Thus, the first pulse from the clock 1021 is directed to the NBI whereby the NBI hangs on to that pulse and remains set for the full duration of that pulse regardless of the presence or absence of any additional signal to the direct line or on the NBI/S conductor. A conductor 1055, including a diode 1057, electrically joins the conductor 1051 to the conductor 1027 which as previously described leads to the set line of the start circuit ST. The pulse on the set line of the circuit ST results in the X side of that circuit immediately setting and the Y side setting at the termination of the pulse. When the X side of the circuit ST sets, the switch STX3 opens and the voltage on conductor 489 is no longer available to the NBI to maintain the NBI in its set condition. Since the first pulse from the clock 1021 establishes a voltage on conductor 1049, the switch STX3 can open when the X side of the ST sets without being required to switch a load. When the Y side sets the switch STY3 changes state whereby normally closed side STY3*b* opens and normally open side STY3*a* closes. This makes it possible for subsequent pulses to reach the switch L/AY3.

Thus, the switch STY3 is operative to direct the first pulse from the clock 1021 to conductors 1053 and 1055 for the purposes of insuring that the start pulse transmitted from the translator is of proper duration, and setting the start circuit so that subsequent pulses which represent information bits are directed to the switches controlled by the L/A.

Since the embodiment of the invention presently under discussion operates with a code that includes a start pulse for every character code, there is a pulse which precedes the first information pulse, unlike the previously discussed embodiment wherein the first pulse was the first information pulse. This makes it possible for CH1 to have the mark signals directed thereto instead of to the NBI. Thus, unlike the previously disclosed embodiment, the present embodiment includes a CH1 with a complete M side which is set when the first information pulse is to be a mark signal. Associated with the M side of CH1 and controlled thereby is a normally closed switch M12 which leads to the NBI/S conductor. When a particular character code includes a mark condition in CH1 the M side of CH1 will be set and accordingly the switch M12 will be open. Under these conditions, the first pulse from the clock 1021 will be unable to pass through switch M12 to the NBI/S conductor and thus the NBI will remain in its set condition as previously established for the start pulse. By maintaining a set condition, the NBI continues a mark signal on the output line 1003 to correctly transmit the condition of CH1. If, on the other hand, the particular code includes a space in CH1, the M side is not set and the switch M12 is closed. The first pulse from the clock passes through the switch M12 to the reset line of the NBI whereby the switch NBIY/5 is open at the end of the start pulse and the conditions on conductor 1003 change from a mark signal to a space signal, to reflect the information in CH1.

All pulses after the first pulse from the clock pass through normally open side STY3*a* of switch STY3 to the form C switch L/AY3 which is controlled by the L/A. The operation which follows is identical with that previously described with reference to the previously disclosed embodiment.

The main latch line 486 is tied to the conductor 469 through normally open switch STX4 which closes when the X side of the circuit ST sets, which as previously described occurs with the leading edge of the first pulse from the clock 1021. A normally open switch S16 which closes when the S set transistor 488 conducts also provides a path for the main latch line to receive potential from conductor 469 but is not permanent since the S side of CH1 is bucked down by the second information pulse.

In order to reset the circuit ST after the sixth information pulse has been transmitted, the collector of a transistor 1056 is electrically joined to the reset line of the circuit ST while the emitter of the transistor is joined to the conductor 469. When the transistor conducts a current is established in both windings of the X side of the circuit resulting in the X side resetting and the latch line switch STX1 opening. The base of transistor 1056 looks for ground through transistor 851. The transistor 851 conducts and leads the base of transistor 1056 to ground when the transistor 846 conducts. The transistor 846 conducts when a pulse is established on its base line which, as previously described, occurs in response to the leading edge of the sixth pulse of a character code which is being received. In order to establish a pulse on transistor 846 during the transmit operation, the conductor 844 leading to the base of transistor 846 is electrically connected to the conductor 537 over which the sixth information pulse travels. Thus, in addition to its previously described activity, the sixth pulse operates to bias the transistor 1056 into conduction so that the circuit ST resets prior to the start pulse of the next character code.

The conductor 537 is also connected to the NBI/S line by a conductor 1058 and diode 1059 whereby the sixth information pulse automatically operates to reset the NBI to stop the transmission of a mark signal at the conclusion of the sixth pulse if the NBI has been previously conditioned so as to transmit the sixth pulse as a mark signal.

The transistors 846 and 851 were previously described as operating in connection with the receive portion of the translator to establish a ground path via conductor 854 for the memory control circuit. As previously described, when conductor 854 sees ground through transistor 851 the memory control circuit is able to initiate the operation of the memory portion of the translator. Since it is undesirable for the memory control portion of the translator to operate during a transmit operation, a normally open switch S26 is disposed in the conductor 854. During a receive operation, the S side of CH2 (among others) is set and maintained in that condition through the sixth information pulse. Thus the switch S26 is closed when the memory control circuit looks through the switch for a ground path in order to initiate operation. During a transmit operation, however, the S side of each channel is reset successively such that when the sixth information pulse is transmitted, the S sides of the previous channels are all reset and the switch S26 is open. Thus, when the sixth pulse operates to bias the transistor 851 into conduction, the conductor 854 is unable to act as a ground path for the memory control circuit since the switch S26 has established a discontinuity between the transistor and the memory control circuit. Accordingly, during the transmit operation the memory control circuit will not operate.

It will be recognized from the description given above that the alternate embodiment of the present invention which is suitable for operation in connection with telephone communication systems does not include a 1st BL or a discriminator circuit to guard against transient signals. The operation of the 1st BL is for the most part replaced by the operation of the start circuit ST while the physical conditions established by the telephone systems prevent the effective use of the discriminator even though its operation is desired. The alternate embodiment also employs a multivibrator clock in place of the novel clock circuit previously described in order to eliminate phasing problems inherent in operating two A.C.-referenced timers from two different sources—a problem which does not exist in the previous embodiment since only a transmit clock is used. Because the 1st BL has been eliminated, the switch 1st BLX1 has been replaced by a switch STY4 to prevent new data from entering the transmitter while a code is in the process of being transmitted.

The embodiment of FIGS. 41–44 also includes a C/F Code Discriminator which is somewhat simpler than the C/F Code Discriminator previously described. The primary advantage in simplifying the C/F Code Discriminator is that it allows the Discriminator to operate with less switches which reduces the number of switches which any one input channel must operate. Since the speed with which a channel operates to change its associated switches from their normal state to their energized state is affected by the total number of switches being operated because of the larger physical size of the space into which they must be inserted it is to the advantage of the system to reduce the number of switches that a single channel must operate.

While the C/F Code Discriminator is simplified it is, at the same time, necessary to complicate the memory circuit in order that certain decoding be done in that portion of the translator instead of in the C/F Code Discriminator. Since the memory switches are not operated by the input channel coils, there is a definite advantage gained by transferring some of the decoding to the memory circuit.

The simplified C/F Code Discriminator is achieved by making a code distinction between memory functions and non-memory functions. As previously described, the presence of a binary weight of 16 and the absence of a weight of 4 in a given character code immediately identifies that code as a memory operation and not a print operation. By further requiring that all memory functions include a binary weight of 8 along with the binary weight of 16 (thus requiring a change in code assignments from that set forth on the chart of FIG. 35), the simplified C/F Code Discriminator is achieved as shown. The decoding which takes place in the memory is very similar to that previously described with reference to the backspace, tabulator and space operation initiating solenoids of the embodiment of FIGS. 29–32 and on the basis of that explanation the operation of the memory circuit illustrated in FIGS. 41–44 needs no further explanation. It might be pointed out, however, that all of the solenoids seek a path to ground through the portion of the memory which is associated with the channel carrying information representing a binary weight of 8 since as described above, all memory functions include a binary weight of 8. The simplified C/F Code Discriminator is not limited in use to the embodiment of the invention which is suitable for use with telephone company transmission systems but is equally useful with the embodiment of the invention previously described.

(i) Miscellaneous

By connecting various translator communication lines in parallel (such as a conference call connection), a multiplicity of receive translators and, consequently, a multiplicity of widely-dispersed receive typewriters may be operated simultaneously by a single transmit typewriter and any one of the typewriters so connected may operate all other typewriters simultaneously.

Although not shown on the drawings, it should be noted that by connecting in series all CMR and FMR switches and connecting in parallel all solenoids of all receive typewriters (connections to be made at a common connector) it is possible to simultaneously operate a multiplicity of machines from one translator while within the range of the multi-conductor cables between the translator and the typewriters. Further, by use of a ground line selector switch and, in addition to the foregoing, connecting in parallel all typewriter transmit switches (to be connected at the same common connector) any number of typewriters may, on a non-simultaneous basis, have common use of the translator.

In instances where the system is to be used only for one-way transmission then only those components required for transmit operations should be included in the transmit translator and typewriter, and only those components required for receive operations should be included in the receive translator and typewriter. This application is attractive in wide-spread news and weather transmission.

Dura Business Machines Corporation manufactures a high-speed retyping mechanism used in conjunction with an IBM Selectric typewriter, known under the trade name "Mach 10," which perforates tape while the typewriter is manually operated and then the perforated tape may be used to cause the same machine to retype the same information at high speed. Since the automatic retyping causes the typewriter to operate in the same fashion as previously described with reference to the IBM Selectric typewriter, the Mach 10 may be used for high-speed information reading to the translator for transmission and readout of the translator for receive printing thus making the Mach 10, in combination with the translators, a high-speed automatic typewritten communications system.

I claim:

1. A typewriter communication system comprising in combination:

a transmit typewriter which emits electrical signals as it operates wherein the electrical signals identify the various operations performed by the typewriter;

a receive typewriter which responds to electrical signals by performing the operations which the signals identify;

transmission means communicating said transmit typewriter and said receive typewriters;

signal storage means electrically connected between said transmission means and said receive typewriter and operative to receive a signal from said transmit typewriter and make that signal available to said receive typewriter, said signal storage means including a first signal storage section coupled to said transmission means to receive a signal, and a second signal storage section which transmits the signal to said receive typewriter, and control means transferring said signal from said first storage section to said second storage section only after at least a portion of said signal has been received by said first storage section and subsequently clearing said signal from said second storage section after a time period which is less than the full duration of the receive typewriter operation which the signal initiates.

2. A typewriter communication system comprising in combination:

a transmit typewriter equipped with means by which a parallel form code character of mark bit signals and space bit signals is generated each time the typewriter performs an operation wherein the code character generated uniquely identifies the typewriter operation performed;

a transmit typewriter translator connected to said transmit typewriter to receive the parallel form code characters which are generated thereby, said translator having a converter to translate parallel form code characters into corresponding serial form code characters;

transmission means connected to said transmit typewriter translator to receive the serial form code characters therefrom;

a receive typewriter translator connected to said transmission means to receive the serial form code characters thereon and having signal storage means comprising;

a first plurality of bit storage units each of which is operative to store one of the several bits which form a code character as the bits are received by said receive typewriter translator, a second plurality of bit storage units, circuit means between said first bit storage units and said second bit storage units, said circuit means operative to transfer all of the information stored in said first bit storage units into said second bit storage units in response to the last bit of a code character being received; and a receive typewriter connected with said receive typewriter translator primarily through said second bit storage units thereof, said typewriter responsive to parallel code characters in said second bit storage units to perform the typewriter operation represented thereby and having cycling signal means producing a cycling signal in response to actuation of the receive typewriter to clear said code characters from said second bit storage units during operation of the typewriter in response thereto.

3. The typewriter communication system of claim 2 wherein said receive typewriter translator has a plurality of bit signal input channels defined in part by said first bit storage units wherein each of said input channels has a mark side and a space side either of which can be set or reset, a channel being operative to represent a space bit by having its space side set and its mark side reset, and operative to represent a mark signal by having both its space side and mark side set, said first bit storage units comprising gate means which are coupled to and controlled by the mark sides of said channels, each of said gate means being normally closed, and opening in response to the mark side of the channel with which it is coupled being set whereby a gate stores a space bit signal when closed and mark bit signal when open.

4. A typewriter communication system as defined in claim 1 wherein said transmission means is a two condition system and wherein said transmit typewriter is of the form having a plurality of internal members different combinations of which are shifted by depression of different keys of the typewriter and which has a like plurality of electrical switches each coupled to a separate one of said internal members for actuation thereby, further comprising:

a translator circuit connected between said transmit typewriter and said transmission means for sensing the condition of each of said switches following depression of a key and generating a serial form signal on said transmission means having a bit indicative of the condition of each of said switches together with a single additional bit which is a start bit preceding the bits indicative of the condition of said switches.

5. A typewriter communication system as defined in claim 1 wherein said transmission means is a three condition system and wherein said transmit typewriter is of the form having a plurality of internal members different combinations of which are shifted by depressions of different keys of the typewriter and having a like plurality of switches each coupled to a separate one of said internal members for actuation thereby, further comprising:

a translator circuit connected between said transmit typewriter and said transmission means for sensing the condition of said switches following depression of a key and generating a serial form signal on said transmission means having a bit indicative of the condition of each of said switches and having no other bits.

6. A typewriter communication system comprising in combination:

a first typewriter having a plurality of keys for initiating printing of selected ones of a plurality of different characters and having coding means generating multiple bit electrical signals indicative of operated keys, a second typewriter of the type having electrically driven mechanism for printing any of said plurality of characters in response to actuation of specific combinations of a plurality of internal members of the typewriter, a plurality of electrically operated actuators each being disposed at said second typewriter to actuate a separate one of said internal members thereof in response to an electrical signal, a first multiple bit signal storage, signal transmission means coupling said coding means of said first typewriter to said first signal storage whereby each multiple bit signal from said first typewriter is received by said first storage and temporarily stored therein, a second multiple bit storge coupled to said plurality of actuators for energizing selected ones thereof in accordance with a signal stored in said second storage and having control means for clearing said signal therefrom, gate means between said first and second storages, said gate means being responsive to receipt of a final portion of each signal to transfer said signal from said first storage to said second storage and to clear said signal from said first storage for receipt of a subsequent signal therein, and cycling signal generating means at said second typewriter coupled to said control of said second storage, said cycling signal generating means being responsive to actuation of said second typewriter internal members by said actuators to clear the signal in said second storage therefrom prior to completion of printing by said second typewriter of the character which said signal represents, whereby precise synchronism of said first and second typewriters is unnecessary in that said second typewriter may be operating in response to a first signal while a second signal is stored in said second storage and a third signal is in the process of being received by said first storage.

7. A typewriter communication system is defined in claim 6 wherein:

said first and second signal storages are each comprised of a plurality of single bit storage elements and wherein said first gate means provides a plurality of first signal conducting paths between individual ones of said bit storage elements of said first storage and corresponding individual ones of said bit storage elements of said second storage, said system further comprising a second plurality of signal conducting paths connected between said signal transmission means and separate ones of said bit storage elements of said first storage, and second gate means connected between said second plurality of conducting paths and said signal transmission means and directing successive bits of each incoming signal to successive ones of said second plurality of conducting paths, each bit being directed to only one of said second plurality of conductive paths, whereby said first and second pluralities of conducting paths and said bit storage elements of said first and second storages define a plurality of separate channels between said signal transmission means and said second storage whereby each bit is transmitted through one and only one of said channels.

8. A typewriter communication system as defined in claim 6 wherein said second typewriter is further provided with a plurality of keys for initiating printing of selected ones of a plurality of different characters and coding means generating multiple bit electrical signals indicative of operated keys, said coding means being coupled to said signal transmission means and wherein said first typewriter is also of the class of having electrically driven mechanism for printing any one of said plurality of characters in response to actuation of specific combinations of a plurality of internal members of the first typewriter and is provided with actuators, first and second multiple bit signal storages, gate means connected therebetween and cycling signal generating means similar to those of said second typewriter whereby each of said typewriters may both transmit and receive.

9. A typewriter communication system as defined in claim 6 wherein at least one of said typewriters has a first enabling means coupled between said coding means thereof and said signal transmission means and providing conductive paths for signals from said coding means to said transmission means in the absence of a signal in said multiple bit storage thereof and responsive to the presence of a signal in said multiple bit storage to block transmission of the signal from said coding means to said transmission means.

10. A typewriter communication system as defined in claim 6 wherein said signals generated at said first typewriter are each a series of electrical pulses received at second typewriter in serial form and further comprising means forming a conducting path for transmitting the last pulse of each signal directly to said second signal storage and wherein said gate means is coupled to said conducting path and is responsive to the leading edge of said last pulse to transfer the preceding pulses of the signal from said first storage to said second storage in parallel form.

11. A typewriter communication system as defined in claim 6 further comprising a timing circuit coupled between said transmission means and said first and second storages and operating to clear stored signals therefrom a predetermined time interval after receipt of said signal, said time interval being greater than that required for clearing said storage by operation of said cycling signal generating means of said second typewriter.

12. In a typewriter communication system, the combination comprising:

a transmitting typewriter having a plurality of key levers for initiating print and function operations of the typewriter including a case shift key lever and an additional key lever for initiating a function operation of the typewriter, said transmitting typewriter further having coding means for generating multiple bit signals which identify the various typewriter operations, said coding means including a switch actuated by operation of said case shift key lever to generate a code signal unique to a case shift operation and having additional switch means actuated by operation of said additional key lever to generate a first multiple bit signal when said case shift lever is in upper case position and a second differing multiple bit signal when said case shift key lever is in lower case position, signal transmission means coupled to said transmitting typewriter to receive said multiple bit signals therefrom, and a receiving typewriter coupled to said transmission means for performing the typewriter operations identified by said signals thereon, said receiving typewriter having a code discriminator circuit coupled to said transmission means and receiving said signals therefrom, said code discriminator being capable of distinguishing specific ones of said signals and having a plurality of outputs for actuating the appropriate elements of said receive typewriter in accordance with the operations represented by said signals, including a first output for operating the case shift mechanism of said receive typewriter and an additional output for operating the elements of said receive typewriter corresponding to said additional key lever function operation of said transmitting typewriter, wherein said code discriminator actuates said case shift mechanism of said receive typewriter in response to said case shift signals and also in response to said first and second signals if the case condition identified thereby differs from that existing at said receive typewriter at that time.

13. The combination defined in claim 12 wherein said additional key lever of said transmitting typewriter is coupled to the space bar thereof whereby the case condition of said receive typewriter is checked and corrected if necessary each time a space signal is transmitted from said transmitting typewriter to said receive typewriter.

14. The combination defined in claim 13 wherein said additional key lever is further coupled to the carriage return key of said transmitting typewriter whereby the case condition of said receive typewriter is verified during carriage return operation as well as during space operations.

References Cited

UNITED STATES PATENTS

| | | | |
|---|---|---|---|
| 2,408,754 | 10/1946 | Bush | 178—81 |
| 2,878,306 | 3/1959 | Smith | 178—4 |
| 2,993,955 | 7/1961 | Neiswinter | 178—4.1 |
| 3,264,406 | 8/1966 | Cohen | 178—4.1 |
| 3,304,366 | 2/1967 | Clark | 178—23 |

THOMAS B. HABECKER, *Primary Examiner.*

U.S. Cl. X.R.

101—46; 197—16, 19; 328—34; 340—173

UNITED STATES PATENT OFFICE
CERTIFICATE OF CORRECTION

Patent No. 3,453,379 July 1, 1969

Lawrence Holmes, Jr.

It is certified that error appears in the above identified patent and that said Letters Patent are hereby corrected as shown below:

Column 9, line 12, "ot" should read -- to --. Column 11, line 42, "to" should read -- of --. Column 15, line 45, "resorting" should read -- restoring --. Column 17, line 15, "singal" should read -- signal --. line 37, "line" should be inserted before "feed conditions". Column 18, line 57, "178" should read -- 278 --. Column 20, line 71, "proove" should read -- groove --. Column 22, line 47, "two paths" should read -- two output paths --. Column 25, line 36, "to", first occurrence should read -- of --; line 62, "path" should read -- paths --. Column 37, line 6, "re-establishtd" should read -- re-establishe --; line 68, "voltagesine" should read -- voltage sine --. Column 38, line 11, "NB14" should read -- NB1Y4 --; line 34, "T/C4", first occurrence, should read -- T/C4b --. Column 39, line 7, "control" should read -- controls --; line 20, "is" should read -- it --. Column 40, line 8, "431" should read -- 531 --. Column 44, line 30, cancel "and"; line 45, "pervent" should read -- prevent --. Column 47, line 28, before "the receive typewriter" cancel "in"; lines 42 and 43 should read -- the over-all logic and operational sequences involved in the receive portion of the translator will be described with --. Column 51, line 2, "31-63" should read -- 631-636 --. Column 56 line 54, after "one side" insert -- of each --; line 75, "ont" should read -- out --. Column 57, line 61, "reseeting" should read -- resetting --. Column 60, line 23, "129" should read -- 729 --; line 50, "The" should read -- This --. Column 62, line 7, after "directed to" insert -- either --; line 41, "siinal" should read -- signal --. Column 65, line 71, "al" should read -- all --. Column 66, line 21, "82" should read -- 782 --. Column 68, line 75, "whichc" should read -- which --. Column 75, line 8, "circiut" should read -- circuit --. Column 77, line 35, "in" should read -- is --; line 44, "momory" should read -- memory --; line 54, "hypen" should read -- hyphen --; line 61, "operates" should read -- operations --. Column 78, line 29, "typewrier" should read -- typewriter --. Column 80, line 15, "827" should read -- 927 --. Column 81, line 72, "H/Even" should read -- M/Even --. Column 85, line 47 should read -- turned to its normal condition). At this time the remote --. Column 86, line 5, "provided" should read -- proved --. Column 89, line 16, "codnuctor" should read -- conductor --; line 24, "chanels" should read -- channels --; line 61, "joned" should read -- joined --.

Signed and sealed this 5th day of May 1970.

(SEAL)
Attest:

EDWARD M.FLETCHER,JR.
Attesting Officer

WILLIAM E. SCHUYLER, JR.
Commissioner of Patents